United States Patent
Bland et al.

(10) Patent No.: US 9,181,509 B2
(45) Date of Patent: Nov. 10, 2015

(54) EFFICIENT LOW RANK COAL GASIFICATION, COMBUSTION, AND PROCESSING SYSTEMS AND METHODS

(75) Inventors: Alan E. Bland, Laramie, WY (US); Kumar Muthusami Sellakumar, Bridgewater, NJ (US); Jesse D. Newcomer, Laramie, WY (US)

(73) Assignee: University of Wyoming Research Corporation, Laramie, WY (US)

( * ) Notice: Subject to any disclaimer, the term of this patent is extended or adjusted under 35 U.S.C. 154(b) by 1008 days.

(21) Appl. No.: 13/321,527

(22) PCT Filed: May 24, 2010

(86) PCT No.: PCT/US2010/035988
§ 371 (c)(1),
(2), (4) Date: Nov. 18, 2011

(87) PCT Pub. No.: WO2010/135744
PCT Pub. Date: Nov. 25, 2010

(65) Prior Publication Data
US 2012/0056431 A1 Mar. 8, 2012

Related U.S. Application Data

(60) Provisional application No. 61/180,750, filed on May 22, 2009.

(51) Int. Cl.
*F26B 21/00* (2006.01)
*C10L 9/08* (2006.01)
*C10L 5/36* (2006.01)

(52) U.S. Cl.
CPC . *C10L 9/08* (2013.01); *C10L 5/366* (2013.01); *Y02E 20/16* (2013.01); *Y02E 20/18* (2013.01); *Y10T 29/49229* (2015.01)

(58) Field of Classification Search
CPC .......... F26B 11/00; F26B 11/12; F26B 19/00; F26B 21/00; F26B 21/06; F01D 15/00; F01D 15/10; B23P 17/00; C01J 3/00
USPC ................. 34/380, 381, 413, 497; 423/215.5; 60/407, 781; 29/52, 623.5, 890; 48/197 R, 210; 122/22
See application file for complete search history.

(56) References Cited

U.S. PATENT DOCUMENTS 4,139,416 A * 2/1979 Palumbo et al. ................... 201/8
4,863,489 A * 9/1989 Suggitt ....................... 48/197 R
(Continued)

FOREIGN PATENT DOCUMENTS

DE 102010024616 A1 * 12/2011
EP 0184372 A2 * 6/1986
(Continued)

OTHER PUBLICATIONS

International Preliminary Report on Patentability from PCT/US10/35988 dated Dec. 26, 2011, 13 pages.
(Continued)

*Primary Examiner* — Stephen M Gravini
(74) *Attorney, Agent, or Firm* — Santangelo Law Offices, P.C.

(57) ABSTRACT

Efficient coal pre-processing systems (69) integrated with gasification, oxy-combustion, and power plant systems include a drying chamber (28), a volatile metal removal chamber (30), recirculated gases, including recycled carbon dioxide (21), nitrogen (6), and gaseous exhaust (60) for increasing the efficiencies and lowering emissions in various coal processing systems.

122 Claims, 27 Drawing Sheets

(56) References Cited

U.S. PATENT DOCUMENTS

| | | | |
|---|---|---|---|
| 5,145,489 A | 9/1992 | Dunlop | |
| 5,290,523 A | 3/1994 | Koppelman | |
| 5,322,530 A | 6/1994 | Merriam et al. | |
| 5,373,648 A * | 12/1994 | Wolf | 34/578 |
| 5,403,365 A | 4/1995 | Merriam et al. | |
| 5,575,085 A | 11/1996 | Groombridge | |
| 5,746,787 A | 5/1998 | Koppelman | |
| 5,769,908 A | 6/1998 | Koppelman | |
| 5,830,246 A | 11/1998 | Dunlop | |
| 5,830,247 A | 11/1998 | Dunlop | |
| 5,858,035 A | 1/1999 | Dunlop | |
| 5,863,304 A | 1/1999 | Viall et al. | |
| 5,904,741 A | 5/1999 | Dunlop et al. | |
| 5,987,776 A * | 11/1999 | Holcombe et al. | 34/330 |
| 6,085,440 A * | 7/2000 | Getler | 34/314 |
| 6,090,171 A | 7/2000 | Viall et al. | |
| 6,098,306 A * | 8/2000 | Ramsey et al. | 34/257 |
| 6,146,432 A | 11/2000 | Ochs et al. | |
| 6,162,265 A | 12/2000 | Dunlop et al. | |
| 6,185,841 B1 | 2/2001 | Conochie | |
| 6,249,989 B1 | 6/2001 | Conochie et al. | |
| 6,266,894 B1 | 7/2001 | Conochie | |
| 6,325,001 B1 | 12/2001 | Sheldon | |
| 6,568,185 B1 | 5/2003 | Marin et al. | |
| 6,878,174 B1 | 4/2005 | Conochie | |
| 6,907,845 B2 | 6/2005 | Krebs | |
| 6,996,989 B2 | 2/2006 | Dries et al. | |
| 7,007,616 B2 | 3/2006 | Abrams et al. | |
| 7,019,412 B2 | 3/2006 | Ruggieri et al. | |
| 7,062,912 B2 | 6/2006 | Penfornis et al. | |
| 7,066,396 B2 | 6/2006 | Knight et al. | |
| 7,067,456 B2 | 6/2006 | Fan et al. | |
| 7,275,644 B2 | 10/2007 | Ness et al. | |
| 7,303,606 B2 | 12/2007 | Zeng et al. | |
| 7,540,384 B2 | 6/2009 | Ness et al. | |
| 8,322,056 B2 * | 12/2012 | Causer | 34/90 |
| 8,579,999 B2 * | 11/2013 | Bullinger et al. | 44/626 |
| 8,776,518 B1 * | 7/2014 | Das | 60/641.2 |
| 8,832,964 B2 * | 9/2014 | Foxen | 34/396 |
| 8,997,376 B2 * | 4/2015 | Carnegie et al. | 34/411 |
| 9,003,675 B2 * | 4/2015 | Kim et al. | 34/86 |
| 2002/0079273 A1 | 6/2002 | Davies et al. | |
| 2003/0185718 A1 | 10/2003 | Sellakumar | |
| 2006/0075682 A1 | 4/2006 | Bullinger et al. | |
| 2008/0107580 A1 | 5/2008 | Alvarez et al. | |
| 2012/0056431 A1 * | 3/2012 | Bland et al. | 290/52 |

FOREIGN PATENT DOCUMENTS

| | | | |
|---|---|---|---|
| GB | 1437245 A * | 5/1976 | |
| JP | 61195189 A * | 8/1986 | C10B 57/10 |
| WO | 93/23500 | 11/1993 | |
| WO | 2006042308 A2 | 4/2006 | |
| WO | 2006044264 A2 | 4/2006 | |
| WO | 2006044317 A2 | 4/2006 | |
| WO | 2006044353 A2 | 4/2006 | |
| WO | 2008127709 A2 | 10/2008 | |

OTHER PUBLICATIONS

Bland, A. et al. Pre-Combustion Thermal Treatment of Coal to Remove Mercury: Process Data Validation with Bench and Pilot-Scale Units—Preliminary Results, 20th (Int'l) Western Fuels Conference, Denver, CO Oct. 24-26, 2006.
Bland, A. et al. Beneficial Options for the Pre-Combustion Thermally Treated Subbituminous Coal: Initial Findings, 22nd Annual Int'l. Pittsburgh Coal Conference, Sep. 12-15, 2005.
Bland, A. et al. Mercury Control at Low Rank Coal-fired Power Plants by a Pre-Combustion Thermal Treatment Process—An Update, Air Quality, Global Climate & Renewable Energy Conference, Tucson, AZ, Jan. 25-26, 2005.
Bland, A. et al. Mercury Control at Low Rank Coal-fired Power Plants by a Pre-Combustion Thermal Treatment Process, 19th Int'l Conf. on Lignite, Brown and Subbituminous Coals; Bilings, MT, Oct. 12-14, 2004.
Bland, A. et al. Mercury Emissions Testing at Power Plants Burning Subbituminous Coals, 19th Int'l. Conference on Lignite, Brown and Subbituminous Coals, Oct. 12-14, 2004.
Bland, A. et al. A Novel Approach to Mercury Control by Pre-Combustion, Thermal Treatment of Low Rank Coals—Project Update, AWMA's 97th Annual Conf. and Exhibition, Indianapolis, IN, Jun. 22-25, 2004.
Bland, A. et al. Pilot Testing of WRI's Novel Mercury Control Technology by Pre-Combustion Thermal Treatment of Coal, DOE Mercury Conference, Pittsburgh, PA, Dec. 14, 2007.
Fout, T. Carbon Capture for Pulverize-Coal-Based Power Plants: DOE/NETL'S R & D Program, Mega Symposium 2008, Baltimore, MD, Aug. 25, 2008.
Guffey, F.D. et al. Pre-combustion Removal of Mercury from Coal, in Proc. of the 27th Int'l Conference on Coal Utilization and Fuel Systems, Clearwater, FL, Mar. 4-7, 2002.
Klara, J. Fossil Energy Power Plant Desk Reference, DOE / NETL—2007/1282, May 2007.
Marin, O. Demonstration Study of High Sulfur Coal Combustion in Oxygen Enriched Flue Gas, ICCI Project No. 01US-01-Executive Summary, Nov. 2002.
Merriam, N. Removal of Mercury from Power River Basin Coal by Low-Temperature Thermal Treatment, U.S. Dept. of Energy, Morgantown Energy Technology Center, DE-FC21-93MC30126, p. 23, 1993.
Schmid, V. et al. An Evaluation of Mercury Measurement and Monitoring Results at a Subbituminous Coal-fired Power Plant, Air Quality V, Washington D.C., Sep. 19-21, 2005.
Ness, M. et al. Pre-Drying the Lignite to GRE's Coal Creek Station, Great River Energy, May 2005.
Intentionally left blank.
EIA, Coal Production in the U.S, 2008, web accessed Nov. 6, 2009, http://www.eia.doe.gov/cneaf/coal/page/acr/table1.pdf.
Bland, A. E. et al. WRI: Pilot Testing of WRI's Novel Mercury Control Technology by Pre-Combustion Thermal Treatment of Coal. Clearwater Coal Conference "Coal for the Future" Clearwater, FL Jun. 1-5, 2008.
Technology Breakthrough Paper, Coal Drying, NextGen Energy Council Feb. 2008.
Holt, N.A.H. Coal Gasification Research, Development and Demonstration Needs and Opportunities Preseted at the Gasification Technologies Conference, San Francisco, CA Oct. 10, 2001.
U.S. Appl. No. 61/180,750, filed May 22, 2009, entitled Methods and Systems for Thermal Process of Low Rank Coals.
International Patent Application No. PCT/US2010/035988, Filed May 24, 2010, International Search Report dated Aug. 10, 2010.
International Patent Application No. PCT/US2010/035988, Filed May 24, 2010, Written Opinion of the International Searching Authority dated Aug. 10, 2010.
Bland, k et al. Pre-Combustion Thermal Treatment of Coal to Remove Mercury: Process Data Validation with Bench and Pilot-Scale Units — Preliminary Results, 20th (Int'l) Western Fuels Conference, Denver, CO Oct. 24-26, 2006.
Bland, A.E. et al. Thermal Pre-Combustion Removal of Mercury from Powder River Basin Coals, Proc. 26th Int'l. Conference on Coal Utilization and Fuel Systems, Clearwater, FL May 4-8, 2001, pp. 457-468.
Bland, A. et al. Beneficial Options for the Pre-Combustion Thermally Treated Subbituminous Coal: Initial Findings, 22nd Annual Intl Pittsburgh Coal Conference, Sep. 12-15, 2005.
Bland, A. et al. Mercury Control at Low Rank Coal-fired Power Plants by a Pre-Combustion Thermal Treatment Process: Techno-Economic Study, Air Quality V, Washington D.C., Sep. 19-21, 2005.

* cited by examiner

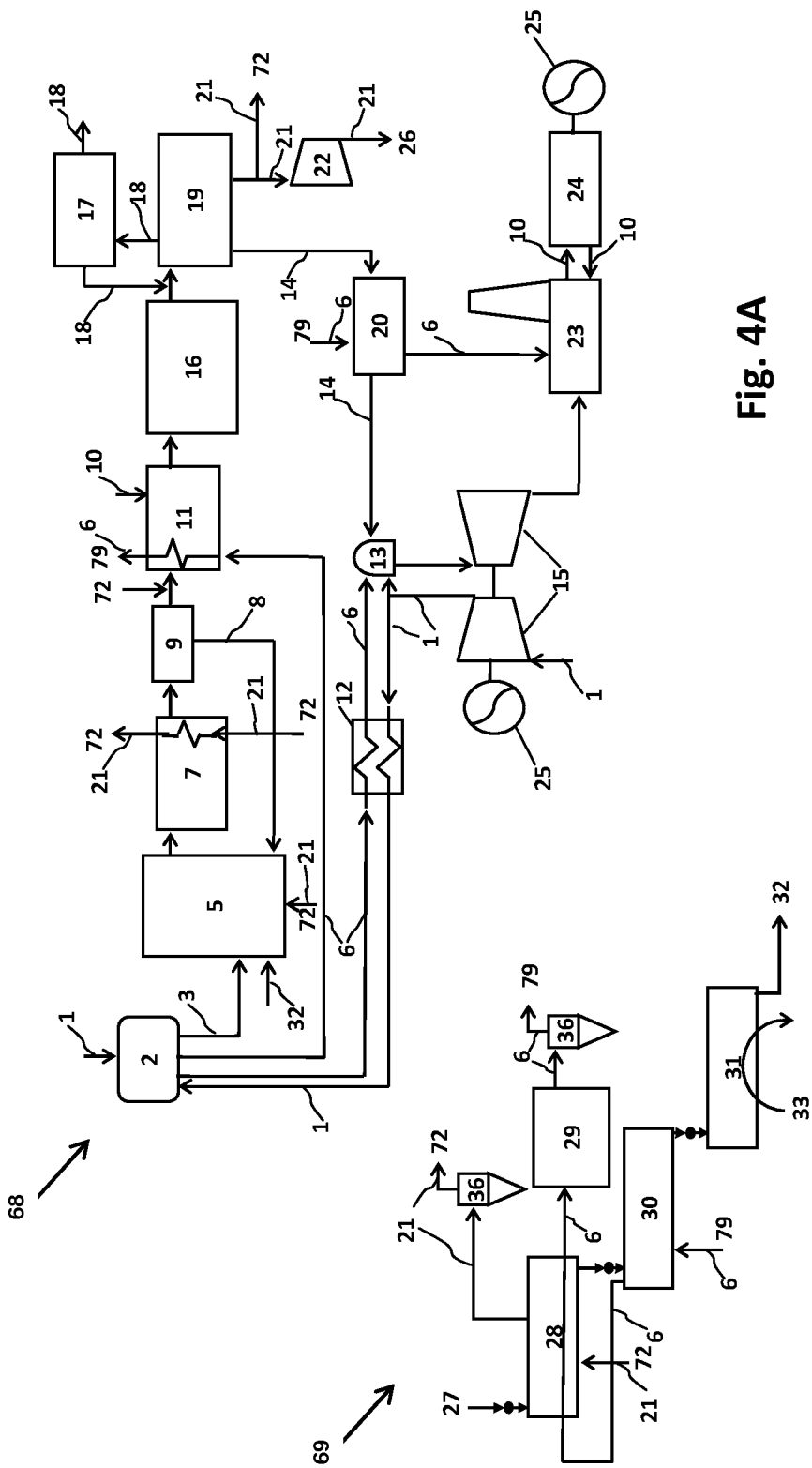

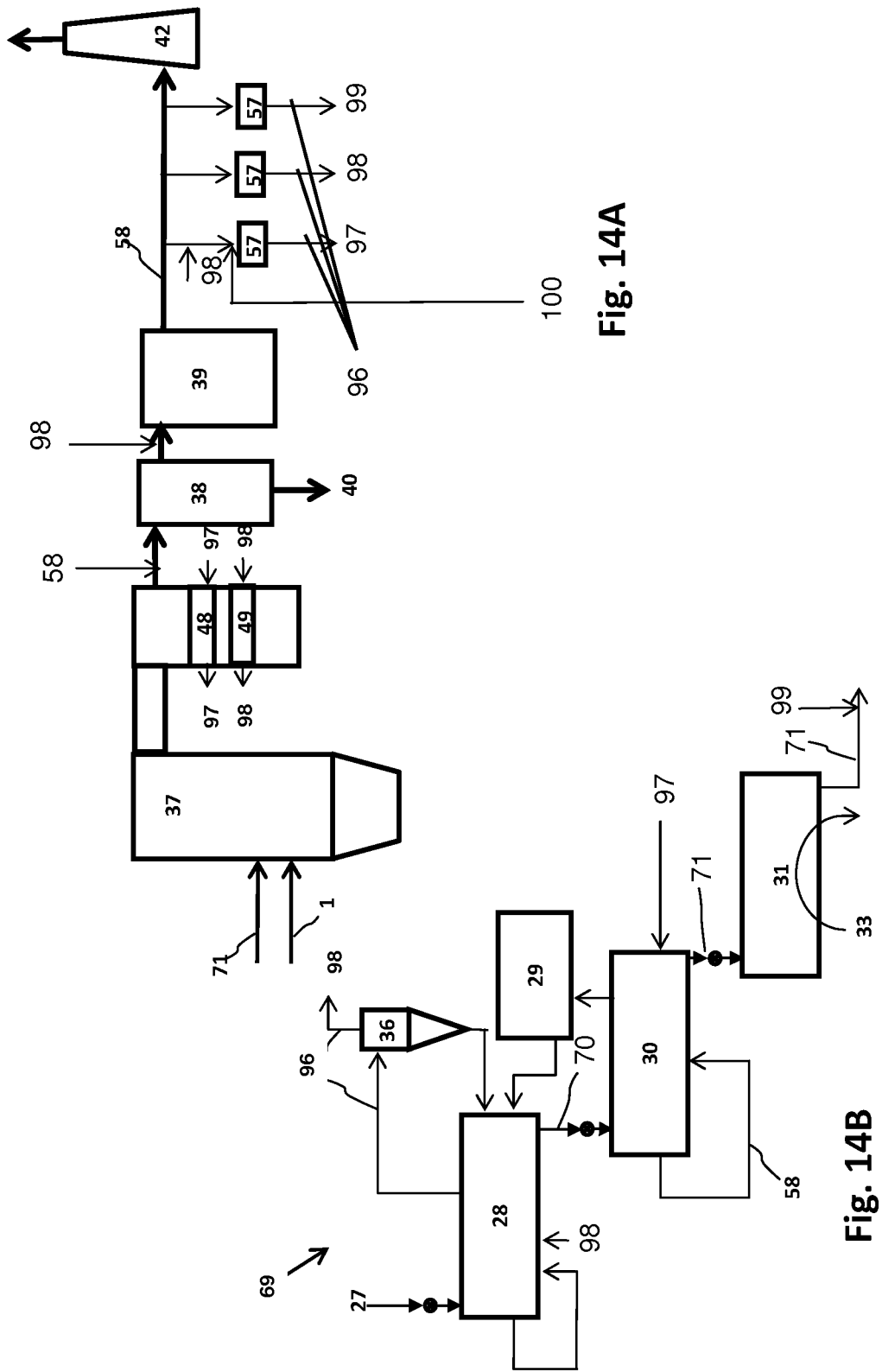

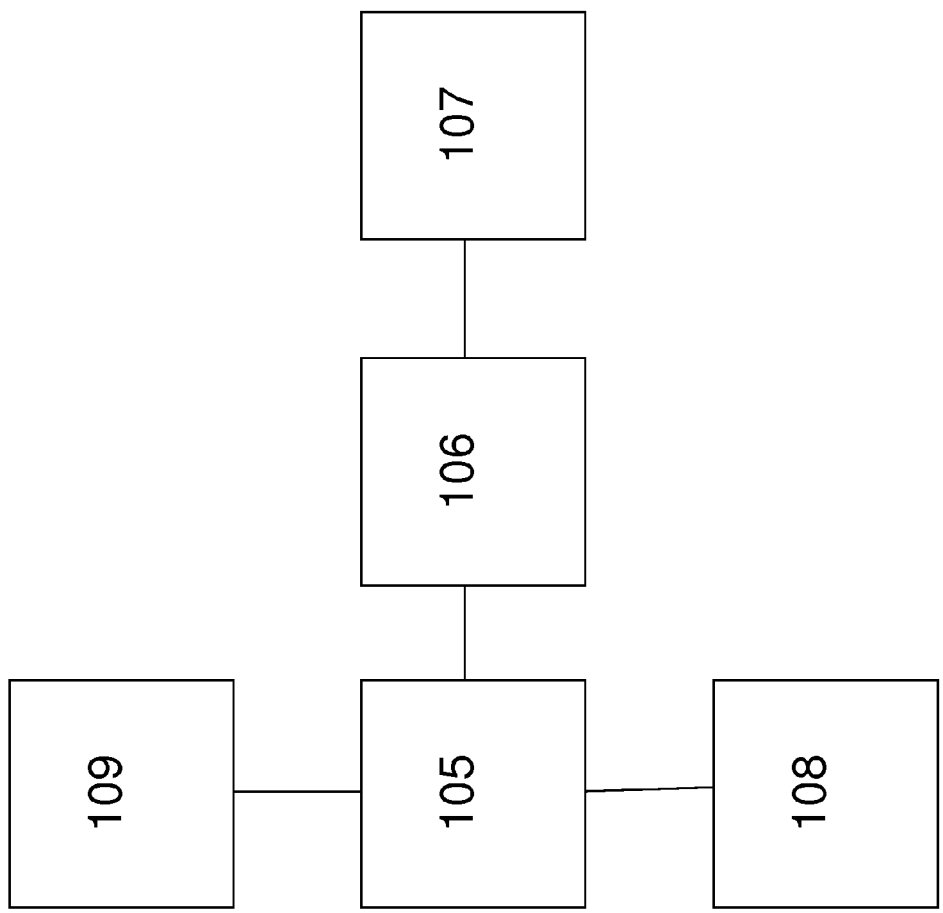

US 9,181,509 B2

EFFICIENT LOW RANK COAL GASIFICATION, COMBUSTION, AND PROCESSING SYSTEMS AND METHODS

FEDERALLY SPONSORED RESEARCH/DEVELOPMENT

This application is the U.S. National Stage of International Application No. PCT/US2010/035988, filed May 24, 2010, which claims priority to and the benefit of U.S. Provisional Application No. 61/180,750 filed May 22, 2009, each application hereby incorporated by reference in its entirety.

PRIORITY CLAIM

This application relates to work performed under U.S. DOE Cooperative Agreement #DE-FC26-98FT40322, #DE-FC26-98FT40323, and #DE-FC26-08NT43293. The U.S. government may have certain rights in this inventive technology, including "march-in" rights, as provided for by the terms of U.S. DOE Cooperative Agreement Numbers DOE #DE-FC26-98FT40322, #DE-FC26-98FT40323, and #DE-FC26-08NT43293.

TECHNICAL FIELD

Efficient systems for processing fossil fuels such as low rank coal in combustion and gasification systems to remove volatile metals and other pollutant generating species in the fuel as well as provide system schematics which improve the efficiency and quality of the processing systems.

BACKGROUND

Changes in weather pattern and the air quality have affected the lifestyle of people all over the world. Major causes have been identified including global warming due to greenhouse gases such as $CO_2$, $CO$, $NO_x$, and other pollutants released from many sources. Further analysis shows that coal-based utilities are responsible as one of the main impact sources. Hence, many research efforts are now focusing on process avenues such as enhancing power plant efficiency to reduce $CO_2$ production per kWh of electricity and cost-effective sequestration of $CO_2$. The $CO_2$ sequestration can be a beneficial approach for the long-term use of coal.

Current pollution control research priorities to sustain coal use in utility applications include volatile metal control such as mercury in addition to $SO_2$ and NOx reduction. The research findings so far on mercury control technologies show that one control technology may not be applicable for all coal types and mercury capture in subbituminous and lignite-fired units may be very difficult. One of the mercury emission control technologies may include thermal treatment of coal. Generally, the temperature regimes, the method of thermal treatment, and the like may vary between the processes. An example of one process is shown in U.S. Pat. No. 5,403,365 to Merriam et. al.

Currently, no full scale subbituminous or lignite coal drying process are commercially operating. The developmental issues for a commercial application may include energy efficiency involved in the pre-processing steps. It may be desirable to avail a heat source, medium, or the like to effectively remove moisture and perhaps at the same time inert enough to raise the temperature of a heating medium to raise a coal temperature to a sufficient level so as to evolve a significant fraction of volatile metals.

Embodiments of the present inventions may define the capabilities of a novel integrated and efficient technology scheme to reduce emission of $CO_2$, volatile metals, and perhaps even other pollutants such as per kWh of the electricity generated and also reduce the cost of electricity generated by perhaps at least about 10% from the current levels.

DISCLOSURE OF THE INVENTION

A process has been developed whereby high moisture low rank coals such as perhaps Powder River Basin ("PRB") subbituminous and even North Dakota ("ND") lignite can be thermally treated to remove moisture and volatile metals such as selenium, mercury, arsenic, or the like. In a two-step pre-process system, the first step may involve drying the coal up to a coal temperature of about 300° F. temperature followed by heating to a coal temperature up to about 600° F. to evolve most of the dry coal borne volatile metals such as mercury. The drying step may generate an effluent gas stream rich in moisture content.

The objects of the invention may include but are not limited to: (1) integration of the two-step pre-process system into gasification systems including integrated gasification combined cycle ("IGCC") power plant systems perhaps utilizing waste heat from the plant for operation of the pre-process technology; (2) integration of the two-step pre-process system into oxy-combustion based power plants perhaps using recycled cold nitrogen as the working media for removal of water from the carbon dioxide stream and even for water and volatile metals removal from the coal; and (3) integration of the two-step pre-processing system into conventional pulverized coal ("PC") power plants perhaps utilizing waste heat at existing power plants to facilitate the majority of the pre-process system with perhaps even additional make up heat for volatile metals removal being taken from a convective pass of a boiler. Any recovered water from the system such as from the drying step could be available for other uses such as in plant use, irrigation, or the like.

Accordingly, embodiments of the present invention may include efficient, emission reducing coal processing systems which can be used in power plant processing systems, in oxy-combustion processing systems, and perhaps even in gasification systems and which may be easily and efficiently retrofitted into each of these systems. Surprisingly, a coal pre-processing system may be universally integrated with each of the power plant processing systems, oxy-combustion processing systems, and perhaps even in gasification systems without much if any modification.

Naturally, further objects, goals and embodiments of the inventions are disclosed throughout other areas of the specification and claims.

BRIEF DESCRIPTION OF THE DRAWINGS

FIGS. 4A and 4B represent an alternative example of a coal pre-process system integrated with a gasification system in accordance with embodiments of the present invention.

FIG. 14 represents an alternative example of a coal pre-process system integrated with coal-based subcritical boiler plant in accordance with embodiments of the present invention.

FIG. 27 represents a schematic of an example of coal bed methane water integrated into a system assembly in accordance with embodiments of the present invention.

MODE(S) FOR CARRYING OUT THE INVENTION

The present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Embodiments of the invention(s) may be based on a two-stage thermal pre-treatment of raw coal to remove both moisture and volatile metals. This pre-processing treatment may be applied to various new and existing technologies such as in power plant systems, oxy-combustion systems, gasification systems, and the like. Moisture may be an important issue in getting a desired gaseous exhaust or flue gas purity. A schematic of the process may be represented in FIG. 17. In general, raw coal (27) may be heated up to a temperature of about 300° F. to remove moisture and then may be heated to a higher temperature up to about 600° F. in perhaps a separate zone to evolve the volatile metals.

Figure 17:
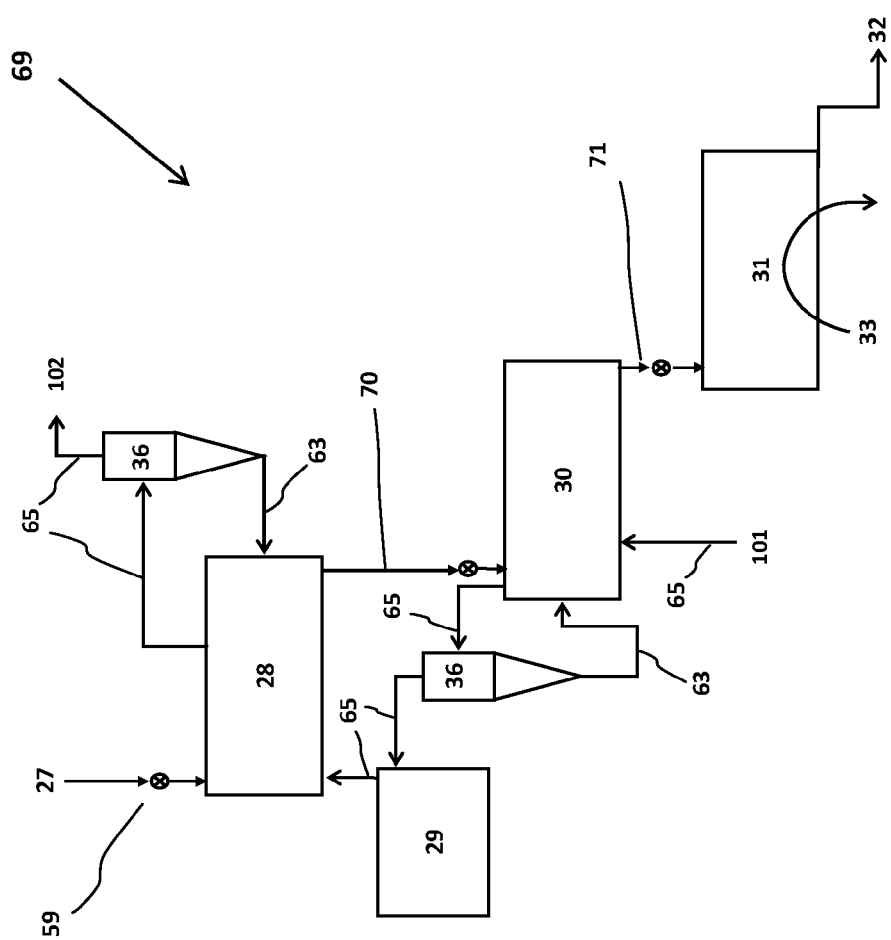
FIG. 17 represents an example of a coal pre-process system having a single heat source and a single gas stream in accordance with embodiments of the present invention.

Specifically, as can be understood from FIG. 17, wet coal (27), perhaps crushed to a suitable size, may be fed into a drying chamber (28) perhaps with a feeder (59) such as a rotary valve where the raw coal may be dried with perhaps a gas stream or the like to create a substantially dried coal. It is noted that wet coal (27) may be completely undried coal or may even be coal which has been partially dried, perhaps it may have partially pre-dried in at an earlier stage. For example, wet coal may have a moisture content including but not limited to about 8%, about 20%, about 28%, about 38%, up to about 60%, up to about 50%, up to about 20%, up to about 25%, up to about 28%, up to about 38%, greater than about 20%, greater than about 60%, or the like. Wet coal may include but is not limited to bituminous coal, subbituminous coal, lignite, biomass, coal-biomass blends, any combination thereof, and the like.

Wet coal may be any size including but not limited to fine coal, up to about one inch, up to about 2 inches, between about 1 inches and about 2 inches, or the like. The free water of the raw coal and perhaps even some or most of the more tightly bound water may be vaporized and removed from the raw coal by a sweep gas. The substantially dried coal (70) may be fed into a volatile metal removal chamber (30) perhaps with a feeder (59) where the coal may be heated to remove volatile metals including but not limited to arsenic, selenium, cadmium, lead, mercury, or the like to create a volatile metal reduced dried coal (71). The evolved volatile metal species from the coal may be swept away by a gas stream for further processing to remove and perhaps even capture the pollutants from the gas stream. High temperature sorbents may be effective in removing mercury from a process sweep gas. Some of these may be non-carbon sorbents. Application of non-carbon sorbents may also help in disposing of the mercury without impacting the ash sales and may not generate coal energy conversion byproducts that are non-useable. The volatile metal reduced dried coal may be cooled in a coal cooler (31) perhaps with boiler feedwater (33) to a temperature sufficient enough to be handled in further processing such as for additional size reduction, in combustion processing, oxy-combustion processing, gasification processing or the like systems. The quantity of a gas stream, such as a flue gas, may depend upon the moisture content of the coal and the temperature of the gas. Since PRB coal may readily combust at higher processing temperatures, the second stage of heating may be performed in an atmosphere that may not support combustion. Therefore, it may be desirable to provide that the moisture and mercury can be evolved separately. The two-stage approach may result in a water/moisture phase having no mercury in the first stage and a mercury containing sweep gas with very low moisture in the second stage.

Benefits to this pre-processing system may include moisture removal, mercury and other trace metal species control, increased plant efficiency, and perhaps even water recovery to offset the power plant fresh water consumption, perhaps without impacting ash sales. Also this technology may reduce other emissions such as NOx and $CO_2$. By integrating the process at utility plants and perhaps using waste heat, a lower moisture removal may be possible without the issues associated with spontaneous combustion in the stockpile and excess dust generation commonly associated with past coal drying processes.

Embodiments of the present invention may include gasification technologies and a unique integration of a pre-processing system into a gasification and/or IGCC application. A pre-gasification thermal treatment technology can be used to provide fuel flexibility especially for subbituminous coals gasified at high altitude and to produce syngas of quality applicable to various forms of use (e.g., power, chemical industry, and the like).

Figure 1:
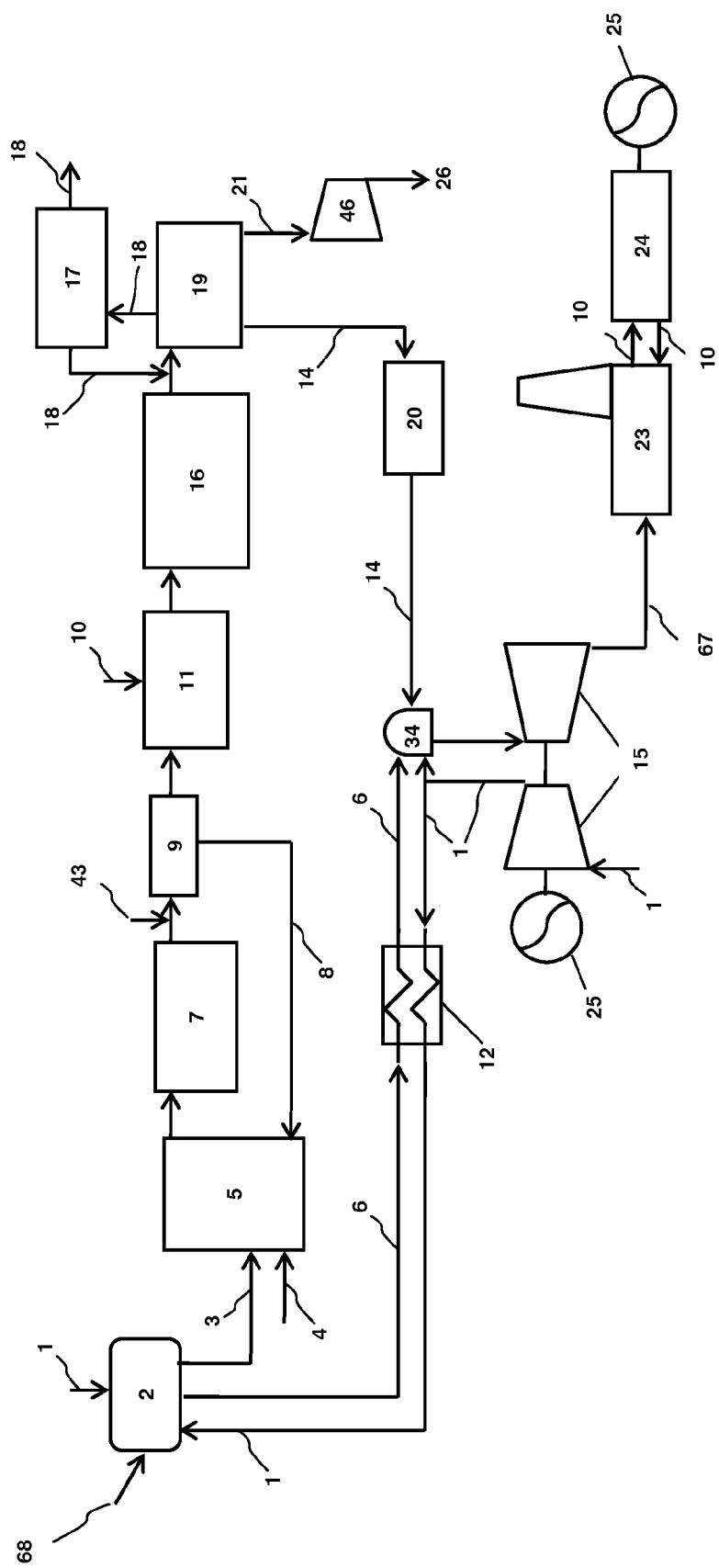
FIG. 1 represents a base gasification system with carbon capture in accordance with embodiments of the present invention.

A base gasification system with carbon capture is represented in FIG. 1. Air (1), such as ambient air and/or bleed air from a compressor of a gas turbine engine, may be supplied into an air input of an air separation unit (2) to create an output of oxygen (3) and nitrogen (6). Bleed air (1) from the gas turbine compressor may pass through a heat exchanger to preheat the nitrogen (6) being delivered to the gas turbine combustor, prior to delivery to the air separation unit (2). The oxygen from the air separation unit may be a substantially pure oxygen perhaps having a purity of between about 95% to about 99%. The oxygen (3) produced from the air separation unit may be connected and perhaps even directed to a gasifier (5) where coal (4) may also be fed perhaps by dry or even slurry feed for gasification processing. In the gasifier, below stoichiometric oxygen to carbon ratios are maintained. The gasifier (5) produces syngas (43) which may be carbon monoxide rich perhaps due to the incomplete combustion of the available carbon to carbon dioxide. The produced syngas may be moved out of the gasifier through a syngas output and into a syngas cooler (7) or perhaps even a syngas quench to cool the syngas and the heat may be recovered by steam. The cooled syngas (43) may then be filtered of particulate matter in a syngas-particulate filter (9) to which the filtered particulate matter (8) may be transferred back to the gasifier. Steam (10) may be added to the cooled syngas to perhaps achieve a ratio of approximately 2.16 $H_2O:CO$. The water may react with the CO in a water gas shift reaction (11), where the hydrogen may be liberated and the CO is converted to $CO_2$. The syngas may then be cooled and delivered to cooler/trace species removal (16) and carbon dioxide-syngas separator (19) and acid gas removal stages. A carbon-dioxide separator (19) may be a syngas cleaner configured to clean the syngas of gaseous species of sulfur and acid gases. In these stages, the impurities in the syngas may be removed to yield a fuel gas (14) that is greater than about 85% (by vol.) of $H_2$ gas. Sulfur (18) from the acid gas removal may be captured by a sulfur recovery system (17). A downstream carbon dioxide supply (21) may be sent through a carbon dioxide compressor (46) and then sent to a pipeline (26) for storage, capture, disposal, or the like. This downstream carbon dioxide supply may not have been recycled in the base system. The fuel gas (14) may be pre-heated in a heater (20) or perhaps even a humidifier before it is delivered to a condenser (34) of a gas turbine combine cycle (15) as fuel. The fuel is combusted with diluting nitrogen (6) gas and water vapor to maintain the turbine inlet temperature. Air (1) delivered to the condenser (34) may be pressurized in the compressor to a pressure ratio of approximately about 17 to about 18.5 or perhaps even greater than about 17. Power may be generated with a generator (25) responsive to the gas turbine (15). Turbine exit fuel gas (67) may be recovered by steam (10) in a heat recovery unit (23) and may be delivered to a steam turbine (24) and generator (25).

As such, embodiments of the present invention may provide an efficient method for coal gasification in which a supply of wet coal (27) is supplied in a coal gasification system assembly. A coal gasification system assembly may be a combined or perhaps even retrofitted system including a base gasification system (68) which may include at least some of the processes shown in FIG. 1 with coal pre-processing system (69).

In a coal pre-processing system, a wet coal may be fed into at least one chamber (28) of the coal gasification system assembly. A chamber may be a pre-process wet coal drying chamber configured to dry the wet coal to create a substantially dried coal (70) perhaps having a coal temperature of up to about 300° F. A substantially dried coal may include but is not limited to a coal which is at least about 90% dry, at least about 91% dry, at least about 92% dry, at least about 93% dry, at least about 94% dry, at least about 95% dry, at least about 96% dry, at least about 97% dry, at least about 98% dry, at least about 99% dry, and about 100% dry. At least one chamber may be a pre-process volatile metal removal chamber (30) where the substantially dried coal may be heated to remove volatile metals to create a volatile metal reduced dried coal perhaps having a coal temperature of up to about 600° F. or perhaps even between about 275° F. and about 600° F. As discussed herein, an example of a volatile metal may include mercury and the present invention may provide removing up to about 87% of mercury from coal in the volatile metal removal chamber (30). Additional mercury may be removed in later processing such as in a coal gasification system assembly which may provide a total mercury removal of up to about 90%. Of course a pre-processing system may remove any amount of mercury including but not limited to between about 50% and about 87%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, about 100%, and the like. In embodiments, a dried coal may be transported from a drying chamber to a separate volatile metal removal chamber. Alternatively, a drying chamber and volatile metal removal chamber may be the same chamber, may be a separate chamber, may be right next to each other, may be a compartmentalized chamber, may be back to back, or the like. In embodiments, a chamber, such as drying chamber or perhaps even a volatile metal removal chamber, may be a fluidized bed, a fluidized dryer bed, a moving bed dryer, a fixed dryer bed, or the like. Use of a fluidized bed may be configured to remove up to about 100% of the moisture of a wet coal in a drying step. The volatile metal reduced dried coal may be cooled in a cooler (31) before it is transferred to other processing. It is noted that a coal pre-processing system (69) as discussed herein may be integrated with other processes such as oxy-combustion system, a coal-based subcritical boiler plant system or the like systems.

A pre-processing system may include pre-process drying wet coal (27) with recycled non-air, perhaps even with a first supply of non-air, with the recycled non-air connected to at least one chamber such as a drying chamber (28). Volatile metals may be removed with recycled non-air, perhaps even with a second supply of non-air, connected to a volatile metal removal chamber. Recycled non-air (78) may include but is not limited to flue gas, inert gas, effluent gas from a separate volatile metal removal chamber, effluent gas from a drying chamber, heated gas, carbon dioxide, recycled gaseous exhaust, nitrogen, steam, any combination thereof, or the like and may be provided by at least one source, at least two sources, or perhaps even a same source or even different sources, or the like combinations. Drying of the wet coal may occur for a first amount of time including but not limited to at least about 2 minutes, up to about 30 minutes, between about 5 minutes and about 30 minutes, between about 8 minutes and 16 minutes, up to about 16 minutes, or the like. Of course, any amount of time to dry may be used and all are meant to be included in this disclosure. Removing volatile metals may occur by heating a dried coal for a second amount of time perhaps after the drying step. A second amount of time may include but is not limited to at least about 2 minutes, up to about 30 minutes, between about 5 minutes and about 30 minutes, between about 8 minutes and 16 minutes, up to about 16 minutes, or the like. Again, any amount of time to dry may be used and all are meant to be included in this disclosure. A recycled non-air may be heated perhaps before and/or during the recycling process and may be heated by a single source or alternatively from at least two sources. A heat source for heating the non-air may include but is not limited to heat from a gasifier, a syngas cooler, gas turbine exhaust, water gas shift reactor, heat recovery steam generator system, any combination thereof, or the like. In embodiments, a heated non-air in an oxy-combustion system or perhaps even in a boiler plant system may include but is not limited to hot gaseous exhaust located in a system from a furnace, a boiler convective pass, a downstream flue gas location, or the like.

Figures 2A, 2B:
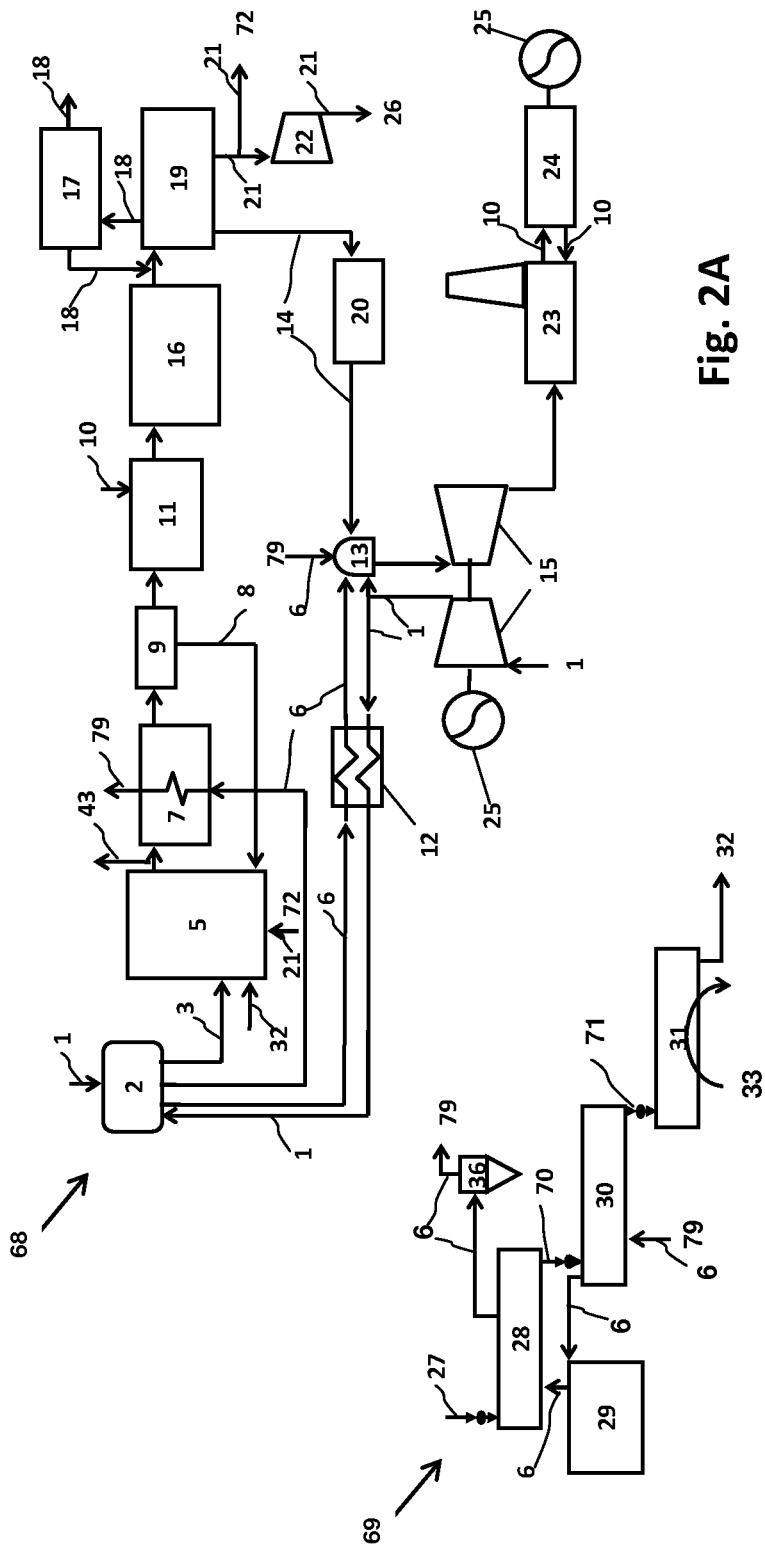
FIGS. 2A and 2B represent an example of a coal pre-process system integrated with a gasification system in accordance with embodiments of the present invention.

In embodiments, a pre-process system may include generating a volatile metal effluent gas stream from a volatile metal removal chamber and perhaps even directing the effluent gas stream from a volatile metal removal chamber (30) to a drying chamber (28) and using the effluent gas stream to dry the coal in the drying chamber. This may be accomplished by connecting a volatile metal effluent gas stream output to a drying chamber such as by non-limited example only as shown in FIG. 2B where effluent nitrogen (6) is directed from the volatile metal removal chamber (30) to the drying chamber (28). A volatile metal effluent gas stream may include but is not limited to nitrogen, carbon dioxide, steam, gaseous exhaust, any combination thereof, or the like.

Integrating the coal pre-processing system with a gasification system, the pre-processed coal (32) such as the volatile metal reduced dried coal may be transferred to a gasifier (5) perhaps even to a volatile metal reduced dried coal gasifier input as understood in FIGS. 2A-8B. A gasifier (5) may be capable of creating or perhaps even producing a syngas (43) from a volatile metal reduced coal and may have a syngas output as understood from FIGS. 2B-8B. The syngas may be cooled by a syngas cooler (7), filtered from particulate matter perhaps with a syngas-particulate filter (9) connected to a syngas cooler, and may even be processed to separate carbon dioxide from the syngas perhaps with a carbon dioxide separator (19) to create a fuel gas (14) which may include a turbine fuel gas supply and a downstream carbon dioxide supply (21). At least some if not all of the downstream carbon dioxide supply may be recirculated back into at least part of the coal gasification system with perhaps a gasification system assembly downstream carbon dioxide supply recirculator (72). This recirculation may be an efficient way to optimize the system and use waste gas and perhaps even the waste heat from the supply back into the system assembly.

Figure 21:
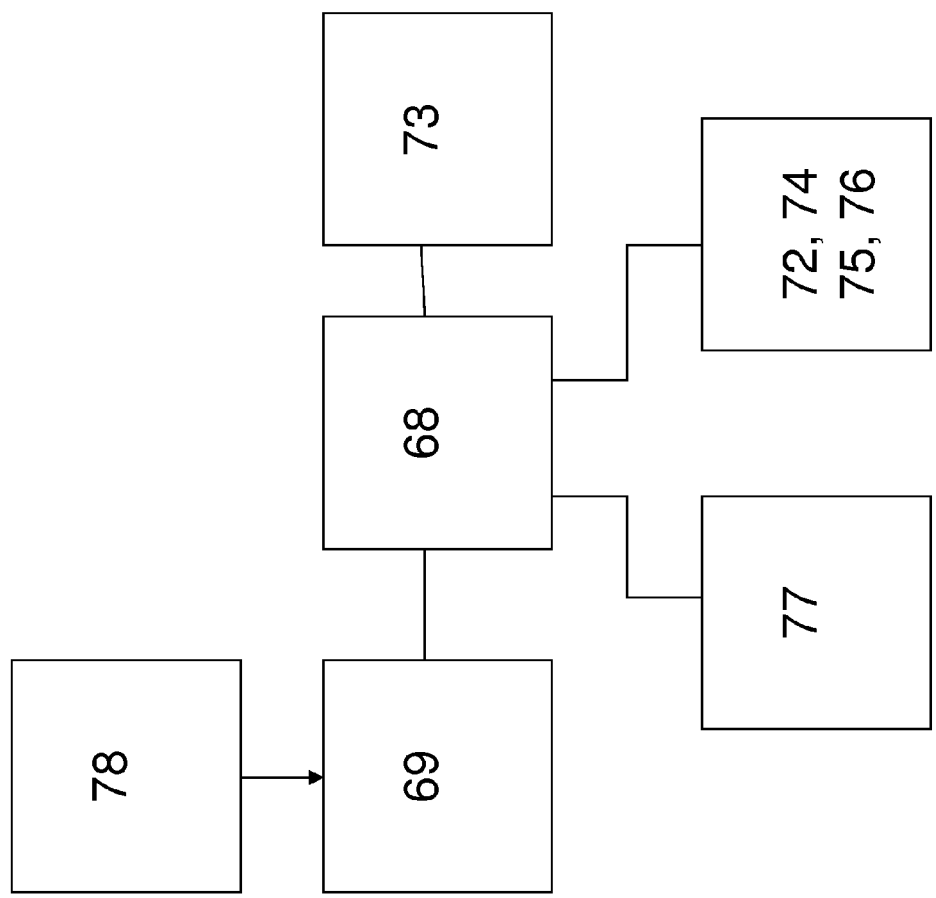
FIG. 21 represents a schematic example of alternative embodiments integrated in a gasification system assembly.

The fuel gas supply may be used to produce electricity with a generator (25) responsive to at least one turbine (15) as discussed above. Alternatively, the fuel gas supply may be used to produce chemical with a chemical producer (73). The downstream carbon dioxide may be heated perhaps with carbon dioxide heater such as but not limited to a heat exchanger (12), heat exchangers in the syngas cooler, water-gas-shift reactor, syngas cleanup system, gas turbine, heat recovery steam generator system, any combination thereof, or the like, and the carbon dioxide may even be directed back to at least part of the coal gasification system assembly. As will be discussed in more detail below, recirculating carbon dioxide back into at least part of a coal gasification system may include but is not limited to circulating the carbon dioxide to at least one chamber, a drying chamber, a volatile metal removal chamber, a particulate separation device, a barrier filter, a cyclone, a gasifier, coal transport system, a water-gas-shift reactor, a syngas cleanup system, a gas turbine, a heat recovery steam generator system, a syngas cooler, or the like. As shown in FIG. 21, the downstream carbon dioxide may be used as a gasification reactant (74) in the gasification system assembly so that it may perhaps react in gasification reactions, it may be used as a heat carrier (75) in the gasification system assembly, it may be used as a coal transporter (76) in the gasification system assembly, any combination thereof, or the like uses.

Further efficiencies in a coal gasification system assembly may include recirculating nitrogen (6) within the system assembly with perhaps a gasification system assembly nitrogen recirculator (77). Nitrogen (6) perhaps as generated from the air separation unit (1) may be recirculated to at least part of the coal gasification system assembly including but not limited to at least one chamber, a drying chamber, a volatile metal removal chamber, a high temperature volatile metals scrubber, a particulate separation device, barrier filter, a cyclone, a gas turbine, and any combination thereof, or the like. Nitrogen may be heated perhaps with a nitrogen heater such as a heat exchanger (12) or the like and may even be heated to between about 500° F. and about 900° F. in embodiments. Heat exchangers (12) may include but are not limited to a syngas cooler, a high temperature volatile metals scrubber, a water gas shift reactor, syngas cleanup system, gas turbine, heat recovery steam generator system, and any combination thereof, or the like.

In FIGS. 2A and 2B, a non-limiting example of a coal gasification system assembly is shown combining a coal pre-processing system (69) of FIG. 2B with a base gasification system (68) of FIG. 2A. As shown, downstream carbon dioxide (21) exiting from the carbon dioxide-syngas separator (19) may be recirculated (72) back into the system to a gasifier (5). Nitrogen (6) from an air separation unit may be used in the system by heating it in a syngas cooler (7) and recirculated (79) to a volatile metal removal chamber (30). Effluent nitrogen gas (6) from the volatile metal removal chamber may be circulated from the volatile metal removal chamber and into drying chamber (28) perhaps even circulating to a volatile metal scrubber (29) first. An effluent nitrogen gas (6) may be circulated from the drying chamber into a cyclone and then perhaps recirculated (79) into a combustor (13).

Figures 3A, 3B:
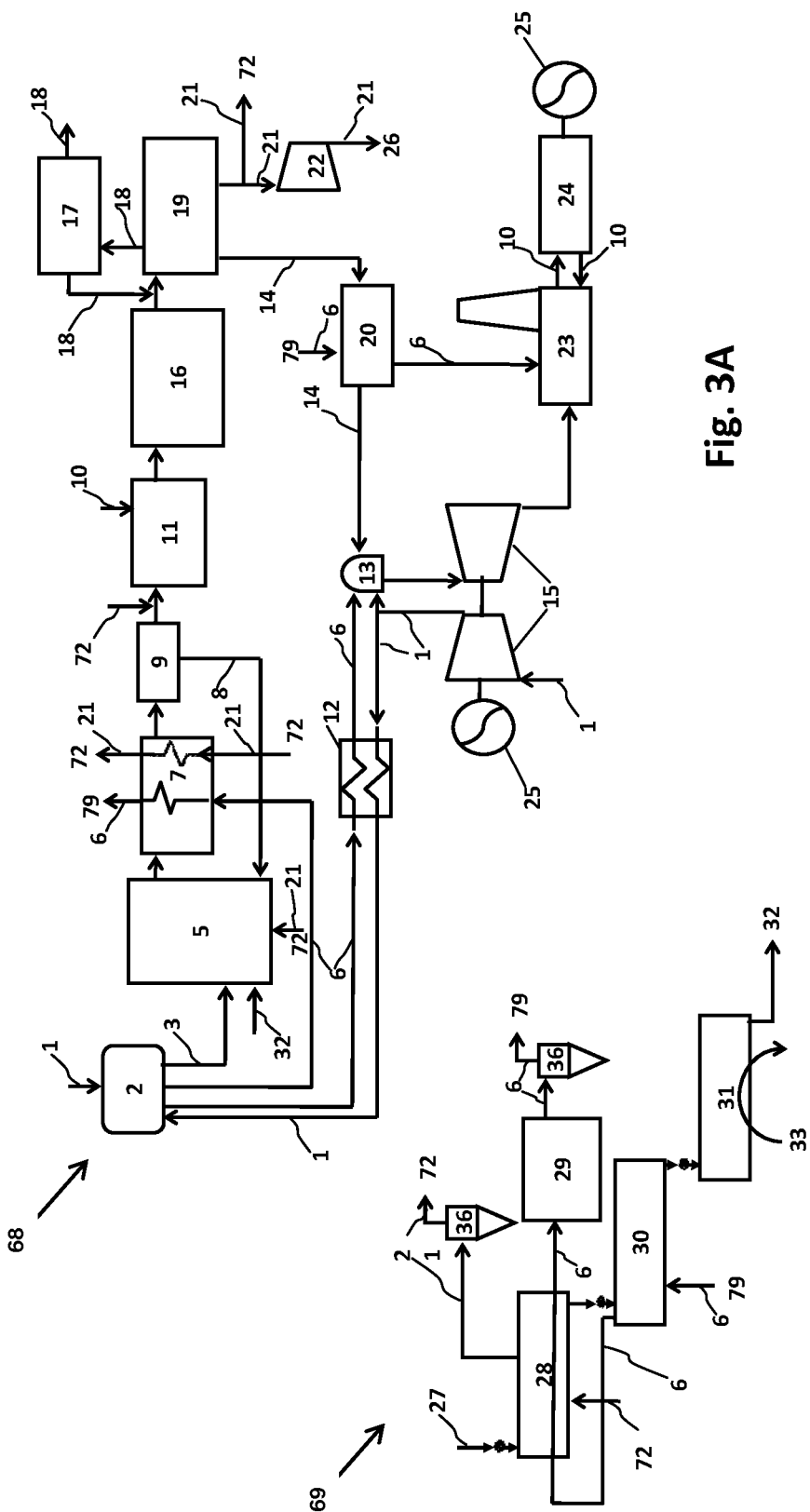
FIGS. 3A and 3B represent an alternative example of a coal pre-process system integrated with a gasification system in accordance with embodiments of the present invention.

In FIGS. 3A and 3B, an alternative non-limiting example of a coal gasification system assembly is shown combining a coal pre-processing system (69) of FIG. 3B with a base gasification system (68) of FIG. 3A. Downstream carbon dioxide (21) exiting from the carbon dioxide-syngas separator (19) may be recirculated perhaps with perhaps a downstream recycled carbon dioxide recirculator (72) to a syngas cooler (79) perhaps to be heated, to a gasifier (5) perhaps to act as a reactant in the system, and perhaps even to a drying chamber (28) perhaps to dry coal where effluent carbon dioxide gas exiting the drying chamber (28) may be processed through a cyclone (36) and circulated back into the gasification system to be mixed with syngas entering a water-gas-shift (11) process. It is noted that carbon dioxide (21) may be recirculated in other systems such as but not limited to oxy-combustion, power plant systems, or the like. The carbon dioxide in these systems may be recirculated as a heat carrier, perhaps to a boiler assembly or the like. Nitrogen (6) from an air separation unit may be recirculated to a syngas cooler (7) perhaps to be heated and recirculated (79) to a volatile metal removal chamber (30) where an effluent nitrogen gas may exit the volatile metal removal chamber, pass through a drying chamber (28), a volatile metal scrubber (29) and perhaps even a cyclone (36) before being recirculated (79) into a reheater (20) perhaps with a fuel gas.

FIGS. 4A and 4B shows an alternative non-limiting example of a coal gasification system assembly combining a coal pre-processing system (69) of FIG. 4B with a base gasification system (68) of FIG. 4A. This example shows recirculated (72) downstream carbon dioxide (21) in the same fashion as explained for FIGS. 3A and 3B. Recirculation (79) of nitrogen (6) is similar to FIGS. 3A and 3B except that the nitrogen (6) may first pass through a water gas shift (11) process perhaps for heating instead of a syngas cooler (7).

Figures 5A, 5B:
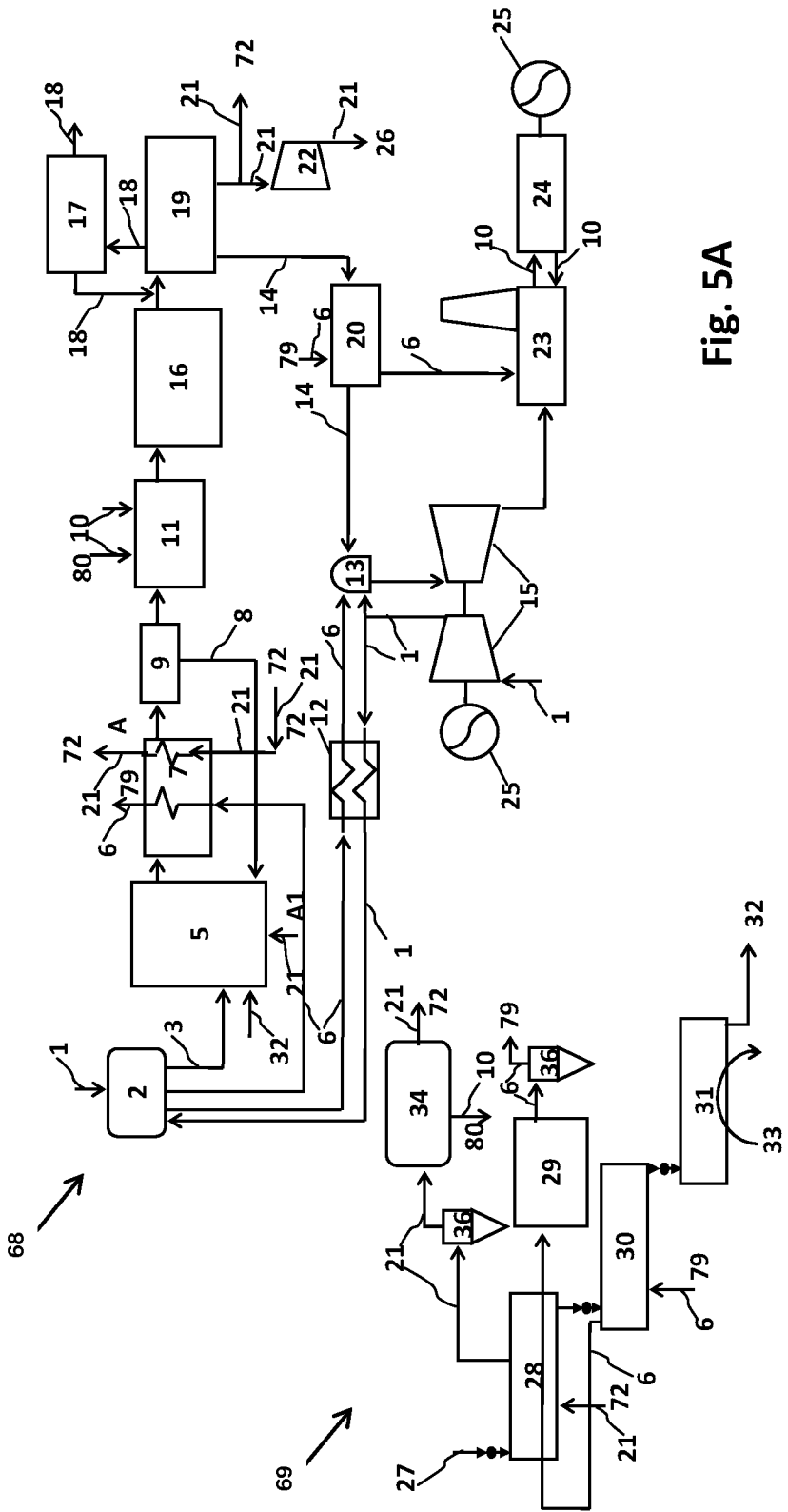
FIGS. 5A and 5B represent an alternative example of a coal pre-process system integrated with a gasification system in accordance with embodiments of the present invention.

FIGS. 5A and 5B shows an alternative example non-limiting of a coal gasification system assembly combining a coal pre-processing system (69) of FIG. 5B with a base gasification system (68) of FIG. 5A. Downstream carbon dioxide (21) exiting from the carbon dioxide-syngas separator (19) may be recirculated (72) to a syngas cooler (7) perhaps to be heated which may then be recirculated (72) to a drying chamber (28). Effluent nitrogen gas (21) may exit the drying chamber and directed to a cyclone (36) and a condenser (34) where it may then be recirculated to back into a syngas cooler (7). Steam (10) from the condenser (34) may be recirculated (80) to a water-gas-shift (11) process. Nitrogen (6) from an air separation unit may be recirculated to a syngas cooler (7) perhaps to be heated and then recirculated (79) to a volatile metal removal chamber (30) where an effluent nitrogen gas may exit the volatile metal removal chamber, pass through a drying chamber (28), a volatile metal scrubber (29) and perhaps even a cyclone (36) before being recirculated (79) into a reheater (20) perhaps with a fuel gas.

Figures 6A, 6B:
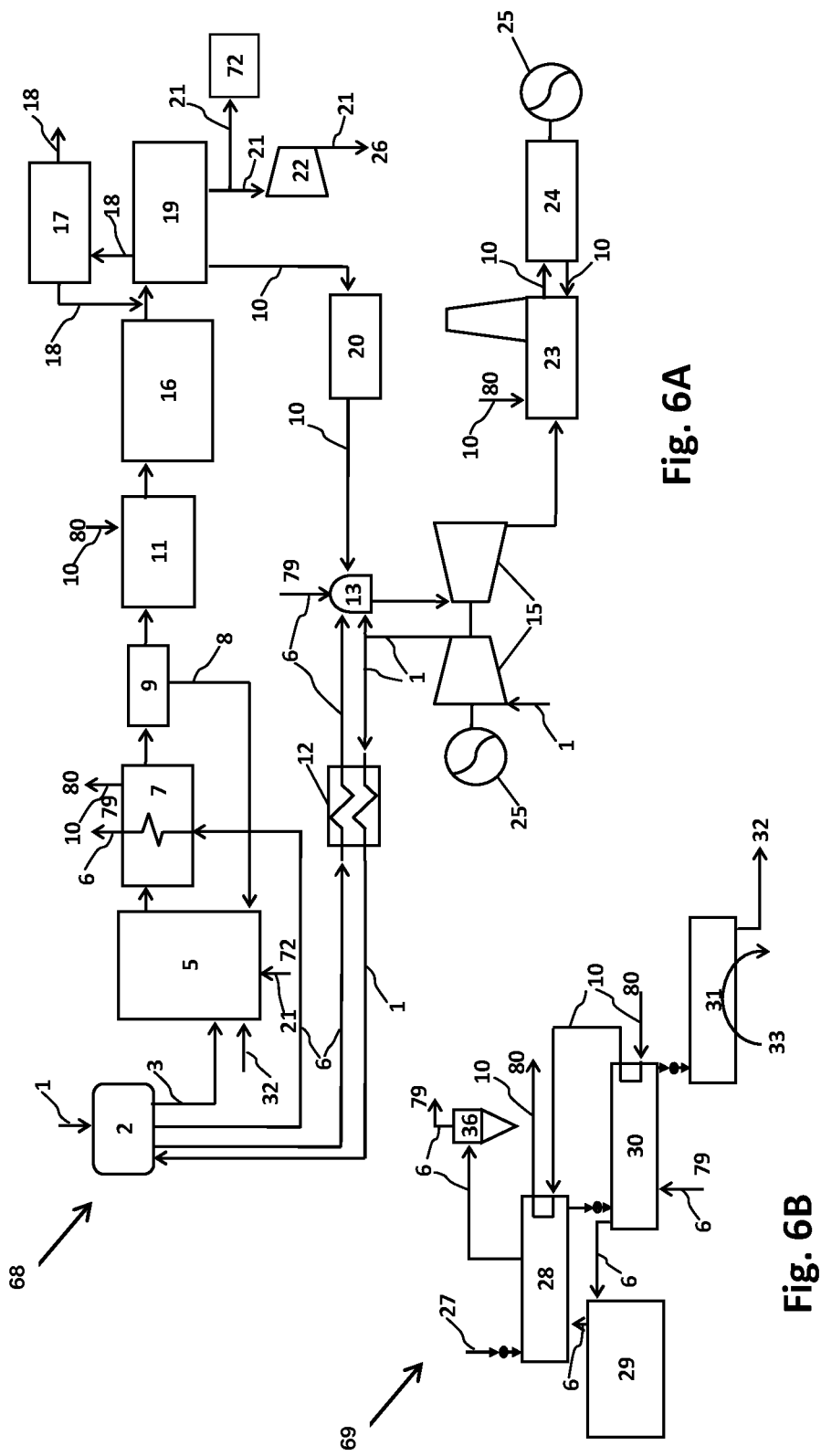
FIGS. 6A and 6B represent an alternative example of a coal pre-process system integrated with a gasification system in accordance with embodiments of the present invention.

FIGS. 6A and 6B shows an alternative non-limiting example of a coal gasification system assembly combining a coal pre-processing system (69) of FIG. 6B with a base gasification system (68) of FIG. 6A. Nitrogen (6) from an air separation unit may be recirculated to a syngas cooler (7) perhaps to be heated and then recirculated (79) to a volatile metal removal chamber (30) where an effluent nitrogen gas may exit the volatile metal removal chamber, pass through a volatile metal scrubber (29), a drying chamber (28), and perhaps even a cyclone (36) before being recirculated (79) into a combustor (13). Steam (10) may be generated from a syngas cooler (7) and may be recirculated (80) into a volatile metal removal chamber (30), a drying chamber (28), and perhaps even a heat recovery unit (23). Steam (10) may also be recirculated (80) into a water gas shift (11) process.

Figures 7A, 7B:
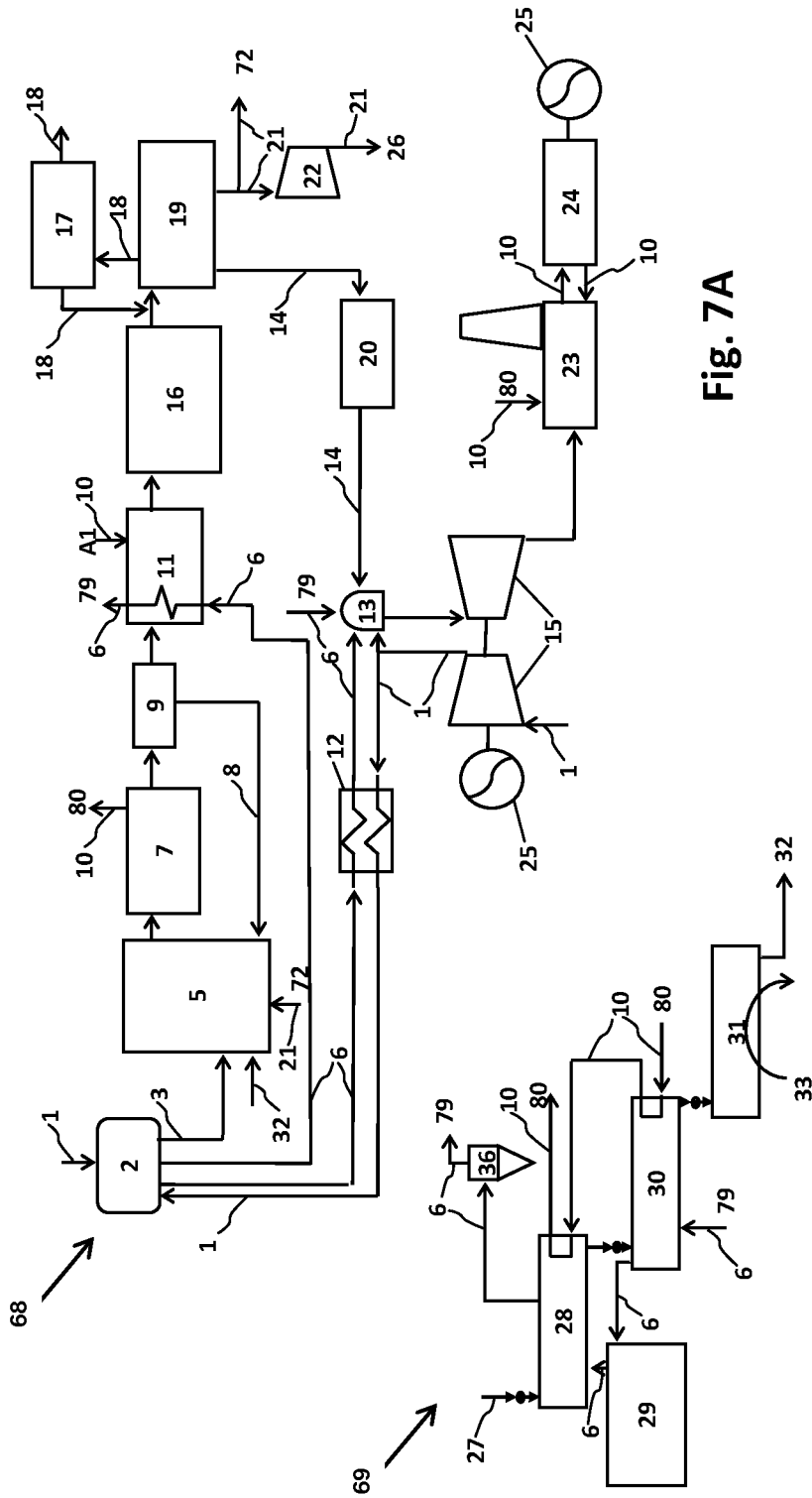
FIGS. 7A and 7B represent an alternative example of a coal pre-process system integrated with a gasification system in accordance with embodiments of the present invention.

FIGS. 7A and 7B shows an alternative non-limiting example of a coal gasification system assembly combining a coal pre-processing system (69) of FIG. 7B with a base gasification system (68) of FIG. 7A. This example shows recirculated (72) downstream carbon dioxide (21), recirculated (79) nitrogen (6), and recirculated (80) steam (10) in almost the same fashion as explained for FIGS. 6A and 6B except the nitrogen (6) may be heated in a water gas shift (11) and then recirculated.

Figures 8A, 8B:
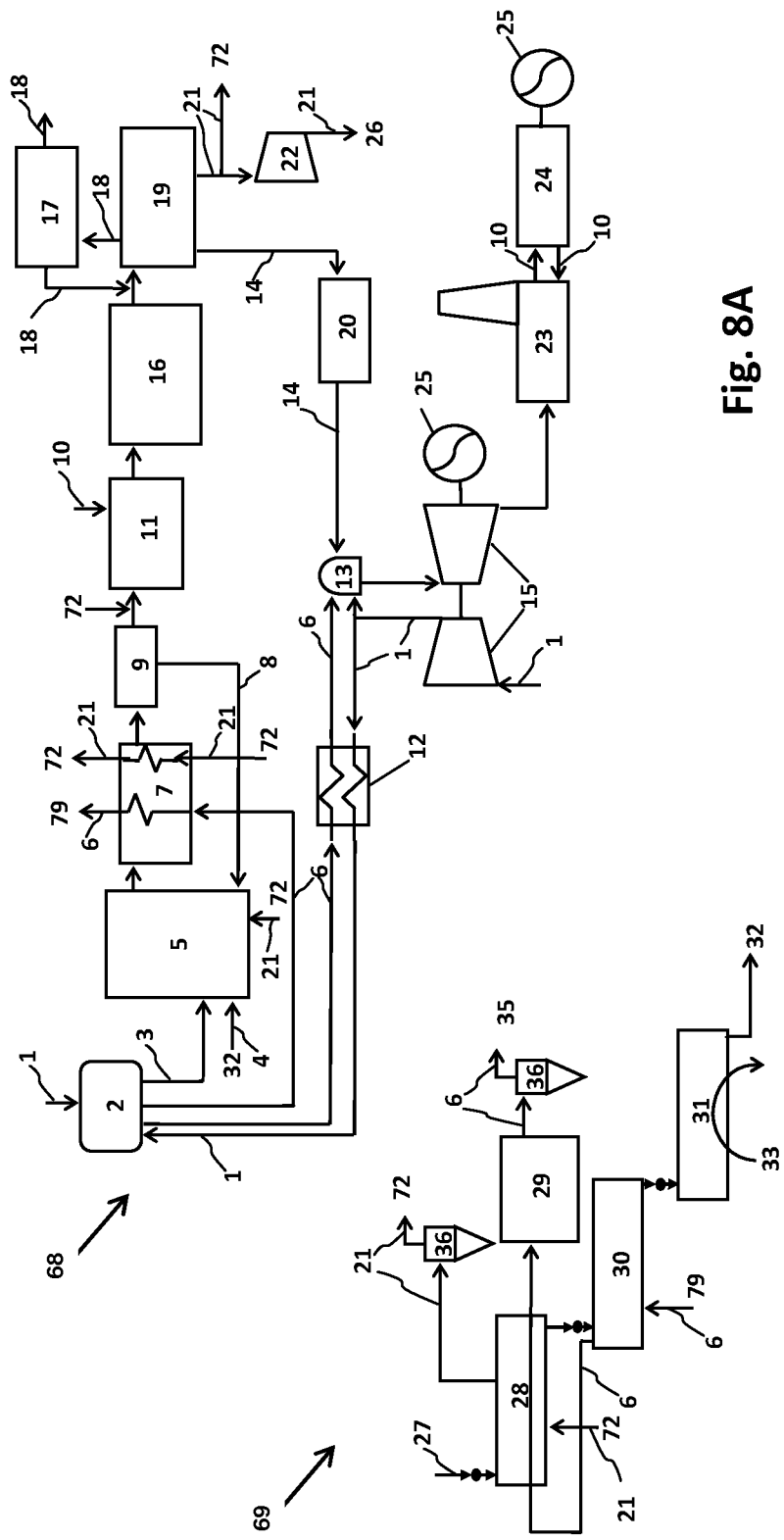
FIGS. 8A and 8B represent an alternative example of a coal pre-process system integrated with a gasification system in accordance with embodiments of the present invention.

FIGS. 8A and 8B shows an alternative non-limiting example of a coal gasification system assembly combining a coal pre-processing system (69) of FIG. 8B with a base gasification system (68) of FIG. 8A. This example shows recirculated (72) downstream carbon dioxide (21) the same as described for FIGS. 3A and 3B. Nitrogen (6) from an air separation unit may be recirculated to a syngas cooler (7) perhaps to be heated and then recirculated (79) to a volatile metal removal chamber (30) where an effluent nitrogen (6) gas may exit the volatile metal removal chamber, pass through a drying chamber (28), a volatile metal scrubber (29), a cyclone (36) where it may then be vented (35) out of the system.

Figure 9:
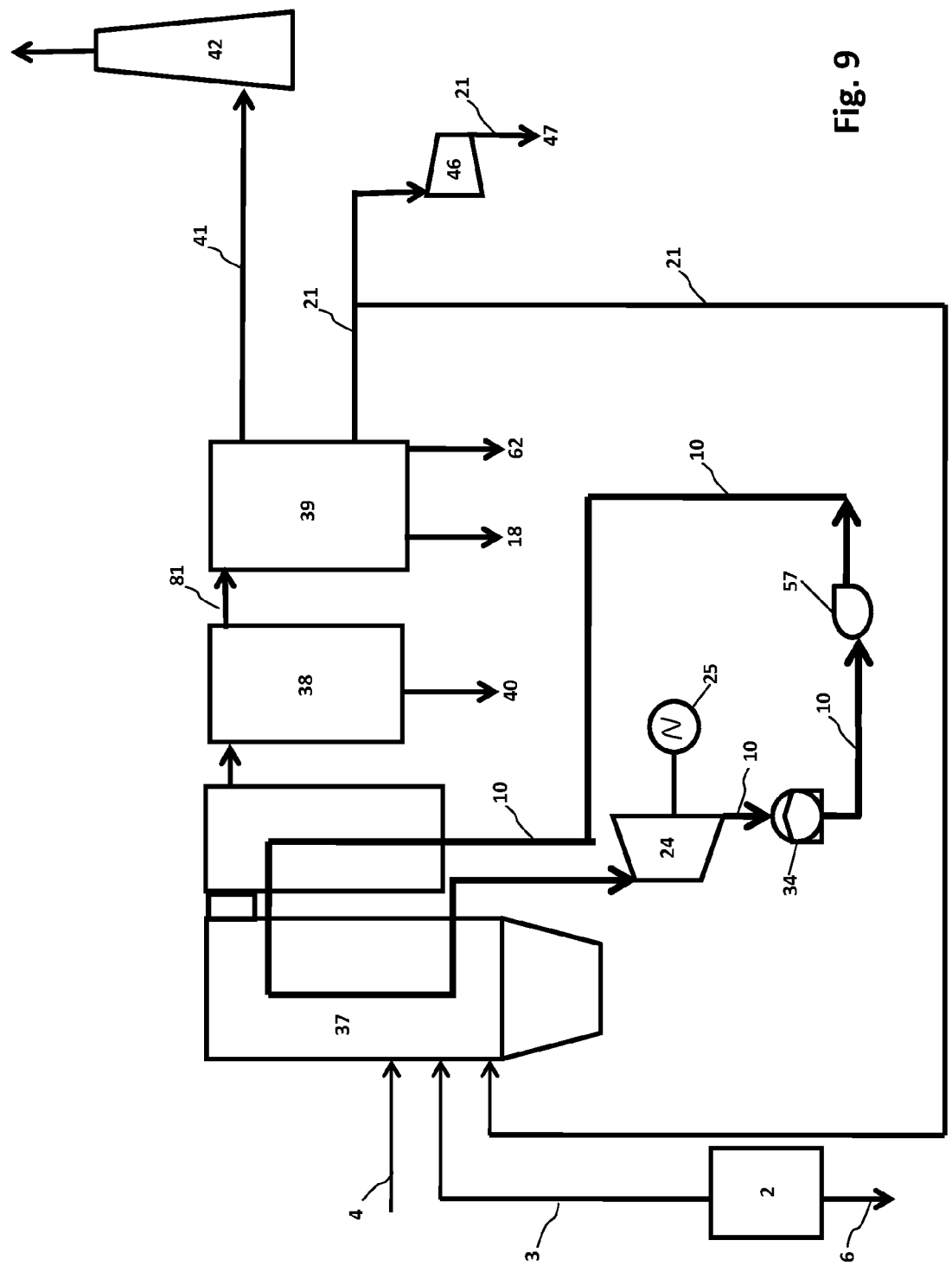
FIG. 9 represents a basic coal-based oxy-combustion system in accordance with embodiments of the present invention.

Embodiments of the present invention may provide an efficient system for an oxy-combustion technology and may include a unique integration of a coal pre-processing system (69) with oxy-combustion perhaps using nitrogen as a working media. FIG. 9 represents a basic coal-based oxy-combustion system where coal (4) may be combusted, such as with oxygen-fired combustion, in a boiler assembly (37). A boiler assembly may include but is not limited to multi-fuel burner, a pulverized coal furnace, a fluidized bed combustor, stoker furnace, any combination thereof, or the like. Oxygen (3), such as substantially pure oxygen, perhaps from an air separation unit (2) and carbon dioxide (21) may be supplied into a boiler assembly (37) for the combustion processing. The oxygen stream may provide a combustion oxidant to the boiler assembly. Nitrogen (6), such as substantially pure nitrogen, generated in an air separation unit may not be used in a basic coal-based oxy-combustion system and may be used in other systems or may even be sold as a commodity product. Steam (10) generated from the boiler assembly (37) may be cycled to drive a turbine (24) such as a steam turbine. At least one generator (25) may be responsive to a turbine (24) and may produce electricity. Steam leaving the turbine may be recycled through a condenser (34) and perhaps even a blower (57) and sent back into a boiler assembly (37). Gaseous exhaust and remaining particulate from the boiler assembly may be cleaned (38) perhaps filtering out ash (40). Gaseous exhaust (81) may be conditioned (39) perhaps filtering out sulfur (18), water (62), residual gases (41) and carbon dioxide (21). Residual gases (41) may be released through a stack (42). Carbon dioxide may be processed in a carbon dioxide compressor (46) which may then be sent to a carbon dioxide sequestration (47). At least some of the carbon dioxide from the gas conditioning (39) may be recirculated into the boiler assembly (37).

Embodiments of the present invention may provide efficiencies to the oxy-combustion process and may even integrate a coal pre-processing system to the oxy-combustion process. Efficiency of the process may lie in the use of nitrogen from the air separation unit that may be considered as waste in other technologies which may be used within an oxy-combustion system assembly (82). The integrated system may minimize energy consumption that directly relates to the cost of electricity ("COE").

The present invention may provide, in embodiments, an efficient method for oxy-combustion processing comprising the steps of supplying wet coal in an oxy-combustion system assembly; feeding said wet coal into at least one chamber of said oxy-combustion system assembly; pre-process drying said wet coal in said at least one chamber to create a substantially dried coal having a coal temperature of up to about 300° F.; pre-process removing volatile metals from said substantially dried coal in said at least one chamber to create a volatile metal reduced dried coal having a coal temperature of up to about 600° F.; cooling said volatile metal reduced dried coal; transferring said volatile metal reduced dried coal to a boiler assembly; oxygen-fired combusting said volatile metal reduced dried coal in said boiler assembly; producing a gaseous exhaust composed predominantly of carbon dioxide and water from said boiler assembly; heating boiler water in said boiler assembly with heat from said combusted volatile metal reduced dried coal to create steam; driving a turbine with said steam; and perhaps even driving at least one generator responsive to said turbine with said steam to produce electricity. Other embodiments may include an efficient oxy-combustion electricity generating system comprising a supply of wet coal; a pre-process wet coal drying chamber of an oxy-combustion system assembly configured to dry said wet coal to create a substantially dried coal having a coal temperature of up to about 300° F.; a wet coal input location in said pre-process coal drying chamber of said oxy-combustion system assembly; a pre-process volatile metal removal chamber of said oxy-combustion system assembly configured to heat said substantially dried coal to create a volatile metal reduced dried coal having a coal temperature of up to about 600° F.; a volatile metal reduced dried coal cooler configured to cool said volatile metal reduced dried coal after processing in said pre-process volatile metal removal chamber; a volatile metal reduced dried coal boiler input; an oxygen-fired combustor of a boiler system assembly; a predominantly carbon dioxide and water gaseous exhaust output of said boiler assembly; a turbine responsive to steam generated from said boiler assembly; and perhaps even an electricity producing generator responsive to said turbine.

Figure 10:
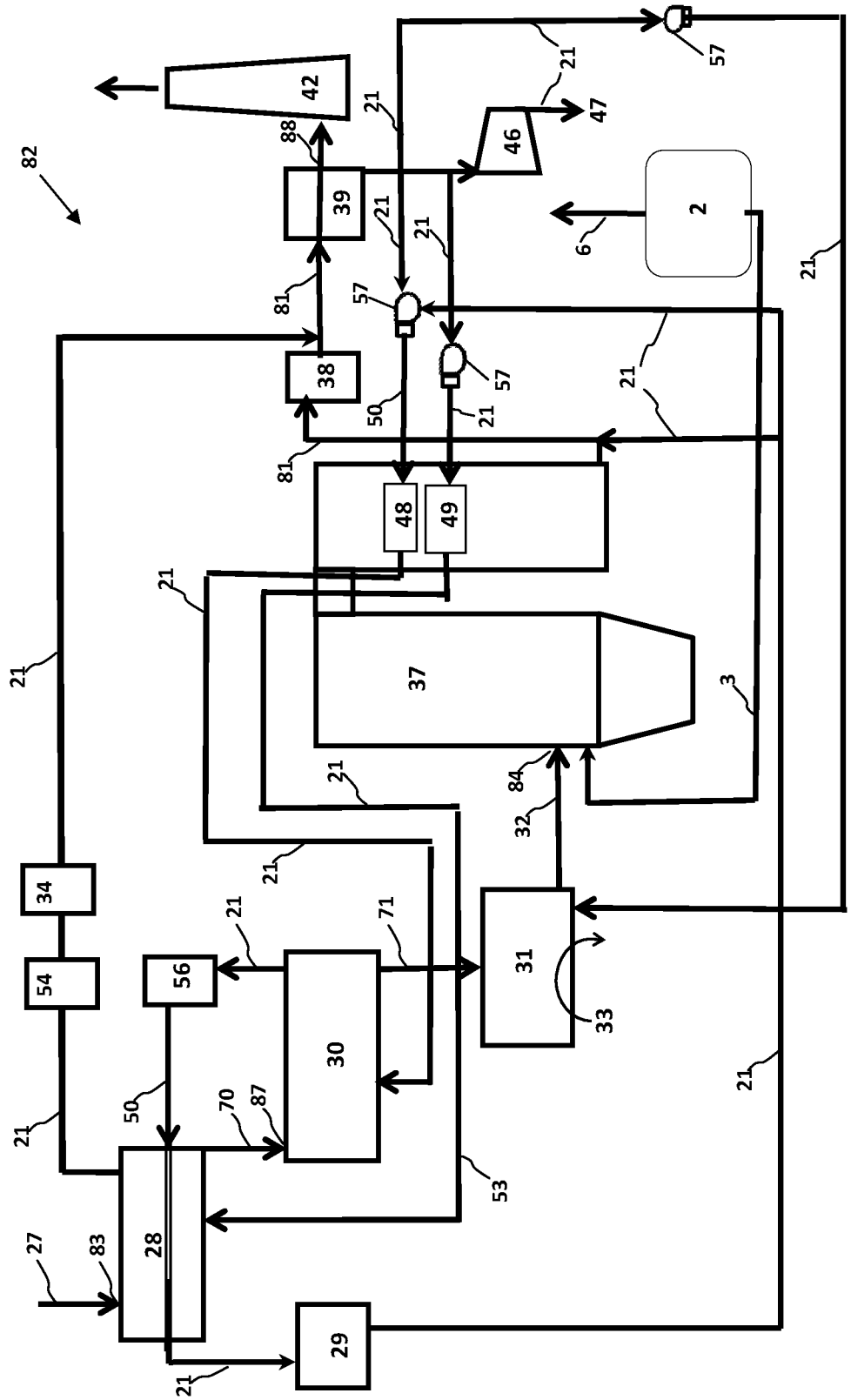
FIG. 10 represents an example of a coal pre-process system integrated with an oxy-combustion system in accordance with embodiments of the present invention.
Figure 22:
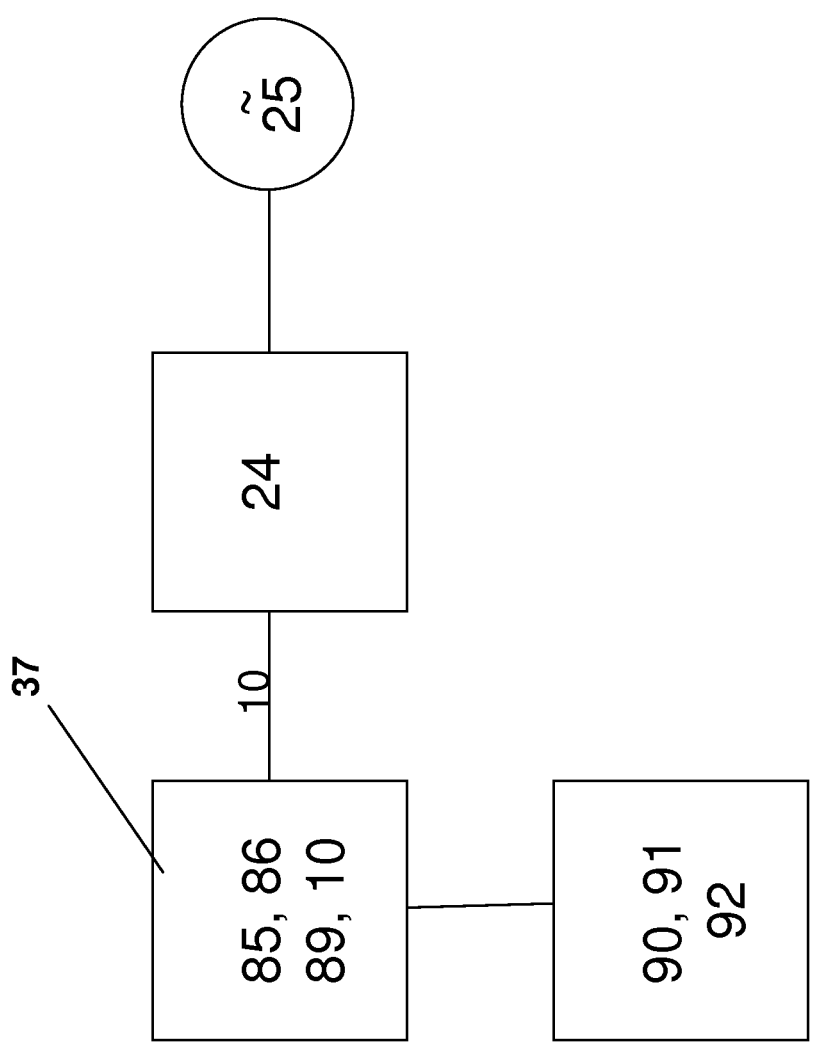
FIG. 22 represents a schematic example of alternative embodiments integrated in an oxy-combustion system assembly.

FIG. 10 represents a non-limiting example of an integrated coal pre-processing system (69) with an oxy-combustion system to create an oxy-combustion system assembly (82). Wet coal (27) may be supplied to a drying chamber (28) perhaps at a wet coal input location (83) so that the wet coal may be pre-process dried to create a substantially dried coal (70). The substantially dried coal (70) may be transferred to a volatile metal removal chamber (30) such as perhaps a pre-process volatile removal chamber via a dried coal input location (87) to create a volatile metal reduced dried coal (71). The volatile metal reduced dried coal (71) may be cooled to perhaps less than about 300° F. or perhaps even between about 150° F. to about 250° F. in a volatile metal reduced dried coal cooler (31) perhaps the cooling may be achieved by boiler feedwater (33) and then the coal may be transferred to a boiler assembly thereafter perhaps even to a volatile metal reduced dried coal boiler input (84). For example, coal may be transferred to a boiler assembly with a recycled gas such as but not limited to recycled flue gas, recycled gaseous exhaust, or the like. The boiler assembly may provide oxygen-fired combusting of the volatile metal reduced dried coal perhaps with an oxygen-fired combustor (85) located in the boiler assembly (37). In a boiler assembly, boiler water (86) may be heated with the combusted volatile metal reduced dried coal to create steam (10) which may be used to drive a turbine (24) and perhaps even at least one generator (25) responsive to the turbine such as represented in FIG. 22. Gaseous exhaust (81) composed of predominantly carbon dioxide and water and may have some particulate and perhaps even some other matter therein, may be outputted from a boiler assembly. The gaseous exhaust (81) may be processed in a particulate cleanup (38) process to remove the particulate and perhaps even in a carbon dioxide purifier (39) to separate out the carbon dioxide. The remaining non-carbon dioxide gases (88) from the carbon dioxide purifier may be released through a stack (42). Carbon dioxide may be recirculated back into the system perhaps even to a coal cooler (31) where carbon dioxide gas may be used to transport fuel to a burner of a boiler system, may be used to transport coal to boiler system, or the like. At least some of the carbon dioxide may be compressed (46) and sequestered (47) as discussed above. Carbon dioxide (21) may be recirculated perhaps even in two separate streams, into a heat exchanger (48, 49) or perhaps into two heat exchanges as shown in FIG. 10. One of the carbon dioxide (21) gas streams may be heated and recycled to a volatile metal removal chamber to perhaps assist in the removal of any volatile metals from the coal. An effluent carbon dioxide (21) stream may exit the volatile metal removal chamber and be filtered of particulate such as perhaps in a particulate removal (56) system and then may even be recirculated to a drying chamber (28) to assist in drying the coal. An effluent carbon dioxide (21) stream may exit a coal dryer, may be processed in a volatile metal scrubber (29) which may include a volatile metal adsorber to perhaps remove any volatile metals and then the carbon dioxide (21) may be recirculated back to a blower (57) to perhaps be pushed into a heat exchanger (48) for reheating. A second carbon dioxide (21) stream may be heated by a heat exchanger (49) and may be recirculated to a drying chamber to dry the coal. It is noted that while carbon dioxide may be recirculated within an oxy-combustion system assembly, any inert gas may be used including but not limited to a recycled gaseous exhaust and all are meant to be included in this disclosure.

Alternatively, carbon dioxide (21) of an oxy-combustion system assembly (or perhaps even in a power plant system assembly) may be: used to temper heat in a boiler assembly, temper a combustion temperature of a furnace of a boiler assembly; may be used as a heat transfer element (91) in an oxy-combustion system assembly to perhaps transfer heat from a gaseous exhaust (81) to another part of the system such as but not limited to at least one chamber for a pre-process drying step or a pre-process removing volatile metals step or both, a pre-process wet coal drying chamber, a pre-process volatile metal removal chamber, any combination thereof, or the like; and may be blended with at least one inert gas; or the like.

Figure 11:
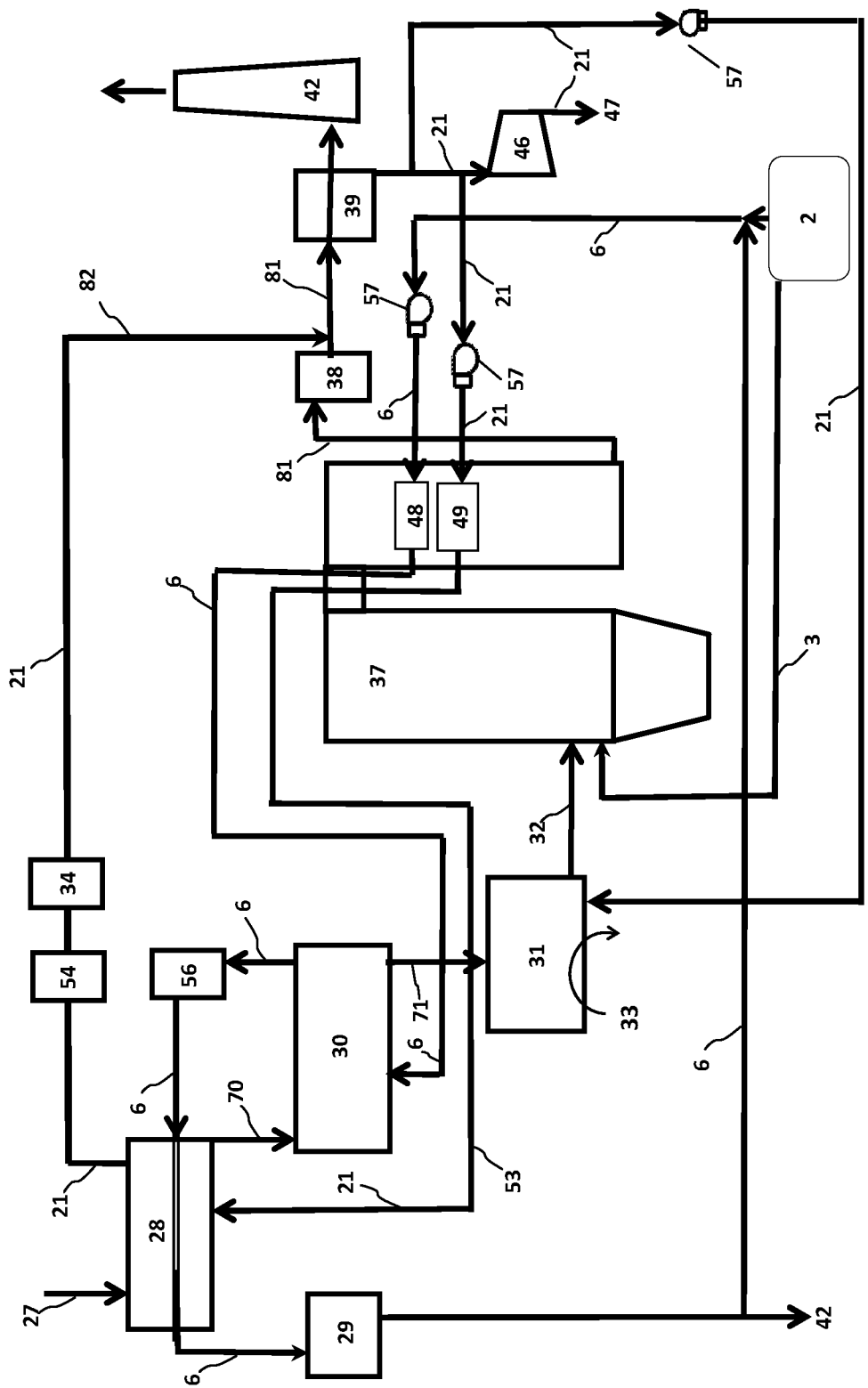
FIG. 11 represents an alternative example of a coal pre-process system integrated with an oxy-combustion system in accordance with embodiments of the present invention.

FIG. 11 represents a non-limiting example of an alterative embodiment of an integrated coal pre-processing system (69) with an oxy-combustion system to create an oxy-combustion system assembly (82). In this embodiment, nitrogen (6) perhaps originating from an air separation unit (2) may be recycled or perhaps even recirculated within the oxy-combustion system assembly (82) perhaps even with a recycled nitrogen recirculator (90) as understood in FIG. 22. As compared with FIG. 10, the nitrogen (6) from the air separation unit may be directed to a blower (57) and perhaps even heated with a heat exchanger (49) which may include any type of heated recycled nitrogen recirculator. The heated nitrogen (6) may be recirculated to a volatile metal removal chamber (30) to perhaps heat the coal to remove any volatile metals. An effluent nitrogen gas may exit the volatile metal removal chamber and may be processed in a particulate removal (56), circulated to a drying chamber, processed in a volatile metal scrubber (29) and perhaps even recirculated back into the nitrogen stream exiting an air separation unit (2) for further processing. Nitrogen gas may also be removed by a stack (42).

In embodiments, recycled nitrogen may be recycled and perhaps even used in different parts of an oxy-combustion system assembly including but not limited to a volatile metal removal chamber, a drying chamber, to remove moisture from effluent streams from at least one chambers, to remove water from said gaseous exhaust, to cool said gaseous exhaust, to carry heat to a volatile metal removal chamber, to heat to a drying chamber, to sweep out evolved volatile metals, to cool hot coal, any combination thereof, or the like. Alternatively, nitrogen may be used as a heat transfer element (91) to perhaps heat transfer heat from a gaseous exhaust (81) to another part of the system such as but not limited to at least one chamber for a pre-process drying step or a pre-process removing volatile metals step or both, a pre-process wet coal drying chamber, a pre-process volatile metal removal chamber, any combination thereof, or the like. In other embodiments, nitrogen may be used as a moisture scavenger (92) to perhaps scavenge moisture from a gaseous exhaust (81).

The present invention may provide, in embodiments, utilizing a turbine (24), for example, a gas fired turbine, in an oxy-combustion system assembly to perhaps produce at least a portion of station power for the system. A gas fired turbine may include but is not limited to a single gas cycle and a combined steam and gas cycles.

Figure 12:
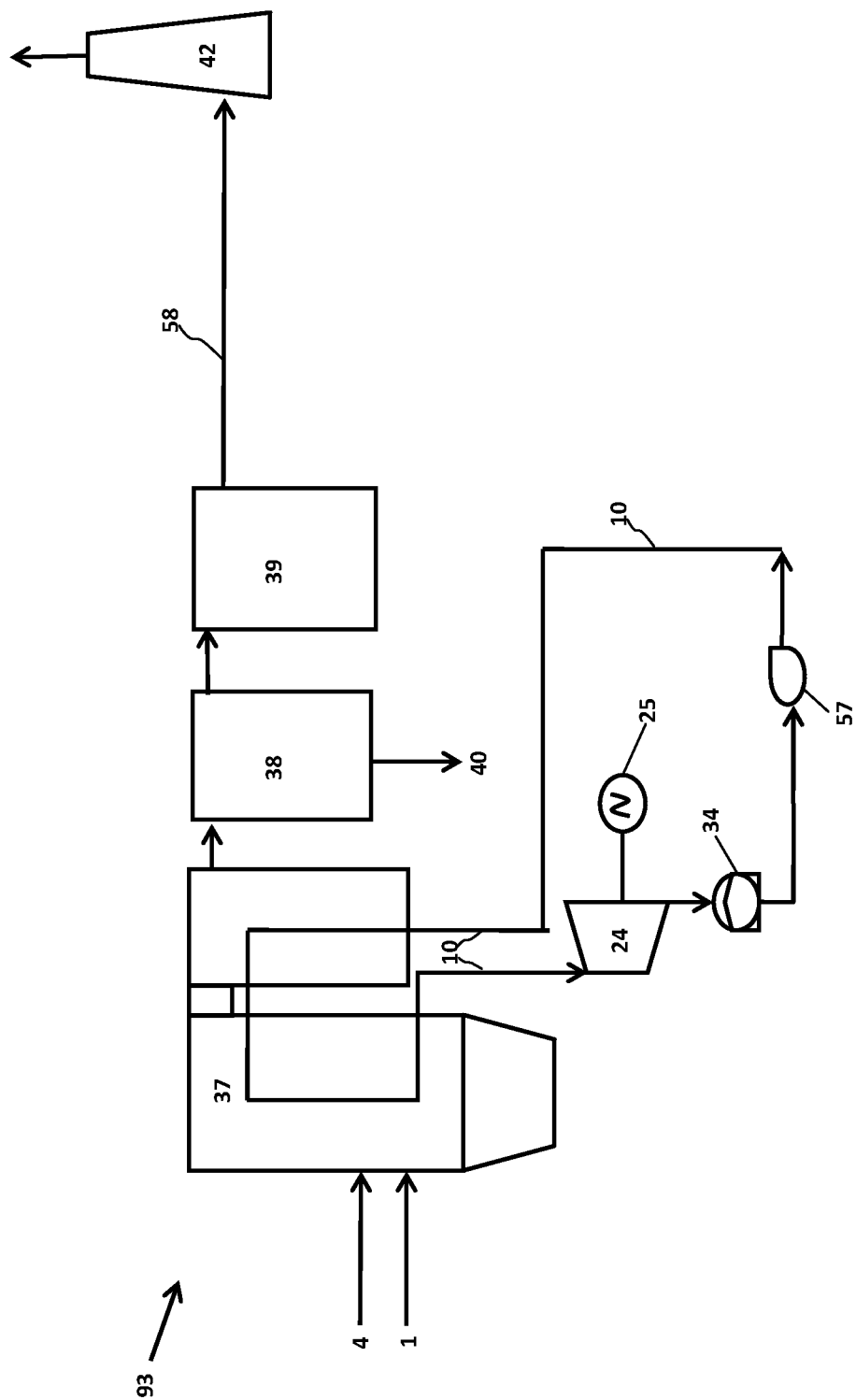
FIG. 12 represents a basic coal-based subcritical boiler plant in accordance with embodiments of the present invention.

For the conventional PC boiler systems, including subcritical as well as supercritical, and the like boilers, the present invention, in embodiments, provides an integrated system including a pre-processing system into a boiler plant application. A basic coal-based subcritical boiler plant system is represented in FIG. 12. Air (1) and coal (4) may be fed to a boiler assembly (37) where the coal may be air fired combusted to heat boiler water (86) to create steam (10). Steam (10) may be cycled to drive a turbine (24) such as a steam turbine and at least one generator (25) may be responsive to the turbine to produce electricity. Steam (10) leaving a turbine (24) may be recycled in a condenser (34) and perhaps even a blower (57) and recirculated back into a boiler assembly (37). Gaseous exhaust and remaining particulate from the boiler assembly may be cleaned in a particulate cleanup (38) perhaps filtering out the ash (40). Gaseous exhaust (58) may be conditioned in a gas cleaning step (39) and the remaining gaseous exhaust may be released through a stack (42).

Embodiments of the present invention may provide efficiencies to the boiler system process and may even integrate a coal pre-processing system (69) to a boiler system process (93). Accordingly, the present invention may provide, in embodiments, an efficient method for generating electricity in a power plant facility comprising the steps of supplying wet coal in a power plant system assembly; feeding said wet coal into at least one chamber of said power plant system assembly; recycling a first supply of recycled non-air to said at least one chamber; pre-process drying said wet coal with said first supply of recycled non-air in said at least one chamber for a first amount of time to create a substantially dried coal having a coal temperature of up to about 300° F.; recycling a second supply of recycled non-air to said substantially dried coal; pre-process removing volatile metals from said substantially dried coal with said second supply of recycled non-air for a second amount of time to create a volatile metal reduced dried coal having a coal temperature up to about 600° F.; cooling said volatile metal reduced dried coal; transferring said volatile metal reduced dried coal to a boiler assembly; air fired combusting said volatile metal reduced dried coal in said boiler assembly; producing a gaseous exhaust composed predominantly of carbon dioxide and nitrogen from said boiler assembly; heating boiler water in said boiler assembly with heat from said combusted volatile metal reduced dried coal to create steam; driving a turbine with said steam; and perhaps even driving at least one generator responsive to said turbine with said steam to produce electricity. Other embodiments may include an efficient power plant electricity generating system comprising a supply of wet coal; a pre-process wet coal drying chamber of a power plant system assembly configured to dry said wet coal to create a substantially dried coal having a coal temperature of up to about 300° F.; a wet coal input location in said pre-process wet coal drying chamber of said power plant system assembly; a pre-process volatile metal removal chamber of said power plant system assembly configured to heat said substantially dried coal to create a volatile metal reduced dried coal having a coal temperature up to about 600° F.; at least one source of power plant recycled non-air connected to said pre-process wet coal drying chamber and said pre-process volatile metal removal chamber; a volatile metal reduced dried coal cooler configured to cool said coal after process in said pre-process volatile metal removal chamber; a transport of said volatile metal reduced dried coal to a boiler system assembly; an air fired combustor of said boiler system assembly; a predominantly carbon dioxide and nitrogen gaseous exhaust output from said boiler assembly; a turbine responsive to steam from said boiler assembly; and perhaps even an electricity producing generator responsive to said turbine.

Figures 13A, 13B:
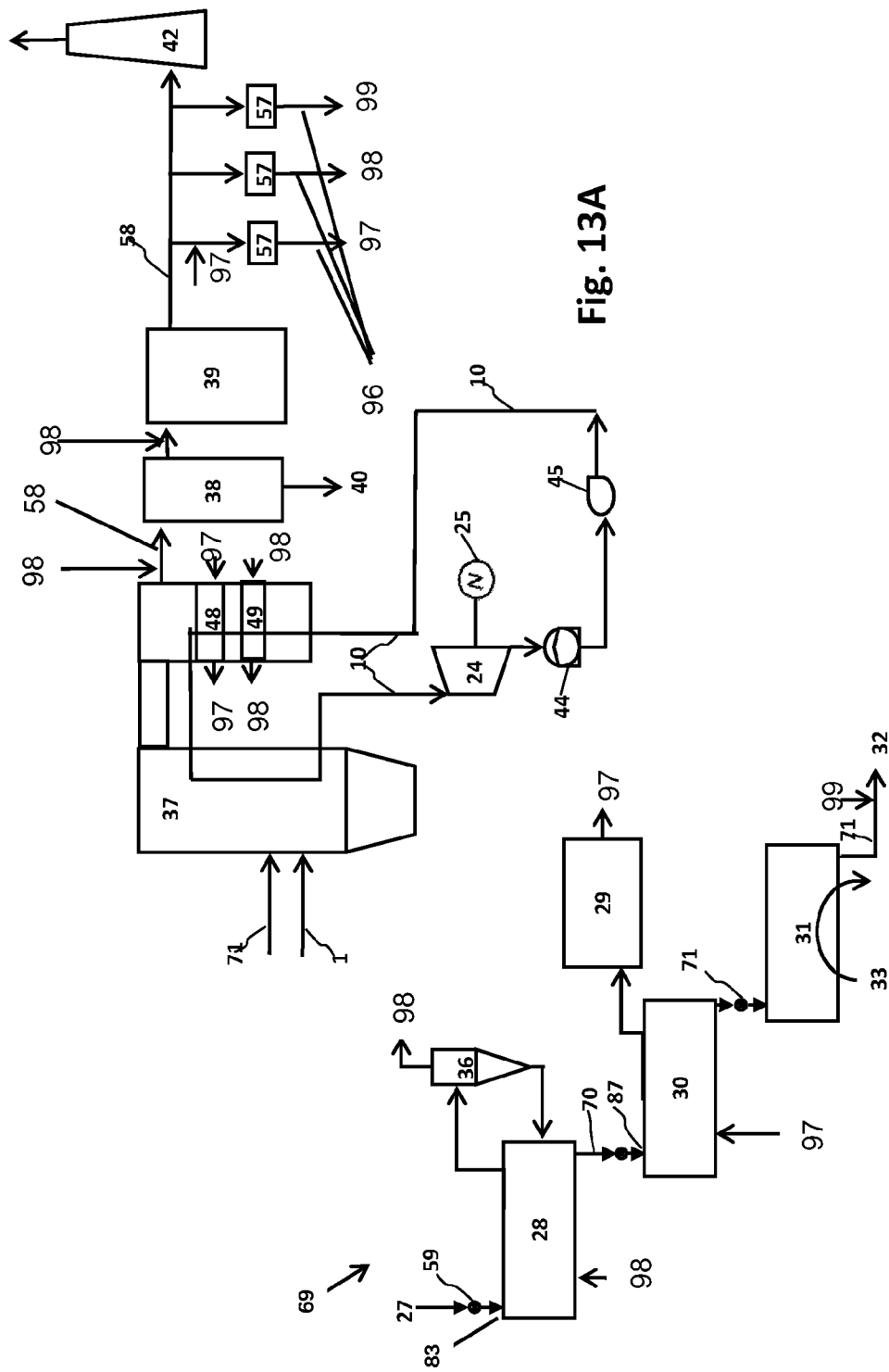
FIG. 13 represents an example of a coal pre-process system integrated with coal-based subcritical boiler plant in accordance with embodiments of the present invention.
Figure 23:
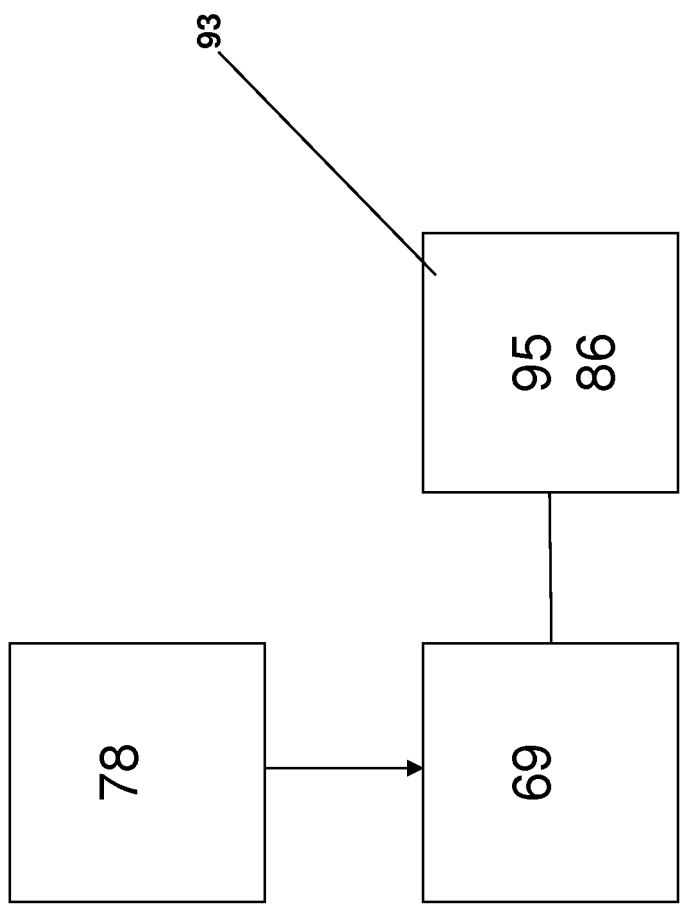

FIG. 13 represents a non-limiting example of an integrated pre-processing system (69) with a boiler plant system to create a power plant system assembly (94). Wet coal (27) may be supplied to a drying chamber (28) perhaps at a wet coal input location (83) so that the wet coal may be pre-process dried to create a substantially dried coal (70). Recycled non-air (78) may be connected to the drying chamber and/or the volatile metal removal chamber as perhaps a first supply and even a second supply from at least one source within the system as described herein. The substantially dried coal (70) may be transferred to a volatile metal removal chamber (30) via a dried coal input location (87) to create a volatile metal reduced dried coal (71). The volatile metal reduced dried coal (71) may be cooled in a volatile metal reduced dried coal cooler (31) perhaps the cooling may be achieved by boiler feedwater (33) and then the coal may be transferred perhaps via a transport (32) to a boiler assembly (37). In the boiler assembly, the volatile metal reduced dried coal (71) and air (1) may be air fired combusted perhaps with an air fired combustor (95) to create a gaseous exhaust (58) composed predominantly of carbon dioxide and nitrogen. The produced gaseous exhaust may include purifying a gaseous exhaust to create substantially pure carbon dioxide such as perhaps having a purity of greater than about 90% or that meets or even exceeds compression, transportation, and even sequestration specifications. In a boiler assembly, boiler water (86) may be heated with the combusted volatile metal reduced dried coal to create steam (10) which may be used to drive a turbine (24) and perhaps even at least one generator (25) responsive to the turbine such as represented in FIGS. 13A and 23. Gaseous exhaust (58) composed predominantly of carbon dioxide and nitrogen may have some particulate and perhaps even some other matter therein. The gaseous exhaust (58) may be processed in a particulate cleanup (38) process to remove the particulate and perhaps even in a gas cleaner (39). The gaseous exhaust (58) may then be recirculated back into the power plant system assembly or perhaps even the gaseous exhaust may be released to a stack (42). A gaseous exhaust stream may include but is not limited to an inert gas, nitrogen, carbon dioxide or the like gas. In embodiments, the present invention may increase the efficiency of a power plant assembly to a power output including but not limited to about 1%, up to about 5%, up to about 10%, or the like and may even provide a reduction in the cost of electricity by a percentage of about 5%, up to about 5%, up to about 10%, up to about 25%, or the like as compared to a conventional carbon capture power plant without a pre-processing system. Nitric oxide or nitrogen dioxide gas emissions may be reduced by between about 10% to about 45%, perhaps even between about 15% and about 42% as compared to systems without a drying step in certain embodiments.

As the non-limiting example of FIGS. 13A and 13B shows, a gaseous exhaust (58) may be split into at least two, at least three, at least four or more recycled gaseous exhaust streams (96) which may be each passed through a blower (57) and recycled or perhaps even recirculated back into the system. For example, one gaseous exhaust stream may be recirculated (97) to a heat exchanger (48) then into a volatile metal removal chamber (30) where an effluent from the volatile metal removal chamber may move to a volatile metal scrubber (29) and may even be recirculated (97) to a blower (57), and the like. A second gaseous exhaust stream may be recirculated (98) to a blower (57), a heat exchanger (49), a drying chamber (28), to a cyclone (36), and perhaps even to a gaseous exhaust exiting from a boiler assembly to a particulate cleanup (38). A third gaseous exhaust stream (96) may be recirculated (99) to a blower and to a volatile metal reduced dried coal supply to perhaps help transport the volatile metal reduced dried coal to a boiler assembly.

Figures 15A, 15B:
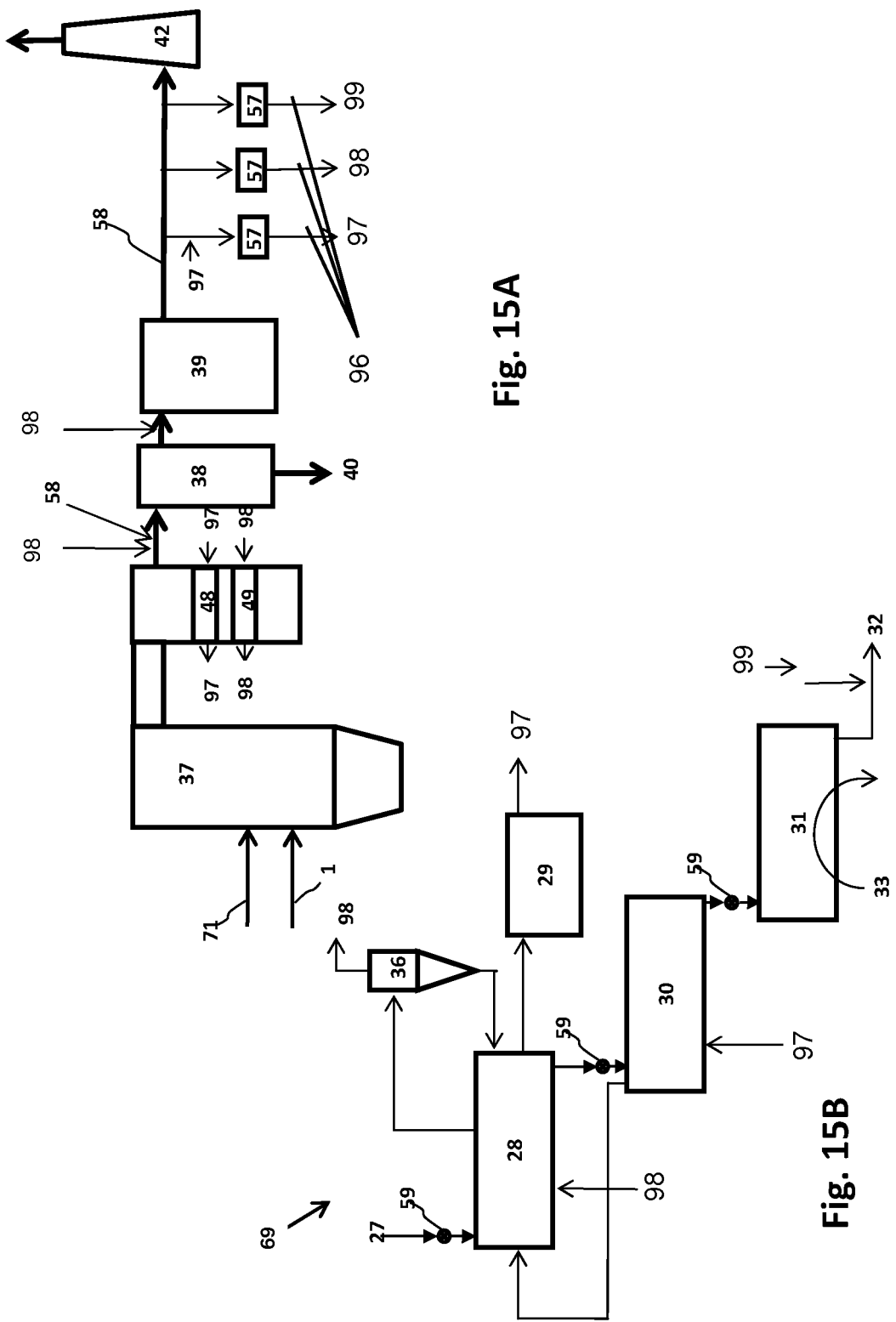
FIG. 15 represents an example of a coal pre-process system integrated with coal-based subcritical boiler plant in accordance with embodiments of the present invention.
Figure 16:
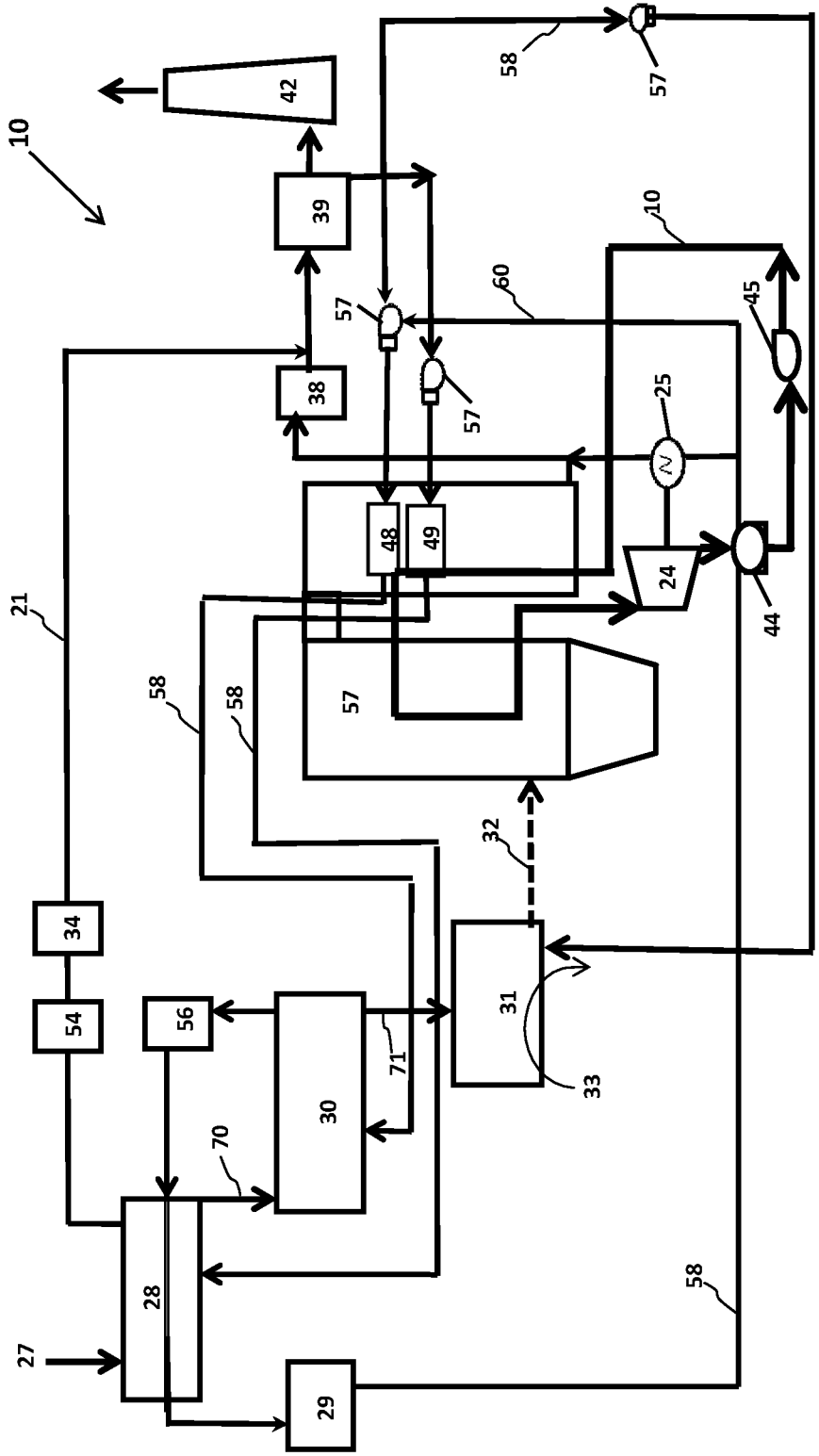
FIG. 16 represents an example of a coal pre-process system integrated with coal-based subcritical boiler plant in accordance with embodiments of the present invention.

FIGS. 14A and 14B show an alternative non-limiting example of recirculation of an exhaust stream may be used within a power plant system assembly. It is noted that a supplemental inert gas (100) may be used in the system as shown in FIG. 14A. FIGS. 15A, 15B, and 16 show an alternative non-limiting example of recirculation of an exhaust stream may be used within a power plant system assembly.

As mentioned above, FIG. 17 shows a non-limiting example of a coal pre-processing system (69) using recycled flue gas or perhaps even recycled exhaust gas in the pre-processing system. A single gas stream (65) from another system, such as from a gasification, oxy-combustion, or power plant system may be recycled into the pre-processing system and may enter the pre-processing system at source (101) and may exit the pre-processing system at exit (102). A gas stream may include nitrogen, carbon dioxide, flue gas, gaseous exhaust, or the like as described herein. A gas may be reused within a plant or perhaps recycled in a closed loop. Gas stream (65) may be heated perhaps by a single source and any heat remaining in a gas stream perhaps after volatile metals removal may be considered new waste heat source for the drying step. A gas stream (65) may be processed through a high temperature volatile metals scrubber before the drying step. Heat perhaps remaining in coal, from a volatile metals removal chamber (30) may be recovered as pre-heat for a steam turbine generator feedwater or the like.

Figure 18:
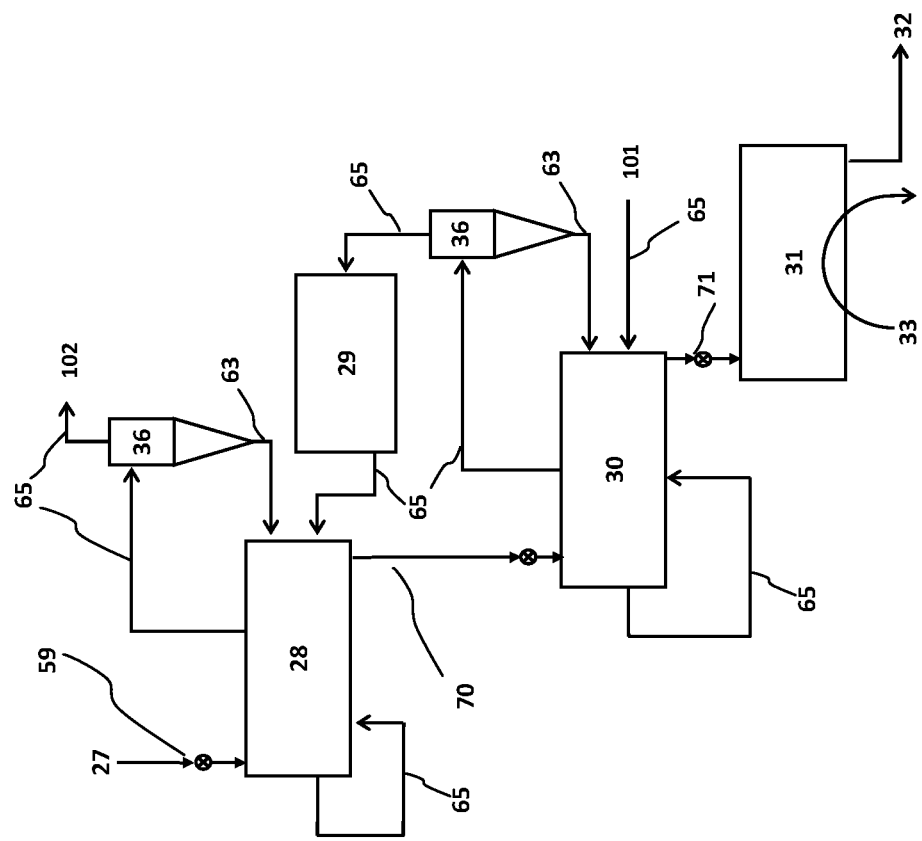
FIG. 18 represents an alternative example of a coal pre-process system having a single heat source and a single gas stream in accordance with embodiments of the present invention.
Figure 19:
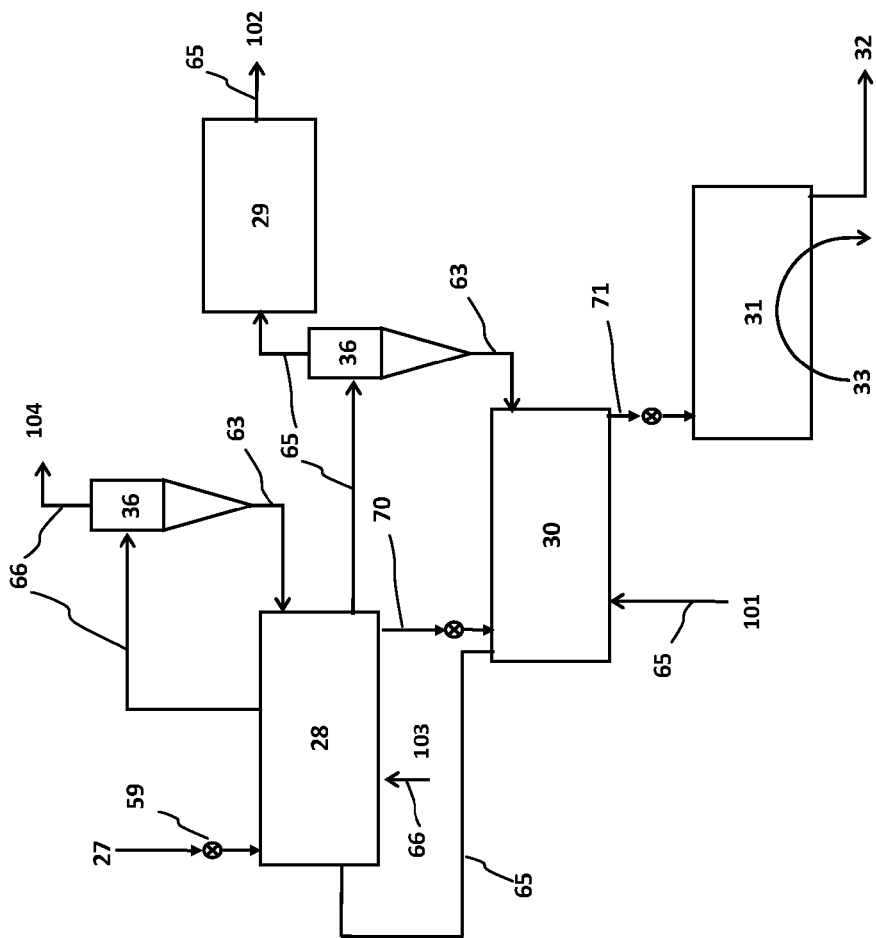
FIG. 19 represents an alternative example of a coal pre-process system having two or more heat sources and two gas streams in accordance with embodiments of the present invention.
Figure 20:
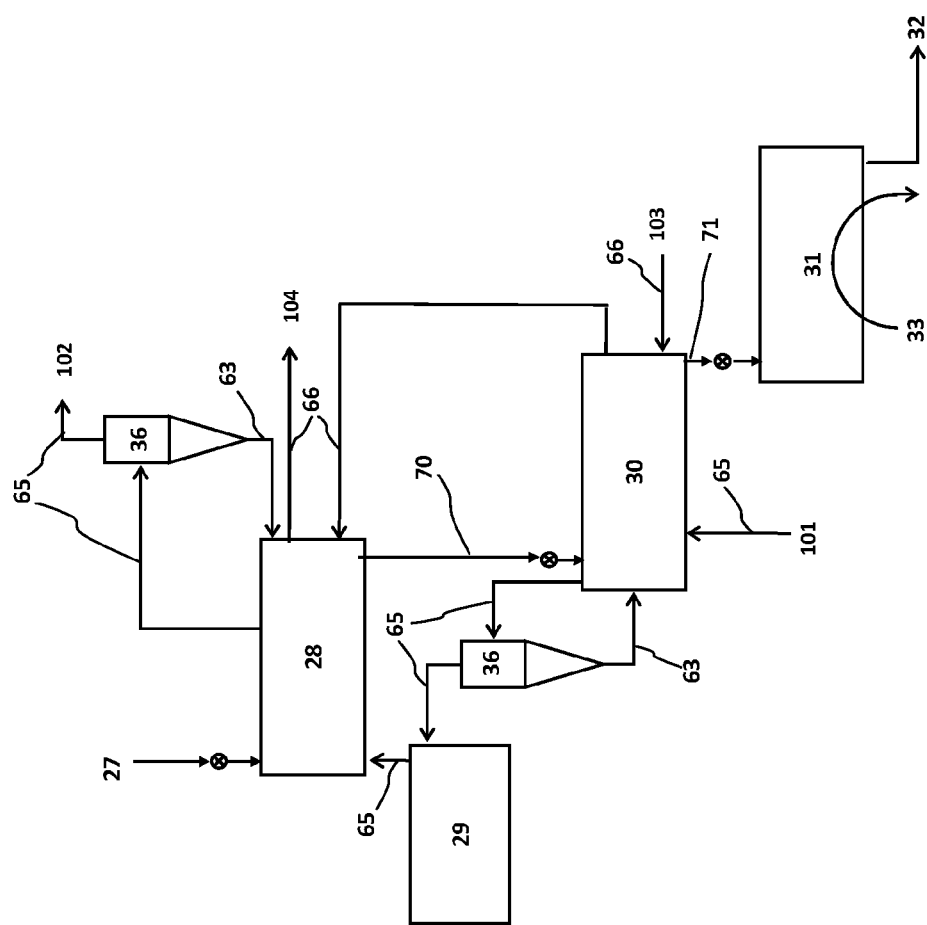
FIG. 20 represents an alternative example of a coal pre-process system having two or more heat sources and two fluid streams in accordance with embodiments of the present invention.

FIG. 18 shows a non-limiting example of a coal pre-processing system (69) using recycled flue gas or perhaps even recycled exhaust gas in the pre-processing system. FIG. 18 may be similar to FIG. 17 and including a multi-pass configuration which may reduce the unit size perhaps due to better gas contact and heat utilization. FIG. 19 shows a non-limiting example of a coal pre-processing system (69) using recycled flue gas or perhaps even recycled exhaust gas in the pre-processing system. FIG. 19 includes two or more heat sources with two gas streams. A second gas stream (66) may enter the pre-processing system at a source (103) and may exit the pre-processing system at an exit (104). Primary direct heating of the volatile metals removal chamber may be followed by indirect heating of the coal drying chamber. FIG. 20 shows a non-limiting example of a coal pre-processing system (69) using recycled flue gas or perhaps even recycled exhaust gas in the pre-processing system. FIG. 20 is an alternate example as compared to FIG. 19 where FIG. 20 shows a secondary indirect heating of the drying chamber (28) and volatile metal removal chamber (30) perhaps through an independent stream of a high pressure fluid. It is noted that any time a chamber is mentioned in the disclosure, it may relate to a closed system or a processing step.

In alternative embodiments, a coal pre-process system may be retrofitted into a power plant facility wherein the steps of feeding said wet coal into a drying chamber of said power plant system assembly, recycling a first supply of recycled non-air to said at least one chamber; recycled pre-process drying said wet coal with said first supply of recycled non-air in a drying chamber for a first amount of time to create a substantially dried coal having a coal temperature of up to about 300° F.; transferring said substantially dried coal to a separate volatile metal removal chamber; recycling a second supply of recycled non-air to said substantially dried coal to said separate volatile metal removal chamber; recycled pre-process removing volatile metal from said substantially dried coal in said separate volatile metal removal chamber with said second supply of recycled non-air for a second amount of time to create a volatile metal reduced dried coal having a coal temperature up to about 600° F.; generating a volatile metal removal effluent gas stream from said separate volatile metal removal chamber; and perhaps even cooling said volatile metal reduced dried coal are each retrofitted into an existing power plant system assembly. In other embodiments, a coal pre-process system may be retrofitted into a power plant facility wherein said pre-process wet coal drying chamber of said power plant system assembly configured to dry said wet coal with a first supply of recycled non-air for a first amount of time to create a substantially dried coal having a coal temperature of up to about 300° F.; said wet coal input in said pre-process wet coal drying chamber of said power plant system assembly; said pre-process volatile metal removal chamber of said power plant system assembly configured to heat said wet coal with a second supply of recycled non-air for a second amount of time to create a volatile metal reduced dried coal having a coal temperature up to about 600° F.; said dried coal input location in said pre-process volatile metal removal chamber of said power plant system assembly; said at least one source of said first and second supply of said recycled non-air connected to said pre-process wet coal drying chamber and said pre-process volatile metal removal chamber in said power plant system assembly; and perhaps even said a volatile metal reduced dried coal cooler configured to cool said volatile metal reduced dried coal after heating in said pre-process volatile metal removal chamber are each retrofitted into an existing power plant system assembly.

The present invention may provide, in embodiments, conversion of an air fired combustion system to an oxygen-fired combustion system perhaps providing an oxygen content including but not limited to between about 20.89% and about 35% in volume of the oxidant supply stream, or the like. Conversion of an air fired combustion system to an oxygen-fired combustion system may include the addition of an air separation unit and supplying oxygen from the air separation unit to a boiler assembly.

The present invention may provide, in embodiments, use of coal bed methane water to perhaps cooling a high moisture flue gas stream and even condensing of the water vapor which may offer a possibility to harness the water of desired characteristics to augment power plant needs. Coal bed methane water (105) may be added to a dryer effluent gas stream (106) from a drying chamber (28) to create condensed recyclable water (107) as may be understood in FIG. 27. Coal bed methane water may be cooled to between about 40° F. and about 90° F. and between about 50° F. and about 60° F. or the like. Alternatively, any type of water may be used to condense water from an effluent gas stream in a system where water may include but are not limited to surface water, well water, raw produced water, treated produced water, coal bed methane produced water, any combination thereof, or the like. A condensed recycled water may be recycled in a system including but not limited to used in a cooling tower, boiler feedwater, blended in with said coal bed methane produced water, non-plant irrigation, agricultural uses, and the like. A dryer effluent gas stream have a temperature of between about 200° F. and about 300° F. It may be desirable to clean the dryer effluent gas stream perhaps with a dryer effluent gas stream cleaner (108) and perhaps even to cool the drying effluent gas stream with perhaps a dryer effluent gas stream cooler (109). In yet other embodiments, the present invention may provide recovering of water from a system assembly perhaps with a water recovery system and the recovered water may be treated and perhaps even recycled into a system. Non-limiting examples of recovered water recycling may include recycling recovered water into sulfur dioxide emissions scrubber, a boiler feedwater makeup, a cooling tower makeup, any combination thereof, or the like.

As discussed herein, the present invention may provide, in embodiments, sequestrating carbon dioxide perhaps with a carbon dioxide sequester (47). Various pollutants may be captured in a system including but not limited to volatile metals, fine particulate, gaseous species of sulfur and nitrogen, acid gases, hydrogen chlorides, hydrogen fluoride, nitrogen, carbon dioxide, or the like to reduce harmful emissions to the atmosphere. In other embodiments, systems may provide capturing a species of sulfur with perhaps a fine sorbent injected in a furnace and capturing the sulfur as part of the fine sorbent in a baghouse. A system may achieve a removal of sulfur between about 50% to about 60%, up to 90%, and up to 95% removal, or the like. In embodiments, a desulfurization unit to remove sulfur dioxide may be used, acid gas removal may be used, and a hydrogen chloride unit may be used in the various systems. Various systems may include, in embodiments, processing a volatile metal reduced dried coal before it is transferred to a boiler assembly. This processing may include but is not limited to pulverizing the coal, crushing the coal, sizing the coal, or the like volatile metal reduced coal processing.

Other embodiments of the present invention may include a combination of air jigging and high moisture coal drying and mercury removal. There are benefits of high moisture coal drying and mercury removal by heating the dried coal to temperatures up to about 600° F. which may remove most of the organic-bound mercury in coal. However, inorganic-bound mercury may not be removed. The overall mercury removal may range from between about 50 to about 87% in subbituminous and lignite coals. Smaller fractions of arsenic and selenium may also be evolved during this process. Due to low volume gas flow, the gas-borne (evolved) species, e.g., mercury, selenium and arsenic, may be trapped using high temperature (between about 400 and about 600° F.) sorbents. The process may use plant heat perhaps including the waste heat at the back end of the boiler from the plant thereby maximizing the plant efficiency.

An air jig process may remove heavier fractions of coal. This heavy (perhaps a high specific gravity that may be generally more than 1.6) fraction may contain mostly inorganic material. This operation may provide a scope for removing inorganic-bound mercury. Dry air/gas may be used to assist the air jig operation and perhaps no water may be used.

In embodiments, air jigging may be combined with any of the various processes described herein. This may result in the removal of a maximum amount of mercury, a reduction in the ash fraction in the product coal, a reduction of the arsenic and selenium contents in the processed coal, a feed material which may significantly impacts the boiler availability, providing SCR catalysts which are not poisoned fast enough and resulting in longer life for SCR used in NOx reduction; and perhaps even the reduction in alkalis may also result in reduced fouling of the convection surfaces. The combined process may likely result in over about 90% mercury removal in a cost-effective manner. Due to limited interference to the existing plant configuration, the combined process may offer scope for immediate implementation.

Any previous discussion of the various embodiments of the various system assemblies may be applied to any other system assembly. All system embodiments are meant to be retrofitted or modified into any existing system or the like.

Example 01

Demonstration of Volatile Metals Removal—Drying (VMR-D) Process

Figure 24:
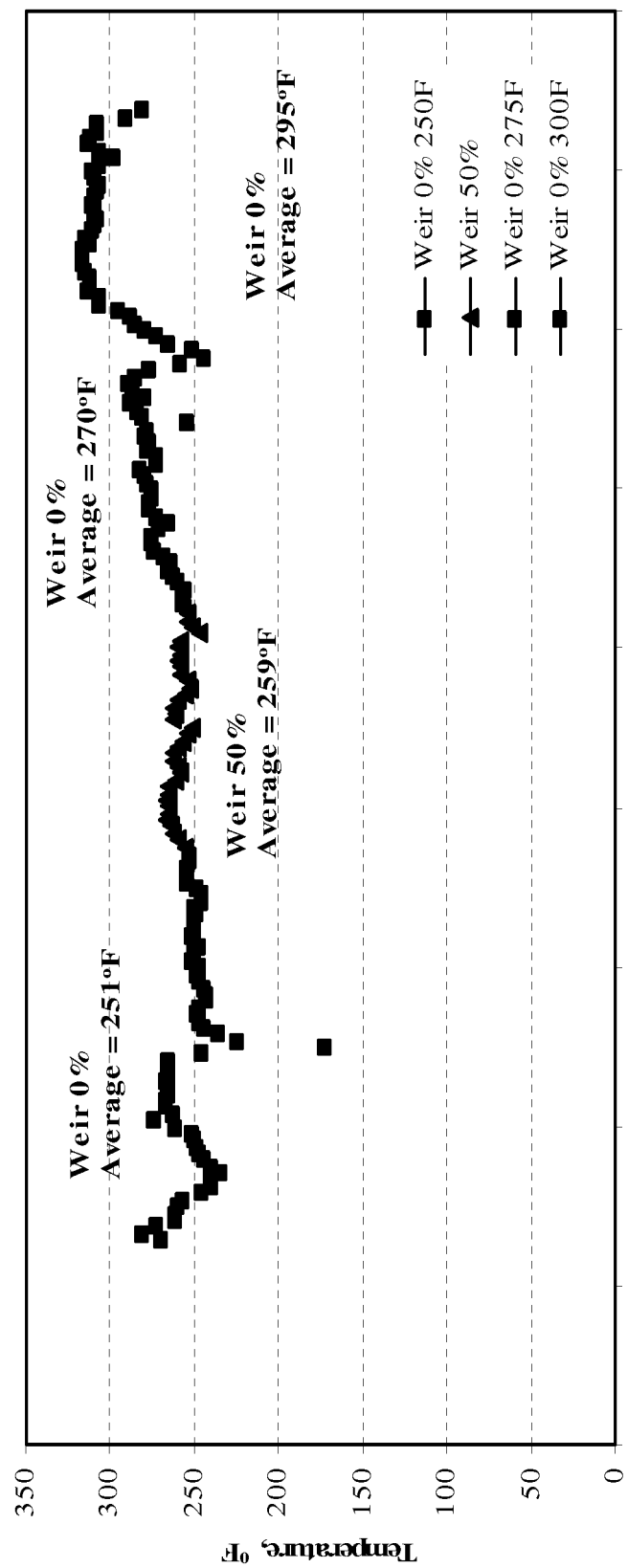
FIG. 24 shows a fluidized bed temperature plot of pre-volatile metals removal drying of powder river basin subbituminous coal.

Testing was conducted in the 100 pph pilot plant at the Western Research Institute to assess the performance of the VMR-D process. The VMR-D coal drying may take place in the temperature window of about 225-about 300° F. FIG. 24 depicts the average of fluidized bed temperature measured at three locations versus time at three steady-state periods. The average drying temperature varied from 251 to 295° F. The resulting moisture content was insignificant (near zero percent by weight). Stable operation of the VMR-D was achieved and controllable.

Figure 25:
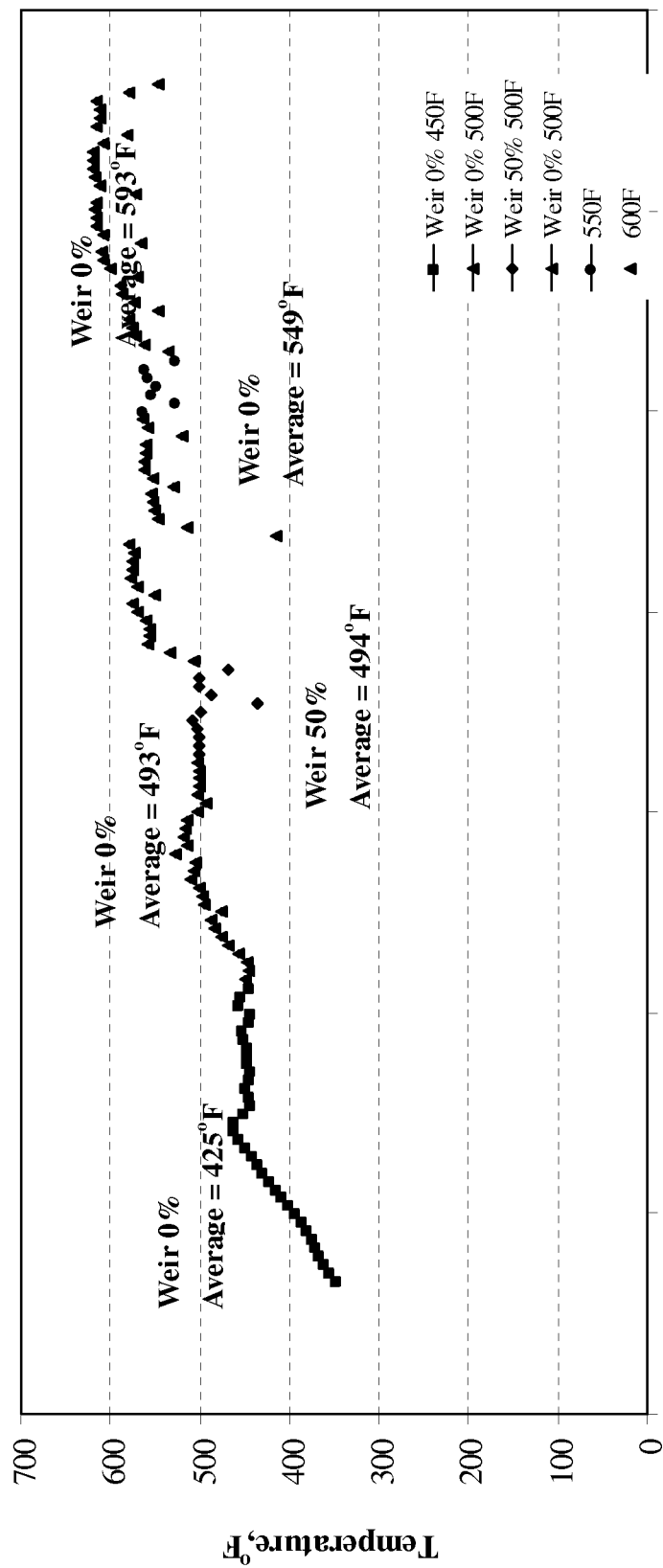
FIG. 25 shows a fluidized bed temperature plot of powder river basin subbituminous coal volatile metal removal.

FIG. 25 shows the average temperature of the VMR-D volatile metals removal fluidized bed reactor. In this typical case, the bed temperature was varied from 425 to 593° F. Each temperature indicates the steady state condition at which the coal was treated to achieve maximum heavy metals release without compromising on any significant changes in the rest of the volatiles that are mainly carbonaceous combustibles and volatile species of the ash. Once again, stable and controllable operation at a range of temperatures was achieved.

Table E02-02 shows the behavior of two high-moisture coals, namely, North Dakota lignite and Powder River Basin subbituminous coals, after the VMR-D process treatment. Key findings are: The mercury removal efficiency ranges from 63 to 75% for the two samples tested. Similarly, the arsenic removal ranges from 38 to 67%. The reduction in volatile matter contents is less than 4% in absolute terms.

TABLE E02-02

VMR-D Product Proximate Analysis and Volatile Metal Removal Performance (North Dakota Lignite and PRB Subbituminous Coal)

| | Parameter | | | |
|---|---|---|---|---|
| | North Dakota Lignite | | PRB Subbituminous Coal | |
| Proximate Analysis, wt. %, dry | Raw | VMR-D | Raw | VMR-D |
| Ash | 10 | 10 | 7 | 7 |
| Volatile matter | 41 | 39 | 42 | 38 |
| Fixed Carbon | 48 | 51 | 50 | 54 |
| Moisture, wt. %, as received | 36 | 0 | 26 | 0.00 |
| Trace Metals | | | | |
| Mercury, ppmd | 0.086 | 0.032 | 0.154 | 0.039 |
| Mercury Removal, % | | 63 | | 75 |
| Arsenic, ppmd | 10.4 | 6.5 | 4.2 | 1.4 |
| Arsenic Removal, % | | 38 | | 67 |

Example 02

Integration of VMR-D Process to an Existing Utility Boiler

FIGS. 14A and 14B show the integration of the VMR-D process with a pulverized coal-fired boiler. The wet fuel may be fed to the dryer operated at 225° F. by hot flue gas extracted before the air heater. The dried fuel may then be heated to 550-575° F. in a volatile metal removal heater to remove Hg by hot $CO_2$ gas within a closed loop. Before being fed to the pulverizer, the hot fuel may be cooled down to 250-300° F. in a cooler by condensate. The VMR reactor effluent gas containing volatile mercury (Hg) and other volatile metals may be ducted from the reactor to the dryer and cooled down indirectly. This gas may be forwarded to a sorbent bed for Hg and other volatile metals capture. To avoid explosion, all of working gas streams for VMR-D process may have low $O_2$ content. Due to a large amount of gas flow, the gas exiting the dryer may be discharged to the FGD directly. Fans may be supplied for each gas stream to overcome pressure drop.

An evaluation of the integration of VMR-D1 process to an existing utility boiler was conducted based on the above integration for a boiler unit of 600 MWe nominal power generation capacity. The boiler unit burns pulverized (high-moisture lignite low-rank) coal (PC). Key results show that the VMR-D process integration to an existing boiler is feasible and has many attendant benefits. Table E02-01 shows the predicted performance data of the VMR-D process-integrated pulverized coal-fired boiler. It may be possible to achieve over 5% increase in plant power output with less than 2% increase in raw fuel flow.

TABLE E02-01

VMR-D Coal-Integrated PC Boiler Plant Predicted Performance Data

| Parameter | Lignite | |
|---|---|---|
| Stream Definition | Base | VMR-D Coal |
| Feed | | |
| Air, Mlb/hr | 5630 | 5753 |
| Wet Fuel, Mlb/hr | 1010 | 1032 |
| Recycled, Mlb/hr | | 1181 |
| Change in fuel feed, klb/hr | | 1031.95 |
| % of change from base | | 102.17 |
| Furnace | | |
| FEGT, ° F. | 2137 | 2215 |
| Boiler eff, % | 78.8 | 82.2 |
| Plant | | |
| Gross Power, MW | 603 | 637 |
| Net Power, MW | 570 | 600 |
| Change in Net Power, MWe | | 30 |
| % Change in Net Power from base | | 5.32 |
| Net eff, % | 32.7 | 33.7 |
| Change in Net Efficiency (plant), % | | 1.0 |
| Main steam | | |
| P, psia | 2670 | 2841 |
| T, ° F. | 1006 | 991 |
| W, Mlb/hr | 3970 | 4216 |
| RH steam | | |
| P, psia | 573 | 611 |
| T, ° F. | 1003 | 1003 |
| W, Mlb/hr | 3560 | 3780 |

Boiler Furnace Performance: Major issues may include the potential increase in flame temperature and consequent changes in furnace flue gas temperature profile and the heat flux across the wall. Table E02-02 shows that the changes in furnace flue gas exit temperature and the wall heat flux. The data show that there are no issues with the firing of the VMR-D coal.

TABLE E02-02

600 MWe Lignite-Fired Boiler Performance with VMR-D Integration.

| Parameter | Unit | Raw Coal | VMR-D Coal |
|---|---|---|---|
| Burner Tilt | Degrees | −9 | 25 |
| Heat Absorption | | | |
| Furnace | MM Btu/hr | 2,102 | 1,939 |
| Total Boiler | MM Btu/hr | 4,799 | 5,013 |
| FEGT | ° F. | 2,138 | 2,201 |
| Furnace Max Heat Flux | Btu/hr-ft2 | 47,780 | 43,816 |
| Platen Max Heat Flux | Btu/hr-ft2 | 19,744 | 20,383 |
| Max. Wall Temp. | | | |
| Furnace | ° F. | 766 | 769 |
| Pendant SH | ° F. | 1,003 | 988 |
| Final RH | ° F. | 1,062 | 1,067 |
| Final SH | ° F. | 1,022 | 1,008 |

Efficiency Improvement: Table E02-03 shows that the VMR-D-PC integration may yield about 3.4% increase in boiler efficiency and 1% increase in plant efficiency.

Increased Power Generation: Table E02-03 also shows that, with existing infrastructure, the boiler plant net power generation output can increase by >about 5%, go up by over about 5% on net power generation basis.

TABLE E02-03

Efficiency Changes and Added Power Generation with VMR-D Process Integration.

| Parameter Case Definition | Base | VMR-D Maxpower[1] |
|---|---|---|
| Gross Power, MW | 603 | 637 |
| New Power, MW | 570 | 600 |
| Change in New Power, MWe | 0 | 30 |
| % Change in New Power from Base | | 5.32 |
| Boiler eff, % | 78.8 | 82.2 |
| Net eff, % | 32.7 | 33.7 |
| Change in Plant eff, % | | 1.0 |

[1]Maximum power generation

Example 03

Utility-Scale Economic Evaluation—Retrofit to Subcritical Plant

An assessment was conducted of the economic impact of retrofitting the proposed system on to an existing lignite-fired pulverized coal subcritical plant. This assessment is based on an existing pulverized coal (PC) plant with a nominal output of 600 MWe burning either as-received lignite or subbituminous coal or lignite or subbituminous coal treated by the pre-process volatile metals removal and pre-process drying process. The EPRI PC Cost program used to estimate the cost for two cases for the following two coals.

Case Lignite-A—Base plant with ACI: Based on the as-received lignite analysis. This case models the use of ACI upstream of the primary particulate collector for 90% mercury removal. The fly ash and activated carbon are captured together in the particulate collector rendering the fly ash unsalable. The utility not only loses revenue from the sale of the ash but must also pay to dispose of it.

Case Lignite-W—Proposed integrated pre-process plant: Based on lignite treated for volatile metals removal and moisture removal. This case models a combined mercury removal of 90% with the WRI process and minimal sorbent injection. Fly ash sales for the plant are maintained. Both lignite coal cases are based on an existing plant without an SCR (Selective Catalytic Reduction) system, but with limestone forced oxidation flue gas desulfurization and a fabric filter as the main particulate collector. In addition to mercury and moisture removal, the analysis is based on the reducing overall NOx emissions by 30% as seen in pilot-scale combustion tests.

Case Subbituminous—A Base Plant with ACI. Based on the as-received PRB coal analysis. This case models the use of ACI upstream of the CDS and primary particulate collector for about 90% mercury removal. The fly ash, scrubber solids, and activated carbon are captured together in the particulate collector rendering the fly ash unsalable. The utility would pay to dispose of the solids in a landfill.

Case Subbituminous—Proposed integrated pre-process plant: Based on PRB produced by the WRI pre-treatment process. This case models a combined mercury removal of about 90% with the WRI process and minimal sorbent injection; sorbent injection is upstream of the CDS. The fly ash, scrubber solids, and activated carbon are captured together in the particulate collector rendering the fly ash unsalable. The utility pays to dispose of the solids in a landfill.

The economic study assumed about 10% process contingency, about 10% project contingency and a 1.3 retrofit factor. These two subbituminous coal cases are based on an existing plant without SCR, but with dry FGD and a fabric filter as the main particulate collector. In addition to mercury and moisture removal, the analysis is based on the WRI process reducing overall NOx emissions by about 30%.

The results of the economic study are presented in terms of the Present Worth of Revenue Requirement (PWRR) calculations and the impact on the cost of electricity compared to new subcritical power costs. The PWRR for the two lignite cases and the two subbituminous coal cases are shown in Table E03-01.

TABLE E03-01

Present Worth of Revenue Requirements for the Subbituminous and Lignite Coal Cases (2009$US)

| Cost/ Revenue Categories ($10^3$ $US) | Wet PRB Coal Case w/ACI | VMR-D PRB Coal w/out ACI | Wet Lignite Coal/ACI | VMR-D Lignite Coal w/out ACI |
|---|---|---|---|---|
| Fixed O&M Costs | 328,360 | 356,690 | 430,380 | 456,570 |
| Variable Operating Costs | 898,370 | 704,440 | 1,169,740 | 638,520 |
| Carrying Costs (Capital Costs) | 3,060 | 67,640 | 3,060 | 87,090 |
| Total PWRR (Rounded) | 1,230,000 | 1,129,000 | 1,603,000 | 1,182,000 |

When the respective fixed and variable costs are added to the capital costs for each of these lignite cases, the total PWRR of the proposed integrated system showed about a 28.5% over the activated carbon integration case. In addition, the study showed the proposed pre-process volatile metals removal and pre-process drying integration to lower the cost of electricity by about 10.6 mills/kWh or about 1.1 cents/kWh. When these costs are compared to new lignite-fired subcritical plant costs of electricity at 6.68 cents/kWh, the reduction in cost of electricity is 15.9%.

When all of these incremental costs and savings for the PRB subbituminous coal case are combined, the total incremental benefit of the WRI process may be about 2.9 mills/kWh or about 0.3 cents/kWh. When these costs are compared to new PRB subbituminous coal-fired subcritical plant costs of electricity at 5.73 cents/kWh, the reduction in cost of electricity can be about 5.2%.

Example 04

Integrated VMR-D Product Combustion in a PC Combustor and NOx Reduction

Another important benefit from the VMR-D treatment when applied to combustion in existing pulverized coal-fired unit may be the reduction in gaseous pollutants. Pilot-scale tests using raw and VMR-D processed lignite show that substantial reduction in NOx emission may be possible with VMR-D treatment. Table E04-01 shows the NOx reduction in the range of 28 to 41%. In addition the table shows that the furnace flue gas temperature goes up only by about 100° F.

TABLE E05-01

Raw and VMR-D Treated Coal Combustion Performance in a Pulverized Coal Combustor

| | North Dakota Lignite | | North Dakota Lignite | |
|---|---|---|---|---|
| Coal | Raw | VMR-D | Raw | VMR-D |

TABLE E05-01-continued

Raw and VMR-D Treated Coal Combustion
Performance in a Pulverized Coal Combustor

| Temperatures, ° F. | | | | |
|---|---|---|---|---|
| Primary Air | 419 | 423 | 426 | 387 |
| Secondary Air | 472 | 478 | 482 | 430 |
| Furnace Exit | 1970 | 2090 | 1986 | 2041 |

| Dry-Gas Analysis (vol.) | ESP Configuration | | SDA-FF Configuration | |
|---|---|---|---|---|
| $O_2$, % | 3.00 | 3.00 | 3.00 | 3.00 |
| $CO_2$, % | 16.50 | 16.56 | 16.55 | 16.57 |
| CO, ppm | 3.75 | 4.21 | 4.15 | 5.84 |
| $SO_2$, ppm | 836.54 | 803.93 | 119.28 | 79.09 |
| $NO_x$, ppm | 462.69 | 271.66 | 348.18 | 249.64 |
| % Reduction in NOx | | 41.29 | | 28.30 |

* Data normalized to 3% $O_2$ in flue gas at the stack

Example 05

Integrated VMR-D Oxy-Combustion System

FIGS. 2A and 2B show the flow diagrams of an integrated oxy-combustion process boiler/coal treatment and the flue gas purification, respectively. Hot flue gas rich in moisture (up to about 20%, typically perhaps about 11.6% by wt) and $CO_2$ (>about 75% by wt) from the combustor may be cooled along its path. In the low-temperature heat exchanger system at the back end of the boiler, the heat transfer to the flue gas may take place in two stages. In the first stage, the moisture in the flue gas may be condensed, followed by a de-moisturizing step using inert gas such as warmer nitrogen. Further first stage compression and cooling of the $CO_2$ rich gas may lead to condensing out the acid gases. In the second stage of compression and cooling, the $CO_2$ may be liquefied leaving the gaseous $O_2$ and $N_2$ amenable for releasing it to the atmosphere. The warm nitrogen from the PC Island may help warm the cooler $O_2$ and $N_2$ to avoid condensation in the downstream of $CO_2$ removal chamber.

Cool nitrogen may also be used to cool the high $CO_2$-fraction flue gas. The process is likely to be carried out in two stages-remove moisture in the first stage and then cool the moisture and nitrogen-free flue gas to aid $CO_2$ liquefaction.

Moisture may be an important issue in getting the desired flue gas purity. Embodiments of the system provide moisture removed at two places. Heat Exchanger-1: The cooling of the flue gas to 50° F. using nitrogen may condense out most of the moisture in the flue gas.

In the second stage coal may be heated to about 550° F. by the waste nitrogen medium from the ASU and up to about 87% of mercury may be released and subsequently removed by the hot sorbents. The processed coal can also help generate more oxidized fraction of mercury enabling it to be adsorbed onto the ash particles in the cooler flue gas (between about 150° F. to about 170° F.) stream. Overall mercury removal may be over about 90%.

Nitrogen as a media for heat transfer has advantages, namely, an inert media may be used to dry and heat the coal, the heating/sweep gas temperature can be raised to well above about 550° F. and the dried coal may be cooled to desired mill inlet temperature. Mercury and other species such as sulfur and some trace metals are released from the second stage of the coal treatment process with moisture removed in the first stage. The nitrogen-borne pollutant stream may be treated to capture mercury, sulfur and other trace metals.

Example 06

Cost Estimation for Proposed VMR-D Integrated Oxy-Combustion System

Embodiments of the present invention may be expected to reduce the cost relative to DOE target values because of the efficiency gains resulting from using plant heat (including waste heat) to dry wet coal in association with the removal of volatile metals from the coal. For example, an integrated oxy-combustion and flue gas purification technology has been estimated to increase COE below the DOE target of 20%, significantly lower than other $CO_2$ capture technologies being developed. The estimated cost of $CO_2$ avoided may be expected once again well below the DOE target of $35/tonne (2008$). An integrated oxy-combustion process-using dried and volatile metals-reduced Powder River Basin (PRB) coals generated in the integrated system may provide for an efficiency increase over raw PRB coal-fired plants of about 3.5% as the result of $O_2$ production, $CO_2$ capture, purification, transportation, storage and monitoring steps. Water removed from the coal and from the flue gas can be recovered and may be of value in that it can be used in the plant for making up a part of cooling and/or boiler feed water losses with little treatment.

Example 07

Performance Analysis of Integrated VMR-D Oxy-combustion System

An assessment was made of the impact of the volatile metals removal and moisture removal step on the flue gas composition of both air-fired and oxy-fired combustion of the treated VMR-D product. The flue gas composition for these cases is shown in Table E07-01. In the oxy-fired system, there may be a small amount of air that leaks into the boiler and its impact on flue gas composition is shown in Table E07-01. Using the wet coal and oxy-combustion, the concentration of $CO_2$ in the flue gas may be increased from 20.92 wt. % to 66.86 wt. % compared to the same coal under air-fired conditions. In addition there may be a higher concentration of $O_2$ and $H_2O$ in the oxy-fired flue gas. Also the $N_2$ may be dramatically reduce in the oxy-fired case, due to the separation of the nitrogen from the $O_2$ feeding the oxy-fired unit.

Combusting the VMR-D coal in an oxy-fired unit with 0% and 5% air leakage may follow the same trend as the raw coal in that the $CO_2$ content may be dramatically increased, the $O_2$ bay be increased and the $H_2O$ may be increased but can be at a lower level that with oxy-firing of the wet coal. With air leakage of 5% the nitrogen content may increase to about 4 wt. %, $O_2$ to 7.31 wt. %, and $CO_2$ to 76.72 wt. %.

TABLE E07-01

Flue Gas Composition Changes Due to Oxy-Combustion,
VMR-D Drying and Air Leak (% by wt in wet flue gas)

| | Raw Coal (20% excess air; 0% air leak) | | VMR-D Coal (20% excess air; 0% air leak) | | VMR-D Coal (100% oxy; 5% air leak) | |
|---|---|---|---|---|---|---|
| Constituent | 100% Air | 100% Oxy | 100% Air | 100% Oxy | 100% Air | 100% Oxy |
| $CO_2$ | 20.92 | 66.86 | 21.79 | 75.63 | 71.85 | 76.721 |
| $O_2$ | 3.40 | 10.87 | 3.52 | 12.23 | 12.78 | 7.310 |
| $H_2O$ | 7.96 | 21.78 | 4.53 | 11.60 | 11.02 | 11.769 |
| $N_2$ | 67.65 | 0.25 | 70.09 | 0.29 | 4.11 | 3.950 |

TABLE E07-01-continued

Flue Gas Composition Changes Due to Oxy-Combustion,
VMR-D Drying and Air Leak (% by wt in wet flue gas)

| | Raw Coal (20% excess air; 0% air leak) | | VMR-D Coal (20% excess air; 0% air leak) | | VMR-D Coal (100% oxy; 5% air leak) | |
|---|---|---|---|---|---|---|
| Constituent | 100% Air | 100% Oxy | 100% Air | 100% Oxy | 100% Air | 100% Oxy |
| $SO_2$ | 0.07 | 0.23 | 0.07 | 0.25 | 0.23 | 0.249 |
| Dry gas | 92.04 | 78.22 | 95.47 | 88.40 | 88.98 | 88.40 |

The distinguishing features of the VMR-D process integration with oxy-combustion may be apparent. Even considering an air leak of about 5% (of flue gas weight), the oxygen concentration may be less than about 7.3% (by vol.). This lower concentration with reduced excess air of about 10% may facilitate the use of this nearly inert flue gas to circulate through the pulverizers which may be difficult to do in oxy-combustion of raw coal (with high moisture). Thus, the integration of the VMR-D coal drying with an ASU may help operate the oxy-combustor with enhanced boiler output and achieve the required flue gas purity with less energy. The recovery of the excess oxygen can help offset the oxygen output from the air separation unit or other oxygen supplier.

Recycling the flue gas to temper the impact of the oxygen-fired system, may use some of the $O_2$ and the oxidant stream may consist of predominantly $CO_2$ and $O_2$ and $H_2O$. The non-recycled portion of the flue gas, oxy-fired combustion of the treated coal and 5% air leakage may need to be reduce in moisture from 11.77 wt. % to less than 0.015 wt. % and the oxygen may need to be reduced to 3 wt. % in order to meet the $CO_2$ pipeline and sequestration purity requirements as set forth by the United States Department of Energy in Table E07-02.

TABLE E07-02

$CO_2$ Pipeline Specifications (2200 psia) (Ciferno, 2009).

| Parameter | Saline Formation $O_2$ Restricted | Saline Formation $O_2$ Unrestricted |
|---|---|---|
| $CO_2$ | Not limited | Not limited |
| Water | Dehydration (0.015, vol. %) | Dehydration (0.015, vol. %) |
| $N_2$ | Not limited | Not limited |
| $O_2$ | <100 ppmv | Up to 3% |
| $SO_2$ | <3 vol. % | <3 vol. % |
| NOx | uncertain | uncertain |

Example 08

VMR-D Process Integration with Gasification/IGCC System

The integration of the VMR-D process with gasification has been evaluated through extensive laboratory scale high pressure thermo-gravimetric analysis (HPTGA), bench-scale gasifier testing and modeling. The HPTGA testing included both wet as received raw and VMR-D treated PRB coals, different gasification temperatures and pressures, steam addition and syngas composition. The coal was first devolatilized prior to the test since the char reactions are slow reactions. A summary of the results of the HPTGA testing under syngas/steam gas conditions is presented in Table E08-01.

The VMR-D gasification test data have shown a higher devolatization rate (>73%) and an increase in char carbon conversion of over 5 wt. % at same temperature, pressure and residence time (achieving 100% carbon conversion) comparable to an untreated PRB coal. In addition, the testing has shown a significant reduction (>40%) in residence time for char conversion (Table 8-1). The modification of the ash has also improved the devolatization carbon conversion, as well as in the char carbon conversion and lowered char residence times due to the catalytic effect of certain alkalis in the ash. These results confirm that the VMR-D treated product yields a 29% higher devolatization carbon conversion and a char carbon conversion rate of nearly twice that of the raw wet PRB coal.

TABLE E08-01

Summary of Key VMR-D Gasification Results at 1,800° F. and 300 psig

| Coal Type | Gasification Conditions | Carbon Conversion, % | | | Char Residence Time, min. |
|---|---|---|---|---|---|
| | | Devolatization | Char Reaction | Total | |
| Raw PRB | Syngas/Steam | 56.5 | 99.0 | 99.6 | 42 |
| VMR-D | Syngas/Steam | 73.2 | 99.0 | 99.7 | 25 |
| Raw PRB-AM | Syngas/Steam | 64.8 | 100 | 100 | 35 |

AM - Ash Modified
Syngas/Steam - 30% $H_2$; 12% CO; 8% $CO_2$; 50% $H_2O$

Modeling of the gasification system with and without the VMR-D process was conducted to examine the syngas composition with a range of operational and process conditions. A fluid bed model based on oxygen or air blown operation was used. The results of the modeling efforts are presented in Table E08-02.

TABLE E08-02

Summary of the Results from the VMR-D Gasification Modeling Studies.

| Parameter | Model | 1 | 3 | 5 | 7 |
|---|---|---|---|---|---|
| Coal Type | Raw/Treated | Raw | Raw | Treated | Treated |
| Steam | Yes/No | Yes | No | Yes | No |
| Oxidant | Oxygen/Air | O2 | O2 | O2 | O2 |
| Product Gas | % vol | | | | |
| CO | | 16.9 | 35.3 | 27.2 | 69.9 |
| CO2 | | 20.6 | 20.4 | 17.9 | 5.1 |
| H2 | | 22.6 | 21.0 | 24.5 | 12.5 |
| H2O | | 34.3 | 15.1 | 23.8 | 1.4 |
| CH4 | | 4.3 | 6.4 | 5.3 | 8.7 |
| Others | | 1.3 | 1.9 | 1.4 | 2.4 |
| CO + H2 | | 39.6 | 56.2 | 51.7 | 82.4 |
| Cold Gas Efficiency | % | 79.2 | 83.1 | 84.9 | 88.2 |
| Wet Gas HHV | Btu/SCF | 173 | 248 | 222 | 356 |

The results show the improvement in syngas composition when the VMR-D product was used, specifically, the syngas has a higher concentration of CO+$H_2$, and lower $CO_2$ reflecting a lower heat input is needed and a more efficient use of $O_2$. This may be reflected in the significantly high heating value of the syngas (>350 Btu/scf) and a total cold gas efficiency gain of >5% to levels exceeding 88%.

Bench-scale tests were conducted to confirm the results of the HPTGA and the modeling evaluations/optimizations. The bench-scale tests confirm the results of the modeling with high >90% H2+Co syngas and low $CO_2$. In addition the hydrogen content in the product gas was much lower when no steam was used and the VMR-D product was gasified.

Figure 26:
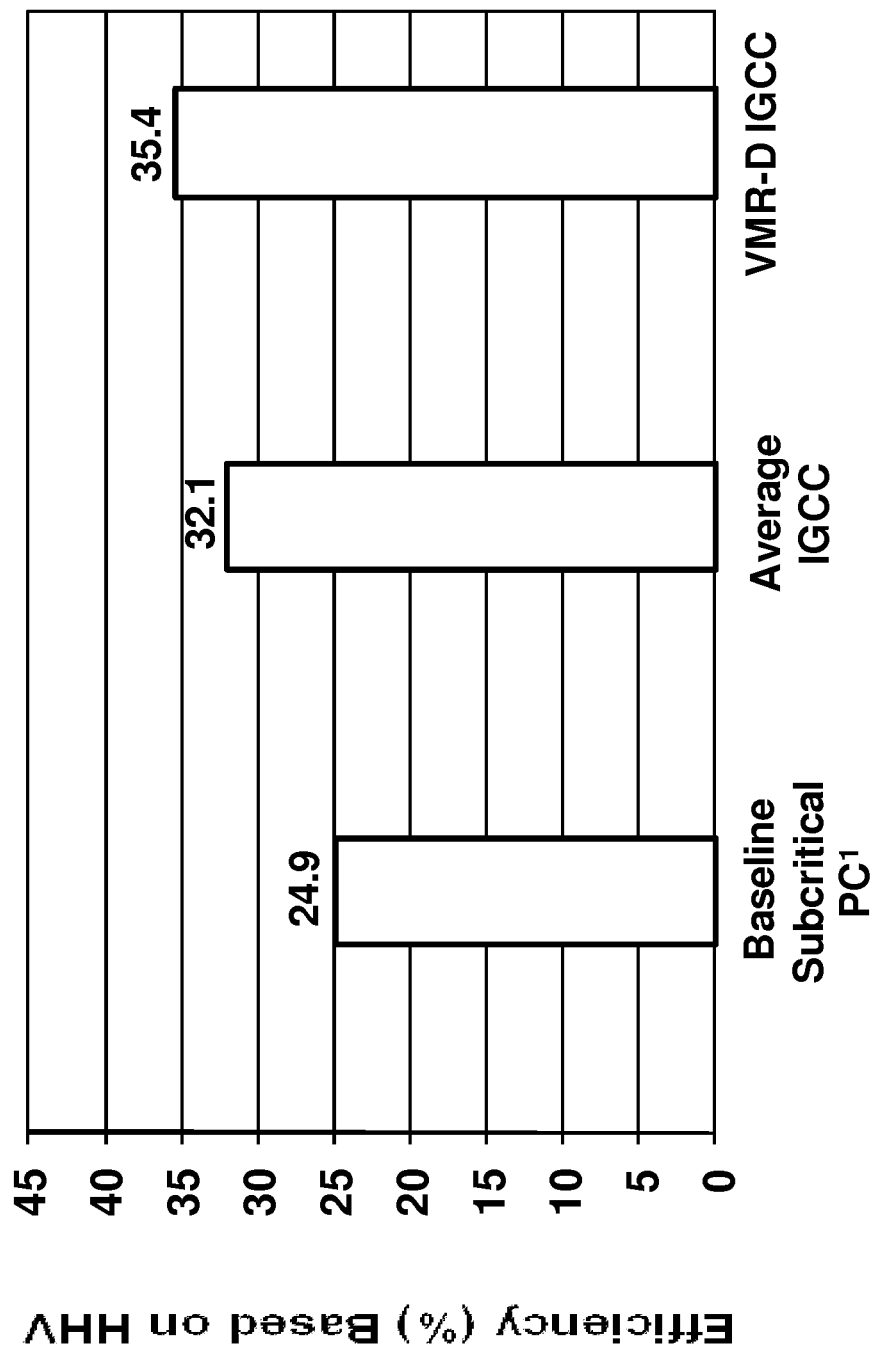
FIG. 26 shows an efficiency of the VMR-D IGCC System compared to other power generation options with carbon capture (modified from Ciferno, 2007).

Integrated Gasification Combined Cycle (IGCC) system modeling was conducted to assess the overall VMR-D gasification/IGCC system efficiency compared to currently estimated IGCC efficiencies (GE, Conoco-Philips, Shell gasification systems) and subcritical power plants as reported by (Ciferno, 2007). The results of that modeling are shown in FIG. 26 and may show that the VMR-D gasification IGCC system was estimated efficiencies increase of 3.3% higher than the referenced IGCC systems and 11.5% efficiency increase compared to subcritical PC with amine-based carbon capture technology.

When integrating the VMR-D process with gasification, a >about 5% increase in cold gas efficiency and a high $CO+H_2$ syngas composition may result, and may make the integration of the VMR-D process with gasification unique and attractive for carbon capture-based (via water-gas-shift reactions and $CO_2$ separation) power generation, as well as for chemicals manufacturing. The significant increase in overall IGCC efficiency of about 3.3% above other IGCC systems without VMR-D may make the proposed system very efficient and attractive.

Example 09

Volatile Metals Reduction in a VMR-D Gasification IGCC System

The reduction in volatile metals with the VMR-D integrated gasification/IGCC was assessed in a comparison of experimental removal of volatile metals from the coal and the inherent capture of volatile metals in the VMR-D gasification process. The form of the mercury species upon coal gasification may differ from the combustion mode due the reducing condition in the gasifiers. The coal rank may not impact the formation of mercury species in gasification systems. Hence, it is reasonable to assume that in the gasification system the Hg species can be mostly in the elemental form with limited amounts of oxidized mercury species formation.

The assessment evaluated the proposed system compared with the gasification/IGCC at the Wabash plant. Table E09-01 shows that most of the Hg (>about 90%) may be in the elemental form though the measured data referring to the gas turbine outlet location.

TABLE E09-01

Impact of VMR-D Process on Hg Removal in an IGCC Plant

| | Coal fed to Gasifier | Gas Turbine Exhaust | | |
| | Total Hg In the Stream, kg/hr | | | |
| Plant | Raw Coal | VMR-D Coal | | Nominal Hg Removal, % | Net Hg Removal, % |
|---|---|---|---|---|---|
| Plant A | 0.0084 | | 0.0055 | 34 | 34 |
| VMR-D | 0.0084 | 0.00168 | 0.00111 | 34 | 86.8 |
| Plant B | 0.0061 | | 0.0036 | 41 | 41 |
| VMR-D | 0.0061 | 0.00122 | 0.00072 | 41 | 88.2 |

If, for example, one assumes about 80% removal with the process is achievable with PRB coals and if gasifiers as shown in Table E09-01 remove between about 34 and about 41% of the mercury, then when coupled with the process the total mercury removal could be between about 86 and about 88%, respectively. The ability to achieve about 90% is most likely, which would be sufficient to meet the regulations thereby no additional mercury removal systems may need to be installed in the VMR-D gasification/IGCC plant. This may provide a far reaching beneficial effect of the technology over the state-of-the-art IGCC systems.

Example 10

Carbon Dioxide Recycle as a Reactant in VMR-D Integrated Gasification/IGCC System Example 11 discusses the recycle of $CO_2$ back into the gasifier as part of the integration of the VMR-D process with a gasification/IGCC. The gasifier can be based on any technology that strives on achieving higher H/C ratio in the output stream than that in the input stream. The system generally consists of syngas cleaning of particulate and polluting gases and then yielding highly enriched independent gas streams of $CO_2$ and others.

One of the unique and differentiating features of the VMR-D gasification/IGCC system is the recycle of the $CO_2$ gas that would be separated from the gasifier and/or water gas shift reactor output back into the gasifier. The main advantage of this innovative approach is to enhance the concentration of CO that would be formed by the following endothermic reaction among others. The heat for this reaction is provided by the partial combustion of combustibles in coal as well as recycled syngas product from the gasifier itself.

$$CO_2 + C \rightarrow 2CO$$

This process was demonstrated on a bench-scale test run. Test results are summarized in the Table E10-01. The raw subbituminous coal was processed in a fluidized bed gasifier in order to ascertain the impact of the process in the syngas composition. There is a substantial increase in the mol % of carbon monoxide with the treated subbituminous coal compared to the wet, as received raw subbituminous coal gasified at 1800° F. and 150 psig. The high CO and low $CO_2$ reflect the higher efficiency of gasification with the treated coal and the lower consumption of oxygen. In addition, both of these tests incorporated recycled $CO_2$ at a rate of about 10% by weight of the coal.

TABLE E10-01

Syngas Compositional Changes with Pre-Process Volatile Metals removal and Drying.

| Syngas Composition, mol % | Wet As Received Subbituminous Coal | VMR-D Treated Subbituminous Coal |
|---|---|---|
| Hydrogen ($H_2$) | 18.74 | 7.26 |
| Carbon Monoxide (CO) | 70.11 | 90.10 |
| Carbon Dioxide ($CO_2$) | 10.62 | 2.59 |
| Methane ($CH_4$) | 0.54 | 0.06 |

Additional fluidized bed gasfication tests were conducted using the treated subbituminous coal wherein the $CO_2$ recycle.rate was increased to 30% by weight of the coal feed. The result was an immediate increase in the carbon monoxide in the syngas accounting for 75% of the maximum amount of CO from the reaction of the $CO_2$ with carbon to form 2CO. Based on the theoretical heat balance in the gasifier, the amount of $CO_2$ recycle increases as the percent of moisture in the starting coal and as the percentage of moisture in the coal is reduced during treatment in VMR-D process steps.

This feature was also verified in high pressure thermo-gravimetric tests using $CO_2$ and devolatilized subbituminous coal char. The results of those tests confirmed that the char can be converted to CO within about half the time as the conversion of the char using steam-syngas composition. Carbon conversion of the char was nearly 100%.

Example 11

Using Alternate Water Sources to Recover Water from Dryer Effluent

The dryer effluent gas leaving the dryer at about 250° F. can be cleaned by a cyclone and/or a fabric filter and then may be cooled using a number of liquids, including surface waters, well water, and alternates sources of locally available water, such as produced waters from coal bed methane production or a combination of these water sources. An assessment of the ability of the CBM produced water to serve as the dryer effluent coolant in order to condense the water from the effluent and then to use the water with or without treatment in the power plant or for non-plant uses in combination with other waters, including CBM produced waters for irrigation and/or agriculture.

The assessment addressed the condensing of water from the dryer effluent when flue gas is used as the drying media. The CBM produced water temperature may be, typically between 50° F. and 60° F. A heat balance was determined for a dryer/effluent condenser system that had the following assumptions Cooling water temperature of CBM produced water may between about 40° F. and about 90° F. (50° F. and about 60° F. used in the assessment.

The fluidized bed dryer efficiency may be about 100% in removing the moisture from the coal.

The dryer hot gas inlet temperature may be about 600° F.; Outlet temperature may be about 250° F.

Coal moisture may be about 28% and all the moisture may be removed while drying.

Table E11-01 presents the hot gas composition at the inlet and outlet of the coal dryer. It is assumed that most of the addition to the drying hot gas volume may be the water vapor released from the raw coal. Changes in other species may be negligible. Table E13-02 shows the changes in the saturated vapor concentration at different gas temperatures. This also provides data on the amount of water that could be condensed from the gas stream at various temperature conditions. The partial pressure of water vapor may increase from about 1.16 psia to about 2.53 psia due to the addition of water vapor released from coal. Thus, when the gas may be cooled by the CBM produced water, the excess water over the saturation limit may be condensed.

TABLE E11-01

Hot Gas Characteristics at the Inlet and Outlet of the Dryer

|  | Dryer Hot Gas In | | | Dryer Hot Gas Out | | |
| --- | --- | --- | --- | --- | --- | --- |
|  | Volume Fraction % | Weight Fraction % | Partial Pressure psia | Volume Fraction % | Weight Fraction % | Partial Pressure psia |
| $CO_2$ | 14.43 | 21.42 |  | 12.96 | 20.03 |  |
| $H_2O$ | 7.90 | 4.80 | 1.16 | 17.24 | 10.91 | 2.53 |
| $N_2$ | 74.41 | 70.29 |  | 66.85 | 65.73 |  |
| $O_2$ | 3.24 | 3.50 |  | 2.91 | 3.27 |  |
| $SO_2$ | 0.03 | 0.06 |  | 0.03 | 0.06 |  |
| Total | 100.0 | 100.1 |  | 100.0 | 100.0 |  |
| MWt | 29.6428 |  |  | 28.4803 |  |  |

TABLE E11-02

Water Removed from Flue Gas upon Cooling to Various Temperatures

| Partial Pressure | Dew Point | lb of water/lb of dry gas | Water Removed lb/lb of dry gas | lb of water removed/ MMBtu Heat In |
| --- | --- | --- | --- | --- |
| 0.2561 | 60 | 0.009282 | 0.099548 | 43.87 |
| 0.3629 | 70 | 0.013251 | 0.095579 | 42.12 |
| 0.5068 | 80 | 0.018693 | 0.090137 | 39.72 |
| 0.6981 | 90 | 0.026101 | 0.082730 | 36.46 |
| 0.9492 | 100 | 0.036137 | 0.072693 | 32.03 |
| 1.6927 | 120 | 0.068126 | 0.040704 | 17.94 |
| 2.53 | 134.7 | 0.108830 |  | 0 |

It may be possible to remove most of the water in the cooled dryer effluent when the gas temperature is below about 70° F. In addition to the condensation of moisture from the dryer effluent, the following other benefits may also accrue:

Any residual $SO_2$ and volatile metals accidentally released during drying can be removed, and Any fine particulate containing metals such as oxidized mercury in the recirculated flue gas can also be removed.

The condensed water from the dryer circuit can be blended with other water sources and used within the plant such as cooling tower water thereby reducing plant raw water consumption and/or it can be blended with the CBM produced water for irrigation and/or agricultural use, also reducing freshwater consumption.

As can be easily understood from the foregoing, the basic concepts of the present invention may be embodied in a variety of ways. It involves both coal treatment techniques as well as devices to accomplish the appropriate coal treatment. In this application, the coal treatment techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description.

They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "air jig" should be understood to encompass disclosure of the act of "jigging"—whether explicitly discussed or not—and, conversely, were there effectively disclosure of the act of "jigging", such a disclosure should be understood to encompass disclosure of a "jig" and even a "means for jigging." Such changes and alternative terms are to be understood to be explicitly included in the description.

Any patents, publications, or other references mentioned in this application, for patent including the listing below are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in any list of references or other information statement filed with the application are hereby appended and hereby incorporated by reference, however, as to each of the above, to the extent that such information or statements incorporated by reference might be considered inconsistent with the patenting of this/ these invention(s) such statements are expressly not to be considered as made by the applicants.

U.S. Patent Documents

| Pat. No. | Issue Date | Name of Patentee or Applicant of cited Document |
|---|---|---|
| 5,145,489 | 1992-09-08 | Dunlop |
| 5,290,523 | 1994-03-01 | Koppelman |
| 5,403,365 | 1995-04-04 | Merriam et al. |
| 5,575,085 | 1996-11-19 | Groombridge |
| 5,746,787 | 1998-05-05 | Koppelman |
| 5,769,908 | 1998-06-23 | Koppelman |
| 5,830,246 | 1998-11-03 | Dunlop |
| 5,830,247 | 1998-11-03 | Dunlop |
| 5,858,035 | 1999-01-12 | Dunlop |
| 5,863,304 | 1999-01-26 | Viall et al. |
| 5,904,741 | 1999-05-18 | Dunop et al. |
| 6,090,171 | 2000-07-18 | Viall et al. |
| 6,146,432 | 2000-11-14 | Ochs et al. |
| 6,162,265 | 2000-12-19 | Dunlop et al. |
| 6,185,841 B1 | 2001-02-13 | Conochie |
| 6,249,989 B1 | 2001-06-26 | Conochie et al. |
| 6,266,894 B1 | 2001-07-31 | Conochie |
| 6,325,001 B1 | 2001-12-04 | Sheldon |
| 6,568,185 B1 | 2003-05-27 | Marin et al. |
| 6,878,174 B1 | 2005-04-12 | Conochie |
| 6,907,845 B2 | 2005-06-21 | Krebs |
| 6,996,989 B2 | 2006-02-14 | Dries et al. |
| 7,007,616 B2 | 2006-03-07 | Abrams et al. |
| 7,019,412 B2 | 2006-03-28 | Ruggieri et al. |
| 7,062,912 B2 | 2006-06-20 | Penfornis et al. |
| 7,067,456 B2 | 2006-06-27 | Fan et al. |
| 7,066,396 B2 | 2006-06-27 | Knight et al. |
| 7,303,606 B2 | 2007-12-04 | Zeng et al. |
| 7,275,644 B2 | 2007-10-02 | Ness et al. |
| 5,322,530 | 1994-06-21 | Merriam et al. |
| 7,540,384 B2 | 2009-06-02 | Ness et al. |
| 5,403,365 | 1995-04-04 | Merriam et al. |

U.S. Patent Application Publications

| Publication Number | Publication Date | Name of Patentee or Applicant of cited Document |
|---|---|---|
| 20020079273 A1 | 2002-06-27 | Davies et al. |
| 20030185718 A1 | 2003-10-02 | Sellakumar |
| 2006/0075682 A1 | 2006-04-03 | Bullinger et al. |

Foreign Patent Documents

| Foreign Document Number | Country Code | Publication Date | Name of Patentee or Applicant Document |
|---|---|---|---|
| 2008/127709 A2 | WO | 2008-10-23 | Great River Energy |
| 2006/044353 A2 | WO | 2006-04-27 | Great River Energy |
| 2006/044317 A2 | WO | 2006-04-27 | Great River Energy |
| 2006/044264 A2 | WO | 2006-04-27 | Great River Energy |
| 93/23500 | WO | 1993-11-25 | State Electricity Commission of Victoria |
| 2006/042308 A2 | WO | 2006-04-20 | Great River Energy |

Non-Patent Literature Documents

Bland, A., Newcomer, J., Sellakumar, K. M., Walling, G., Steen, D., and Klunder, E. "Pre-Combustion Thermal Treatment of Coal to Remove Mercury: Process Data Validation with Bench and Pilot-Scale Units - Preliminary Results," $20^{th}$ (Int'l) Western Fuels Conference, Denver, CO Oct. 24-26, 2006

Bland, A. E., Merriam, N., Brown, T. H., Guffey, F., Grimes, W. and Nordin, J., "Thermal Pre-Combustion Removal of Mercury from Powder River Basin Coals," Proc. $26^{th}$ Int'l. Conference on Coal Utilization and Fuel Systems, Clearwater, FL May 4-8, 2001, pp 457-468.

Bland, A., Sellakumar, K. M., Johnson, L., Walling, G., Steen, D., and Klunder, E., "Beneficial Options for the Pre-Combustion Thermally Treated Subbituminous Coal: Initial Findings," $22^{nd}$ Annual Int'l. Pittsburgh Coal Conference, Sept. 12-15, 2005.

Bland, A., Sellakumar, K. M., Johnson, L., Walling, G., Steen, D., and Klunder, E., "Mercury Control at Low Rank Coal-fired Power Plants by a Pre-Combustion Thermal Treatment Process: Techno-Economic Study," Air Quality V, Washington D.C., Sept. 19-21, 2005.

Bland, A., Sellakumar, K. M., Johnson, L., Walling, G., Steen, D., and Klunder, E., "Mercury Control at Low Rank Coal-fired Power Plants by a Pre-Combustion Thermal Treatment Process - An Update." Air Quality, Global Climate & Renewable Energy Conference, Tucson, AZ, Jan. 25-26, 2005.

Bland, A., Sellakumar, K. M., MGuffrey, F., Walling, G., Steen, D., and Klunder, E., "Mercury Control at Low Rank Coal-fired Power Plants by a Pre-Combustion Thermal Treatment Process," $19^{th}$ Int'l Conf. on Lignite, Brown and Subbituminous Coals; Bilings, MT, Oct. 12-14, 2004.

Bland, A., Sellakumar, K. M. and Kormylo, C., "Mercury Emissions Testing at Power Plants Burning Subbituminous Coals," $19^{th}$ Int'l. Conference on Lignite, Brown and Subbituminous Coals, Oct. 12-14, 2004.

Bland, A., Sellakumar, K. M., Guffrey, F., Walling, G., Steen, D., and Klunder, E., "A Novel Approach to Mercury Control by Pre-Combustion, Thermal Treatment of Low Rank Coals - Project Update," AWMA's $97^{th}$ Annual Conf. and Exhibition, Indianapolis, IN, Jun. 22-25, 2004.

Bland, A., Greenwell, C., Newcomer, J., Sellakumar, K. M. and Carney, B., "Pilot Testing of WRI's Novel Mercury Control Technology by Pre-Combustion Thermal Treatment of Coal," DOE Mercury Conference, Pittsburgh, PA, Dec. 14, 2007.

Cho, S. M., "Heat Rate Improvement with Condensing Heat Exchangers," Proceedings of Power - Gen 92, pp. 448-463, 1992.

Electric Power Research Institute/Washington Group International, "Status of Multi-Pollutant Process Development-Airborne, Ashworth Combustor ™, KFx/F-Fuel, WRI Coal Processing Review and Cost Projection," EPRI Rpt. No. 1008112, C. Dene, Manager, December 2004.

Fout, T., "Carbon Capture for Pulverize-Coal-Based Power Plants: DOE/NETL'S R & D Program," MEGA Symposium 2008, Baltimore, MD, Aug. 25, 2008.

Guffey, F. D., Bland, A. E. and Brown, T. H., "Pre-combustion Removal of Mercury from Coal," in Proc. Of the $27^{th}$ Int'l Conference on Coal Utilization and Fuel Systems, Clearwater, FL, Mar. 4-7, 2002.

K-Fuel, Company News Brief, Jul. 27, 2004.

Klara, J., "Fossil Energy Power Plant Desk Reference," DOE/NETL - 2007/1282, May 2007.

Marin, O., "Demonstration Study of High Sulfur Coal Combustion in Oxygen Enriched Flue Gas," ICCI Project Number: 01US-01-Executive Summary, November 2002.

Medina, K., http://deq.state.wy.us/wqd/www/Permitting/Pages/coalbed.asp - Personal communication, Oct. 24, 2006.

Merriam, N., "Removal of Mercury from Power River Basin Coal by Low-Temperature Thermal Treatment," U.S. Dept. of Energy, Morgantown Energy Technology Center, DE-FC21-93MC30126, p 23, 1993.

http://waterquality.montana.edu/docs/methane/cbmfaw.shtml - Montana State University, Web accessed Oct. 27, 2006.

Schmid, V., Wright, J., Kephart, A., and Bland, A., "An Evaluation of Mercury Measurement and Monitoring Results at a Subbituminous Coal-fired Power Plant," Air Quality V, Washington D.C., Sept. 19-21, 2005.

Holt, Neville A. H., "Coal Gasification Research, Development and Demonstration Needs and Opportunities" Presented at the Gasification Technologies Conference, San Francisco, CA Oct. 10, 2001

Technology Breakthrough Paper, Coal Drying, NextGen Energy Council February 2008

Bland, Alan E. et al. WRI: Pilot Testing of WRI's Novel Mercury Control Technology by Pre-Combustion Thermal Treatment of Coal. Clearwater Coal Conference "Coal for the Future" Clearwater, FL Jun. 1-5, 2008.

EIA, Coal Production in the U.S, 2008, web accessed Nov. 6, 2009, http://www.eia.doe.gov/cneaf/coal/page/acr/table1.pdf Ciferno, J., 2007 (revised) "Pulverized Coal Oxycombustion Power Plants - Final Results", U.S. Department of Energy, National Energy Technology Laboratory, Nov. 1, 2007

Ness, Mark et al. Pre-Drying the Lignite to GRE's Coal Creek Station, Great River Energy, May 2005

US Provisional Application Number 61/180,750, filed May 22, 2009, entitled Methods and Systems for Thermal Process of Low Rank Coals

---

Thus, the applicant(s) should be understood to have support to claim and make a statement of invention to at least: i) each of the coal treatment devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC*, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 715 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A method for retrofitting a power plant facility comprising the steps of:
   supplying wet coal in a power plant system assembly;
   feeding said wet coal into a drying chamber of said power plant system assembly;
   recycling a first supply of recycled non-air to said at least one chamber;
   recycled pre-process drying said wet coal with said first supply of recycled non-air in a drying chamber for a first amount of time to create a substantially dried coal having a coal temperature of up to about 300° F.;
   transferring said substantially dried coal to a separate volatile metal removal chamber;
   recycling a second supply of recycled non-air to said substantially dried coal to said separate volatile metal removal chamber;
   recycled pre-process removing volatile metals from said substantially dried coal in said separate volatile metal removal chamber with said second supply of recycled non-air for a second amount of time to create a volatile metal reduced dried coal having a coal temperature up to about 600° F.;

generating a volatile metal removal effluent gas stream from said separate volatile metal removal chamber;
cooling said volatile metal reduced dried coal;
transferring said volatile metal reduced dried coal to a boiler assembly;
air fired combusting said volatile metal reduced dried coal in said boiler assembly;
producing a gaseous exhaust composed predominantly of carbon dioxide and nitrogen from said boiler assembly;
heating boiler water in said boiler assembly with heat from said combusted volatile metal reduced dried coal to create steam;
driving a turbine with said steam; and
driving at least one generator responsive to said turbine with said steam to produce electricity from said power plant system assembly,
wherein said steps of feeding said wet coal into a drying chamber of said power plant system assembly, recycling a first supply of recycled non-air to said at least one chamber; recycled pre-process drying said wet coal with said first supply of recycled non-air in a drying chamber for a first amount of time to create a substantially dried coal having a coal temperature of up to about 300° F.; transferring said substantially dried coal to a separate volatile metal removal chamber; recycling a second supply of recycled non-air to said substantially dried coal to said separate volatile metal removal chamber; recycled pre-process removing volatile metal from said substantially dried coal in said separate volatile metal removal chamber with said second supply of recycled non-air for a second amount of time to create a volatile metal reduced dried coal having a coal temperature up to about 600° F.; generating a volatile metal removal effluent gas stream from said separate volatile metal removal chamber; and cooling said volatile metal reduced dried coal are each retrofitted into an existing power plant system assembly.

2. A method for retrofitting a power plant facility according to claim 1 wherein said recycled non-air is selected from a group consisting of flue gas, inert gas, heated gas, carbon dioxide, nitrogen, steam, and any combination thereof.

3. A method for retrofitting a power plant facility according to claim 1 and further comprising the step of recycling said first supply of recycled non-air and said second supply of recycled non-air comes from a same source within said power plant system assembly.

4. A method for retrofitting a power plant facility according to claim 3 wherein said source comprises a recycled gaseous exhaust.

5. A method for retrofitting a power plant facility according to claim 1 and further comprising the step of recycling said first supply of recycled non-air and said second supply of recycled non-air comes from different sources within said power plant system assembly.

6. A method for retrofitting a power plant facility according to claim 5 wherein said different sources are selected from a group consisting of recycled gaseous exhaust, effluent gas from said separate volatile metal removal chamber, effluent gas from said drying chamber, a heated gas, steam, an inert gas, carbon dioxide, nitrogen, steam, and any combination thereof.

7. A method for retrofitting a power plant facility according to claim 1 and further comprising the step of converting said step of air fired combusting to an oxygen-fired combusting system.

8. A method for retrofitting a power plant facility according to claim 7 wherein said step of converting to an oxygen-fired combusting system comprises the steps of adding an air separation unit to said power plant system assembly and supplying oxygen to said boiler assembly.

9. A method for retrofitting a power plant facility according to claim 1 wherein said step of recycled pre-process drying said wet coal with said first supply of recycled non-air comprises the step of providing said substantially dried coal selected from a group consisting of at least about 90% dry, at least about 91% dry, at least about 92% dry, at least about 93% dry, at least about 94% dry, at least about 95% dry, at least about 96% dry, at least about 97% dry, at least about 98% dry, at least about 99% dry, and about 100% dry.

10. A method for retrofitting a power plant facility according to claim 1 wherein said steps of recycling said first supply of recycled non-air to said at least one chamber and said step of recycling a second supply of recycled non-air to said substantially dried coal to said separate volatile metal removal chamber comprises the step of recycling a first and second supply of heated recycled supply of recycled non-air to said at least one chamber and said separate volatile metal removal chamber.

11. A method for retrofitting a power plant facility according to claim 10 wherein said step of recycling said first and second supply of heated recycled supply of recycled non-air to said at least one chamber and said separate volatile metal removal chamber comprises the step of heating said recycled non-air with hot gaseous exhaust located in said system selected from a group consisting of a furnace, a boiler convective pass, and a downstream flue gas location.

12. A method for retrofitting a power plant facility according to claim 1 wherein said drying chamber is selected from a group consisting of a fluidized bed dryer, a moving bed dryer, and a fixed bed dryer.

13. A method for retrofitting a power plant facility according to claim 1 wherein said first amount of time is selected from a group consisting of at least about 2 minutes, up to about 30 minutes, between about 5 minutes and about 30 minutes, between about 8 minutes and 16 minutes, and up to about 16 minutes.

14. A method for retrofitting a power plant facility according to claim 1 wherein said second amount of time is selected from a group consisting of at least about 2 minutes, up to about 30 minutes, between about 5 minutes and about 30 minutes, between about 8 minutes and 16 minutes, and up to about 16 minutes.

15. A method for retrofitting a power plant facility according to claim 1 wherein said step of recycled pre-process removing volatile metals from said substantially dried coal comprises the step of providing said volatile metal reduced dried coal having a mercury removal selected from a group consisting of between about 50% and about 87%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, and about 100%.

16. A method for retrofitting a power plant facility according to claim 1 wherein said step of recycled pre-process removing volatile metals from said substantially dried coal in said separate volatile metal removal chamber comprises the step of removing volatile metals from said coal, said volatile metals selected from a group consisting of arsenic, selenium, cadmium, lead, and mercury.

17. A method for retrofitting a power plant facility according to claim 1 and further comprising the steps of directing said volatile metals removal effluent gas from said separate volatile metal removal chamber to said drying chamber; and using said volatile metals removal effluent gas to dry said coal.

18. An efficient method for oxy-combustion processing comprising the steps of:
supplying wet coal in an oxy-combustion system assembly;
feeding said wet coal into at least one chamber of said oxy-combustion system assembly;
pre-process drying said wet coal in said at least one chamber to create a substantially dried coal having a coal temperature of up to about 300° F.;
pre-process removing volatile metals from said substantially dried coal in said at least one chamber to create a volatile metal reduced dried coal having a coal temperature of up to about 600° F.;
cooling said volatile metal reduced dried coal;
transferring said volatile metal reduced dried coal to a boiler assembly;
oxygen-fired combusting said volatile metal reduced dried coal in said boiler assembly;
producing a gaseous exhaust composed predominantly of carbon dioxide and water from said boiler assembly;
heating boiler water in said boiler assembly with heat from said combusted volatile metal reduced dried coal to create steam;
driving a turbine with said steam; and
driving at least one generator responsive to said turbine with said steam to produce electricity.

19. An efficient method for coal gasification comprising the steps of:
supplying wet coal in a coal gasification system assembly;
feeding said wet coal into at least one chamber of said coal gasification system assembly;
drying said wet coal in said at least one chamber to create a substantially dried coal having a coal temperature of up to about 300° F.;
removing volatile metals from said substantially dried coal in said at least one chamber to create a volatile metal reduced dried coal having a coal temperature of up to about 600° F.;
cooling said volatile metal reduced dried coal;
transferring said volatile metal reduced dried coal to a gasifier;
producing syngas from said volatile metal reduced dried coal in said gasifier;
cooling said syngas produced from said gasifier;
filtering said syngas from particulate matter;
separating carbon dioxide from said syngas to create a fuel gas supply and a downstream carbon dioxide supply; and
recirculating said downstream carbon dioxide back into at least part of said coal gasification system assembly.

20. An efficient method for generating electricity in a power plant facility comprising the steps of:
supplying wet coal in a power plant system assembly;
feeding said wet coal into at least one chamber of said power plant system assembly;
recycling a first supply of recycled non-air to said at least one chamber;
pre-process drying said wet coal with said first supply of recycled non-air in said at least one chamber for a first amount of time to create a substantially dried coal having a coal temperature of up to about 300° F.;
recycling a second supply of recycled non-air to said substantially dried coal;
pre-process removing volatile metals from said substantially dried coal with said second supply of recycled non-air for a second amount of time to create a volatile metal reduced dried coal having a coal temperature up to about 600° F.;
cooling said volatile metal reduced dried coal;
transferring said volatile metal reduced dried coal to a boiler assembly;
air fired combusting said volatile metal reduced dried coal in said boiler assembly;
producing a gaseous exhaust composed predominantly of carbon dioxide and nitrogen from said boiler assembly;
heating boiler water in said boiler assembly with heat from said combusted volatile metal reduced dried coal to create steam;
driving a turbine with said steam; and
driving at least one generator responsive to said turbine with said steam to produce electricity.

21. A method for retrofitting a power plant facility according to claim 7 wherein said oxygen-fired combustion system comprises an oxygen content selected from a group consisting of between about 20.89% and about 35% in volume of the oxidant supply stream.

22. A method for retrofitting a power plant facility according to claim 10 wherein said step of recycling said first and second supply of heated recycled supply of recycled non-air to said at least one chamber and said separate volatile metal removal chamber comprises the step of heating said first supply and second supply of recycled non-air from a single heat source.

23. A method for retrofitting a power plant facility according to claim 10 wherein said step of recycling said first and second supply of heated recycled supply of recycled non-air to said at least one chamber and said separate volatile metal removal chamber comprises the step of heating said first supply of recycled non-air from at least two heat sources.

24. A method for retrofitting a power plant facility according to claim 1 wherein said step of recycled pre-process removing volatile metals from said substantially dried coal in said separate volatile metal removal chamber occurs after said step of recycled pre-process drying said wet coal with said first supply of recycled non-air.

25. A method for retrofitting a power plant facility according to claim 1 wherein said step of recycled pre-process removing volatile metals from said substantially dried coal in said separate volatile metal removal chamber with said second supply of recycled non-air for a second amount of time to create a volatile metal reduced dried coal having a coal temperature up to about 600° F. comprises the step of recycled pre-process removing volatile metals from said substantially dried coal in said separate volatile metal removal chamber with said second supply of recycled non-air for a second amount of time to create a volatile metal reduced dried coal having a coal temperature between about 275° F. and about 600° F.

26. A method for retrofitting a power plant facility according to claim 17 wherein said volatile metals removal effluent gas is selected from a group consisting of nitrogen, carbon dioxide, gaseous exhaust, steam, and any combination thereof.

27. An efficient method for oxy-combustion processing according to claim 18 wherein said step of pre-process drying said wet coal comprises the step of providing said substantially dried coal selected from a group consisting of at least about 90% dry, at least about 91% dry, at least about 92% dry, at least about 93% dry, at least about 94% dry, at least about 95% dry, at least about 96% dry, at least about 97% dry, at least about 98% dry, at least about 99% dry, and about 100% dry.

28. An efficient method for oxy-combustion processing according to claim 18 wherein said step of pre-process drying said wet coal comprises the step of non-air pre-process drying said wet coal with recycled non-air.

29. An efficient method for oxy-combustion processing according to claim 18 and further comprising the step of recycling a first supply of recycled non-air to said at least one chamber.

30. An efficient method Ibr oxy-eombustion processing according to claim 18 wherein said step or recycling said first supply of recycled non-air comprises the step of drying said wet coal for a first amount of time.

31. An efficient method for oxy-combustion processing according to claim 18 wherein said step of pre-process removing volatile metals from said substantially dried coal comprises the step of pre-process removing volatile metals from said substantially dried coal in a separate volatile metal removal chamber.

32. An efficient method for oxy-combustion processing according to claim 18 wherein said step of pre-process removing volatile metals from said substantially dried coal in said at least one chamber to create a volatile metal reduced dried coal having a coal temperature of up to about 600° F. comprises the step of providing said volatile metal reduced dried coal having a mercury removal selected from a group consisting of between about 50% and about 87%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, and about 100%.

33. An efficient method for oxy-combustion processing according to claim 18 wherein said step of pre-process removing volatile metals from said substantially dried coal comprises the step of pre-process removing volatile metals from said substantially dried coal with recycled non-air.

34. An efficient method for oxy-combustion processing according to claim 29 wherein said step of recycling said supply of recycled non-air comprises the step of recycling a supply of heated non-air to said chamber.

35. An efficient method for oxy-combustion processing according to claim 33 wherein said step of pre-process removing volatile metals from said substantially dried coal comprises the step of pre-process removing volatile metals from said substantially dried coal for a second amount of time.

36. An efficient method for oxy-combustion processing according to claim 30 wherein said first amount of time is selected from a group consisting of at least about 2 minutes, up to about 30 minutes, between about 5 minutes and about 30 minutes, between about 8 minutes and 16 minutes, and up to about 16 minutes.

37. An efficient method for oxy-combustion processing according to claim 35 wherein said second amount of time is selected from a group consisting of at least about 2 minutes, up to about 30 minutes, between about 5 minutes and about 30 minutes, between about 8 minutes and 16 minutes, and up to about 16 minutes.

38. An efficient method for oxy-combustion processing according to claim 24 wherein said step of pre-process removing volatile metals from said substantially dried coal comprises the step of removing volatile metals from said coal, said volatile metals selected from a group consisting of arsenic, selenium, cadmium, lead, and mercury.

39. An efficient method for oxy-combustion processing according to claim 31 and further comprising the step of generating a volatile metals removal effluent gas stream from said separate volatile metal removal chamber.

40. An efficient method for oxy-combustion processing according to claim 39 and further comprising the steps of directing said volatile metals removal effluent gas from said separate volatile metal removal chamber to said drying chamber; and using said volatile metals removal effluent gas to dry said coal.

41. An efficient method for oxy-combustion processing according to claim 40 wherein said volatile metals removal effluent gas is selected from a group consisting of nitrogen, carbon dioxide, steam, gaseous exhaust, and any combination thereof.

42. An efficient method for coal gasification according to claim 19 and further comprising the step of using said fuel gas supply to produce electricity.

43. An efficient method for coal gasification according to claim 19 and further comprising the step of using said fuel gas supply to produce chemicals.

44. An efficient method for coal gasification according to claim 19 wherein said step of recirculating said downstream carbon dioxide back into at least part of said coal gasification system assembly comprises the step of heating said downstream carbon dioxide with a heat exchanger and directing said carbon dioxide to said at least part of said coal gasification system assembly.

45. An efficient method for coal gasification according to claim 19 wherein said step of removing volatile metals from said substantially dried coal in said at least one chamber to create a volatile metal reduced dried coal comprises the step of removing up to about 87% of mercury from said coal in said at least one chamber.

46. An efficient method for coal gasification according to claim 19 and further comprising the step of removing a total of up to about 90% of mercury from said coal in said coal gasification system assembly.

47. An efficient method for coal gasification according to claim 19 wherein said part of said coal gasification system assembly is selected from a group consisting of at least one chamber, a drying chamber, a volatile metal removal chamber, a particulate separation device, a barrier filter, a cyclone, a gasifier, coal transport system, a water-gas-shift reactor, a syngas cleanup system, a gas turbine, a heat recovery steam generator system, and a syngas cooler.

48. An efficient method for coal gasification according to claim 19 wherein said step of recirculating said downstream carbon dioxide back into at least part of said coal gasification system assembly comprises the step of reacting said downstream carbon dioxide in gasification reactions of said gasification system assembly.

49. An efficient method for coal gasification according to claim 19 wherein said step of recirculating said downstream carbon dioxide back into at least part of said coal gasification system assembly comprises the step of using said downstream carbon dioxide as a heat carrier in at least part of said gasification system assembly.

50. An efficient method for coal gasification according to claim 19 wherein said step of recirculating said downstream carbon dioxide back into at least part of said coal gasification system assembly comprises the step of using said downstream carbon dioxide as a coal transporter in at least part of said gasification system assembly.

51. An efficient method for coal gasification according to claim 44 wherein said step of heating said downstream carbon dioxide comprises the step of heating said downstream carbon dioxide with a heater selected from a group consisting of heat exchangers in the syngas cooler, water-gas-shift reactor, syngas cleanup system, gas turbine, heat recovery steam generator system, and any combination thereof.

52. An efficient method for coal gasification according to claim 19 and further comprising the step of providing an air separation unit to create an output of oxygen and nitrogen from an air input.

53. An efficient method for coal gasification according to claim 52 and further comprising the step of directing said oxygen output to said gasifier.

54. An efficient method for coal gasification according to claim 52 and further comprising the step of recirculating said nitrogen within said coal gasification system assembly.

55. An efficient method for coal gasification according to claim 54 wherein said step of recirculating said nitrogen within said coal gasification system assembly comprises the step of recirculating to at least part of said coal gasification system assembly selected from a group consisting of at least one chamber, a drying chamber, a volatile metal removal chamber, a high temperature volatile metals scrubber, a particulate separation device, barrier filter, a cyclone, a gas turbine, and any combination thereof.

56. An efficient method for coal gasification according to claim 54 and further comprising the step of heating said recirculated nitrogen.

57. An efficient method for coal gasification according to claim 56 wherein said step of heating said recirculated nitrogen comprises the step of heating said nitrogen to between about 500° F. and about 900° F.

58. An efficient method for coal gasification according to claim 56 wherein said step of heating said recirculated nitrogen comprises the step of heating said nitrogen in at least part of said coal gasification system assembly with heat exchangers selected from a group consisting of a syngas cooler, a high temperature volatile metals scrubber, a water gas shift reactor, syngas cleanup system, gas turbine, heat recovery steam generator system, and any combination thereof.

59. An efficient method for coal gasification according to claim 19 wherein said step of feeding said wet coal into at least one chamber of said coal gasification system assembly comprises the step of feeding said wet coal into a drying chamber of said coal gasification system assembly.

60. An efficient method for coal gasification according to claim 19 wherein said step of drying said wet coal in said at least one chamber to create a substantially dried coal comprises the step of providing said substantially dried coal selected from a group consisting of at least about 90% dry, at least about 91% dry, at least about 92% dry, at least about 93% dry, at least about 94% dry, at least about 95% dry, at least about 96% dry, at least about 97% dry, at least about 98% dry, at least about 99% dry, and about 100% dry.

61. An efficient method for coal gasification according to claim 19 wherein said step of drying said wet coal in said at least one chamber to create a substantially dried coal comprises the step of pre-process drying said wet coal with recycled non-air.

62. An efficient method for coal gasification according to claim 19 and further comprising the step of recycling a first supply of recycled non-air to said at least one chamber.

63. An efficient method for coal gasification according to claim 19 wherein said step of drying said wet coal in said at least one chamber to create a substantially dried coal comprises the step of drying said wet coal for a first amount of time.

64. An efficient method for coal gasification according to claim 19 wherein said at least one chamber comprises a fluidized bed.

65. An efficient method for coal gasification according to claim 59 wherein said drying chamber is selected from a group consisting of a fluidized bed dryer, a moving bed dryer, and a fixed dryer bed.

66. An efficient method for coal gasification according to claim 19 wherein said step of removing volatile metals from said substantially dried coal in said at least one chamber to create a volatile metal reduced dried coal comprises the step of removing volatile metals from said substantially dried coal in a separate volatile metal removal chamber to create a volatile metal reduced dried coal.

67. An efficient method for coal gasification according to claim 19 wherein said step of removing volatile metals from said substantially dried coal in said at least one chamber to create a volatile metal reduced dried coal having a coal temperature of up to about 600° F. comprises the step of removing volatile metals from said substantially dried coal in said at least one chamber to create a volatile metal reduced dried coal having a coal temperature of between about 275° F. and about 600° F.

68. An efficient method for coal gasification according to claim 19 wherein said step of removing volatile metals from said substantially dried coal in said at least one chamber to create a volatile metal reduced dried coal comprises the step of removing volatile metals from said substantially dried coal in said at least one chamber to create a volatile metal reduced dried coal with recycled non-air.

69. An efficient method for coal gasification according to claim 66 and further comprising the step of recycling a second supply of recycled non-air to said separate volatile metal removal chamber.

70. An efficient method for coal gasification according to claim 19 wherein said step of removing volatile metals from said substantially dried coal in said at least one chamber to create a volatile metal reduced dried coal comprises the step of heating said substantially dried coal for a second amount of time.

71. An efficient method for coal gasification according to claim 62 wherein said step of recycling said supply of recycled non-air comprises the step of recycling a supply of heated non-air to said chamber.

72. An efficient method for coal gasification according to claim 71 wherein said step of recycling a supply of heated non-air comprises the step of heating said recycled non-air from a single heat source.

73. An efficient method for coal gasification according to claim 71 wherein said step of recycling a supply of heated non-air comprises the step of heating said recycled non-air from at least two heat sources.

74. An efficient method for coal gasification according to claim 71 wherein said step of recycling a supply of heated non-air to said chamber comprises the step of heating said recycled non-air with a heat source selected from a group consisting of heat from a gasifier, a syngas cooler, gas turbine exhaust, water gas shift reactor, heat recovery steam generator system, and any combination thereof.

75. An efficient method for coal gasification according to claim 19 wherein said step of removing volatile metals from said substantially dried coal in said at least one chamber to create a volatile metal reduced dried coal comprises the step of removing volatile metals from said coal, said volatile metals selected from a group consisting of arsenic, selenium, cadmium, lead, and mercury.

76. An efficient method for coal gasification according to claim 66 and further comprising the step of generating a volatile metal effluent gas stream from said separate volatile metal removal chamber.

77. An efficient method for coal gasification according to claim 76 and further comprising the step of directing said effluent gas stream from said separate volatile metal removal chamber to a drying chamber; and using said effluent gas stream from said separate volatile metal removal chamber to dry said coal in said drying chamber.

78. An efficient method for coal gasification according to claim 77 wherein said volatile metals removal effluent gas is selected from a group consisting of nitrogen, carbon dioxide, gaseous exhaust, steam, and any combination thereof.

79. An efficient method for coal gasification according to claim 19 and further comprising the step of cleaning said particulate filtered syngas to remove gaseous species of sulfur and acid gases.

80. An efficient method for coal gasification according to claim 19 and further comprising the step of capturing sulfur in said coal gasification system assembly.

81. An efficient method for generating electricity in a power plant facility according to claim 20 wherein said recycled non-air is selected from a group consisting of flue gas, inert gas, heated gas, carbon dioxide, nitrogen, steam, and any combination thereof.

82. An efficient method for generating electricity in a power plant facility according to claim 20 and further comprising the step of recycling said first supply of recycled non-air and said second supply of recycled non-air comes from a same source within said power plant system assembly.

83. An efficient method for generating electricity in a power plant facility according to claim 82 wherein said source comprises a recycled gaseous exhaust.

84. An efficient method for generating electricity in a power plant facility according to claim 20 and further comprising the step of recycling said first supply of recycled non-air and said second supply of recycled non-air comes from different sources within said power plant system assembly.

85. An efficient method for generating electricity in a power plant facility according to claim 84 wherein said different sources are selected from a group consisting of recycled gaseous exhaust, effluent gas from said separate volatile metal removal chamber, effluent gas from said drying chamber, a heated gas, an inert gas, carbon dioxide, nitrogen, steam, and any combination thereof.

86. An efficient method for generating electricity in a power plant facility according to claim 20 wherein said step of recycled pre-process drying said wet coal with said first supply of recycled non-air comprises the step of providing said substantially dried coal selected from a group consisting of at least about 90% dry, at least about 91% dry, at least about 92% dry, at least about 93% dry, at least about 94% dry, at least about 95% dry, at least about 96% dry, at least about 97% dry, at least about 98% dry, at least about 99% dry, and about 100% dry.

87. An efficient method for generating electricity in a power plant facility according to claim 20 wherein said steps of recycling said first supply of recycled non-air to said at least one chamber and said step of recycling a second supply of recycled non-air to said substantially dried coal to said separate volatile metal removal chamber comprises the step of recycling a first and second supply of heated recycled supply of recycled non-air to said at least one chamber and said separate volatile metal removal chamber.

88. An efficient method for generating electricity in a power plant facility according to claim 87 wherein said step of recycling said first and second supply of heated recycled supply of recycled non-air to said at least one chamber and said separate volatile metal removal chamber comprises the step of heating said first supply and second supply of recycled non-air from a single heat source.

89. An efficient method for generating electricity in a power plant facility according to claim 87 wherein said step of recycling said first and second supply of heated recycled supply of recycled non-air to said at least one chamber and said separate volatile metal removal chamber comprises the step of heating said first supply of recycled non-air from at least two heat sources.

90. An efficient method for generating electricity in a power plant facility according to claim 87 wherein said step of recycling said first and second supply of heated recycled supply of recycled non-air to said at least one chamber and said separate volatile metal removal chamber comprises the step of heating said recycled non-air with hot gaseous exhaust located in said system selected from a group consisting of a furnace, a boiler convective pass, and a downstream flue gas location.

91. An efficient method for generating electricity in a power plant facility according to claim 20 wherein said drying chamber is selected from a group consisting of a fluidized bed dryer, a moving bed dryer, and a fixed dryer bed.

92. An efficient method for generating electricity in a power plant facility according to claim 20 wherein said first amount of time is selected from a group consisting of at least about 2 minutes, up to about 30 minutes, between about 5 minutes and about 30 minutes, between about 8 minutes and 16 minutes, and up to about 16 minutes.

93. An efficient method for generating electricity in a power plant facility according to claim 20 wherein said second amount of time is selected from a group consisting of at least about 2 minutes, up to about 30 minutes, between about 5 minutes and about 30 minutes, between about 8 minutes and 16 minutes, and up to about 16 minutes.

94. An efficient method for generating electricity in a power plant facility according to claim 20 wherein said step of pre-process removing volatile metals from said substantially dried coal in said separate volatile metal removal chamber occurs after said step of pre-process drying said wet coal with said first supply of recycled non-air.

95. An efficient method for generating electricity in a power plant facility according to claim 20 wherein said step of pre-process removing volatile metals from said substantially dried coal in said separate volatile metal removal chamber with said second supply of recycled non-air for a second amount of time to create a volatile metal reduced dried coal having a coal temperature up to about 600° F. comprises the step of pre-process removing volatile metals from said substantially dried coal in said separate volatile metal removal chamber with said second supply of recycled non-air for a second amount of time to create a volatile metal reduced dried coal having a coal temperature between about 275° F. and about 600° F.

96. An efficient method for generating electricity in a power plant facility according to claim 20 wherein said step of pre-process removing volatile metals from said substantially dried coal comprises the step of providing said volatile metal reduced dried coal having a mercury removal selected from a group consisting of between about 50% and about 87%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, and about 100%.

97. An efficient method for generating electricity in a power plant facility according to claim 20 wherein said step of pre-process removing volatile metals from said substantially dried coal in said separate volatile metal removal chamber comprises the step of removing volatile metals from said coal, said volatile metals selected from a group consisting of arsenic, selenium, cadmium, lead, and mercury.

98. An efficient method for generating electricity in a power plant facility according to claim 20 and further comprising the steps of directing a volatile metals removal effluent gas from said separate volatile metal removal chamber to said drying chamber; and using said volatile metals removal effluent gas to dry said coal.

99. An efficient method for generating electricity in a power plant facility according to claim 98 wherein said volatile metals removal effluent gas is selected from a group consisting of nitrogen, carbon dioxide, gaseous exhaust, steam, and any combination thereof.

100. A method according to claim 1 wherein said wet coal is selected from a group consisting of bituminous coal, sub-bituminous coal, lignite, biomass, coal-biomass blends, and any combination thereof.

101. A method according to claim 18 wherein said wet coal is selected from a group consisting of bituminous coal, sub-bituminous coal, lignite, biomass, coal-biomass blends, and any combination thereof.

102. A method according to claim 19 wherein said wet coal is selected from a group consisting of bituminous coal, sub-bituminous coal, lignite, biomass, coal-biomass blends, and any combination thereof.

103. A method according to claim 20 wherein said wet coal is selected from a group consisting of bituminous coal, sub-bituminous coal, lignite, biomass, coal-biomass blends, and any combination thereof.

104. A method according to claim 1 wherein said wet coal comprises a moisture content selected from a group consisting of about 8%, about 20%, about 28%, about 38%, up to about 60%, up to about 50%, up to about 20%, up to about 25%, up to about 28%, up to about 38%, greater than about 20%, and greater than about 60%.

105. A method according to claim 18 wherein said wet coal comprises a moisture content selected from a group consisting of about 8%, about 20%, about 28%, about 38%, up to about 60%, up to about 50%, up to about 20%, up to about 25%, up to about 28%, up to about 38%, greater than about 20%, and greater than about 60%.

106. A method according to claim 19 wherein said wet coal comprises a moisture content selected from a group consisting of about 8%, about 20%, about 28%, about 38%, up to about 60%, up to about 50%, up to about 20%, up to about 25%, up to about 28%, up to about 38%, greater than about 20%, and greater than about 60%.

107. A method according to claim 20 wherein said wet coal comprises a moisture content selected from a group consisting of about 8%, about 20%, about 28%, about 38%, up to about 60%, up to about 50%, up to about 20%, up to about 25%, up to about 28%, up to about 38%, greater than about 20%, and greater than about 60%.

108. A method according to claim 1 and further comprising the step of recovering water in said system assembly.

109. A method according to claim 18 and further comprising the step of recovering water in said system assembly.

110. A method according to claim 19 and further comprising the step of recovering water in said system assembly.

111. A method according to claim 20 and further comprising the step of recovering water in said system assembly.

112. A method according to claim 108 and further comprising the step treating said water.

113. A method according to claim 109 and further comprising the step treating said water.

114. A method according to claim 110 and further comprising the step treating said water.

115. A method according to claim 111 and further comprising the step treating said water.

116. A method according to claim 108 and further comprising the step of recycling said water in at least part of said power plant system assembly selected from a group consisting of a sulfur dioxide emissions scrubber, a boiler feedwater makeup, a cooling tower makeup and any combination thereof.

117. A method according to claim 109 and further comprising the step of recycling said water in at least part of said power plant system assembly selected from a group consisting of a sulfur dioxide emissions scrubber, a boiler feedwater makeup, a cooling tower makeup and any combination thereof.

118. A method according to claim 110 and further comprising the step of recycling said water in at least part of said power plant system assembly selected from a group consisting of a sulfur dioxide emissions scrubber, a boiler feedwater makeup, a cooling tower makeup and any combination thereof.

119. A method according to claim 111 and further comprising the step of recycling said water in at least part of said power plant system assembly selected from a group consisting of a sulfur dioxide emissions scrubber, a boiler feedwater makeup, a cooling tower makeup and any combination thereof.

120. A method according to claim 12 wherein said fluidized dryer bed is configured to remove up to about 100% of the moisture of said wet coal.

121. A method according to claim 65 wherein said fluidized dryer bed is configured to remove up to about 100% of the moisture of said wet coal.

122. A method according to claim 91 wherein said fluidized dryer bed is configured to remove up to about 100% of the moisture of said wet coal.

* * * * *